(12) United States Patent
Amini

(10) Patent No.: US 6,975,120 B2
(45) Date of Patent: Dec. 13, 2005

(54) MEASUREMENT OF SUBTERRANEAN LITHOLOGY USING ELECTROMAGNETIC ENERGY

(76) Inventor: Bijan K. Amini, 1111 Caroline St. No. 2002, Houston, TX (US) 77010

( * ) Notice: Subject to any disclaimer, the term of this patent is extended or adjusted under 35 U.S.C. 154(b) by 0 days.

(21) Appl. No.: 10/127,295

(22) Filed: Apr. 22, 2002

(65) Prior Publication Data

US 2003/0117142 A1 Jun. 26, 2003

Related U.S. Application Data

(60) Provisional application No. 60/285,425, filed on Apr. 21, 2001.

(51) Int. Cl.⁷ .............................. G01V 3/18; G01V 3/28
(52) U.S. Cl. ..................... 324/339; 324/220; 324/221; 324/239; 324/346
(58) Field of Search ................................ 324/334, 336, 324/339, 346, 239, 220, 221

(56) References Cited

U.S. PATENT DOCUMENTS

| | | | | |
|---|---|---|---|---|
| 3,277,363 A | * | 10/1966 | Schuster | 324/323 |
| 3,890,563 A | * | 6/1975 | Dowling et al. | 324/340 |
| 4,072,200 A | * | 2/1978 | Morris et al. | 175/45 |
| 5,038,107 A | * | 8/1991 | Gianzero et al. | 324/339 |
| 5,426,367 A | * | 6/1995 | Martin et al. | 324/339 |
| 5,646,533 A | * | 7/1997 | Locatelli et al. | 324/339 |
| 5,654,639 A | * | 8/1997 | Locatelli et al. | 324/339 |
| 6,392,421 B1 | * | 5/2002 | Amini | 324/639 |
| 6,597,177 B1 | * | 7/2003 | Amini | 324/339 |
| 2002/0097057 A1 | * | 7/2002 | Amini | 324/644 |

* cited by examiner

*Primary Examiner*—N. Le
*Assistant Examiner*—Darrell Kinder

(57) ABSTRACT

The invention subject of this application pertains to a method and apparatus for measuring the subterranean lithology using electromagnetic energy. The invention is applicable to the measurement from within uncased boreholes, i.e., and open-holes. The present invention transmits and receives electromagnetic energy deep into a geologic formation from a borehole, while also providing high resolution for distant measurements and the ability to control the direction in which the measurements are taken. The invention does not require a receiver to be located at the ground surface or in another borehole. In simple terms, the apparatus of this invention is able to "look around" into the surrounding geologic formation from a stationary position.

15 Claims, 46 Drawing Sheets

Measured Movement of Target at 30 feet.

Measured Movement of Target at 45 feet.

Measured Movement with Target Rotation at 61 feet.

MEASUREMENT OF SUBTERRANEAN LITHOLOGY USING ELECTROMAGNETIC ENERGY

CROSS REFERENCE TO RELATED APPLICATION

This application claims the benefit of and priority to U.S. Provisional Application No. 60/285,425, entitled "Openhole Logging Tool" and filed Apr. 21, 2001.

BACKGROUND OF INVENTION

1. Field of Use

The invention subject of this application pertains to a method and apparatus for measuring the subterranean lithology using electromagnetic energy. The invention is applicable to the measurement from within uncased boreholes, i.e., and open-holes. The present invention transmits and receives electromagnetic energy deep into a geologic formation from a borehole, while also providing high resolution for distant measurements and the ability to control the direction in which the measurements are taken. The invention does not require a receiver to be located at the ground surface or in another borehole. In simple terms, the apparatus of this invention is able to "look around" into the surrounding geologic formation from a stationary position.

2. Description of Related Art

There has long been a need for an open-hole logging tool that would be capable of providing measurements of the lithology of a geologic formation in selected directions, providing measurements of the lithology both close to the bore hole and deep into the formation, and provide all such measurements with high vertical and lateral resolution. Existing logging tools can not provide the adequate penetration into the geologic formation surrounding the borehole. In addition, existing logging tools are not directional. The resolution of measurements is also limited, particularly at greater distances into the geologic formation.

The depth into geologic formations that existing tools, utilizing electromagnetic energy and located in a single borehole, can measure is limited by the separation between the transmitter and receiver for the electromagnetic energy. In general terms, this requires that to achieve an eight-foot depth penetration into the formation, the transmitter and receiver must be separated by at least eight feet. Further, a fixed separation distance limits the vertical resolution (assuming the axis of the borehole is vertically oriented) as measurements are attempted further into the formation from the borehole). As the depth of penetration of the electromagnetic energy is increased, the resolution of the measurement rapidly diminishes. To compensate for this loss of resolution, the transmitter and receiver separation must be increased.

Current methods depend upon various types of electromagnetic energy, either electric waves or magnetic waves, in the electromagnetic spectrum. The electric waves, more commonly known as radio waves, have an advantage in being able to be used at very high frequencies. At these high frequencies of megahertz to gigahertz, temporally pulsed waves may be used to determine the distance of an object. A well-known example of this technology is radar. However, these electric waves suffer great attenuation when confronted by ground water, clays or other highly conductive media within a geologic formation. Using focusing antennas with high gain improves the situation only marginally since the amount of gain is usually not enough to offset the amount of loss or attenuation of the electromagnetic energy incurred as the high frequency wave passes through layers of electrically conductive material.

Oscillating magnetic flux has the potential to achieve deeper penetration through geologic formations containing electrically conductive material than electric waves. There has not, however, been a high gain magnetic antennas available to focus the magnetic flux in a desired or controlled manner. Accordingly, even if the oscillating flux can penetrate a further distance into the ground, the signal rapidly dissipates. The signal decreases as the inverse cube of the distance of the intended target from the flux-generating source. The resulting rapid loss of power has substantially limited the effective range of distance that oscillating magnetic flux can be utilized.

SUMMARY OF INVENTION

This invention pertains to a method and apparatus for measuring the subterranean lithology using Electromagnetic energy. The invention is applicable to the measurement from within uncased boreholes, i.e., open-holes. Also combined within the invention is Magnetic Lenses™ focus and Magnetic Antenna™ transmitter-receptor. These facilitate the present invention achieving increased penetration of electromagnetic energy into the geologic formation from the borehole with high resolution and the ability to control the direction in which the measurements are taken. The invention teaches a method and apparatus for concentrating magnetic flux to retard the dissipation of energy penetrating through the ground formation. The invention utilizes the Magnetic Antenna transmitter-receptor and Magnetic Lensing focus that counter the rapid dissipation of electromagnetic energy.

The invention may utilize one or more monostatic or bistatic configurations of magnetic flux transmitters and receivers in conjunction with at least one saturation flux generator. The apparatus subject of the invention has demonstrated the ability to concentrate electromagnetic energy, thereby creating the ability to detect electrically conductive objects at distances far greater than previously achieved. The creation of a Magnetic Antenna™ transmitter-receptor for transmitting and receiving oscillating magnetic flux utilizes the steps of partial magnetic saturation of a electrically conductive and magnetically permeable material ("EM barrier" or "barrier material"). The "Magnetic Lensing"™ focus is used to direct the oscillating flux of the transmitter in a controlled manner.

The invention utilizes inductive magnetic coupling. Accordingly, the detection apparatus does not need to be in physical contact with the ground or geologic formation. The invention utilizes inductive magnetic coupling to measure the changes in resistivity within the geologic formation that signal the presence of material having different electrical properties. The apparatus measures and records the electromagnetic properties of the geologic structure comprising the formation, e.g., limestone, granite, etc., and materials occupying the interstices of the geologic formation, e.g., water, hydrocarbon, etc. The invention transmits magnetic flux into the formation. This provides information regarding the electrical resistivity and lossiness of the formation. This provides information regarding the constituent matter within the formation. The measurements may be taken at various depths or locations within the subsurface penetrated by the borehole by the transmission of oscillating magnetic flux. The apparatus can thereby measure and record the location and amplitude of said resistivity in single or multiple directions, and at distances that facilitate locating electrically conductive materials. Examples of materials of interest having low conductivity are hydrocarbon gases or liquids. The other common media located within the interstices of a geologic formation is water or salt water. Water and particularly salt water have significantly higher electrical conductivity than hydrocarbons. Therefore measuring the electrical resistivity of geologic formations can provide reliable information regarding the substance located within a particular formation. The invention is not, however, limited to detection of hydrocarbon and water. The fact that the invention does not require physical contact with the surface of the geologic formation greatly facilitates movement of the detection apparatus. It also minimizes the wear upon the detection apparatus housing and other components.

The apparatus of the subject invention can also be used to detect changes in the resistivity of over time by comparison of recorded measurements.

Each bistatic magnetic flux transmitter/receiver array incorporates one or more EM barriers. As used herein, an "EM barrier" or "barrier material" can be any electrically conductive and magnetically permeable material such as carbon steel. The combined components form a Magnetic Antenna™ transmitter-receptor. The magnetic saturation flux generator, transmitter and receiver components are electrically insulated from the EM barrier. By partially saturating the EM barrier, an electrically conductive and magnetically permeable material, the EM barrier will more readily engage with higher frequency oscillating transmitter flux. By well-known electromotive forces, the oscillating magnetic flux induces eddy currents with the barrier. This separate oscillating electromagnetic current generates a separate magnetic flux that is broadcast out of the barrier and into the geologic formation, thereby causing the EM barrier to be a magnetic antenna.

By controlling the quantity of the magnetic saturation flux of the magnetic saturation generator, the relative permeability of the antenna can be controlled. As the permeability of barrier material comprising the antenna is lowered, more oscillating transmitter flux penetrates into the antenna, creating greater eddy currents and resulting in increased oscillating flux broadcast from the length of the antenna. Further, the lowered relative permeability of the antenna alters the shape of the oscillating flux field generated by the eddy currents and transmitted out from the antenna. This allows the flux to be focused. By focusing the flux, an increased density of oscillating flux can be created at greater distances from the apparatus that otherwise has been previously possible. This counters the typical dispersion of flux as it is transmitted away from the antenna. It permits measurements being made at greater distances into the formation than previously achievable. The increased density of flux also increases the resolution of measured property. This focusing of the magnetic flux, with the resulting enhanced penetration into the formation and with high resolution, is termed Magnetic Lensing focus.

To enhance the reception of the separate magnetic flux ("receiver signals") induced within electrically conductive material existing with the area of the geologic formation targeted for measurement, a receiver is also located proximate to the transmitter and magnetic saturation generator (a monostatic configuration) and, alternatively, with a separate magnetic saturation generator (a bistatic configuration).

The method and apparatus of the invention includes the capability of generating magnetic flux ("saturation flux") to engage and magnetically saturate one or more separate portions of an EM barrier, thereby creating one or more separate Metallic Transparency region(s). The invention also includes the capability to generate and engage one or more oscillating magnetic flux ("transmitter flux") into one or more Metallic Transparency regions created in the EM barrier. The EM barrier according acts as a magnetic antenna broadcasting oscillating magnetic flux energy into the geologic formation. The invention also includes the capability to receive and measure any oscillating magnetic flux ("receiver signal") induced in the geologic formation and coupling within the partially saturated antenna.

BRIEF DESCRIPTION OF DRAWINGS

The accompanying drawings, which are incorporated in and constitute a part of the specification, illustrate preferred embodiments of the invention. These drawing, together with the general description of the invention given above and the detailed description of the preferred embodiments given below, serve to explain the principles of the invention for resistivity measurement of geologic formations from within an open or uncased wellbore.

FIGS. 4C and 4D illustrate multiple axis magnetic saturation generators, each utilizing a single magnetic culminator.

FIG. 8—None

FIG. 24—None

Figure 1:
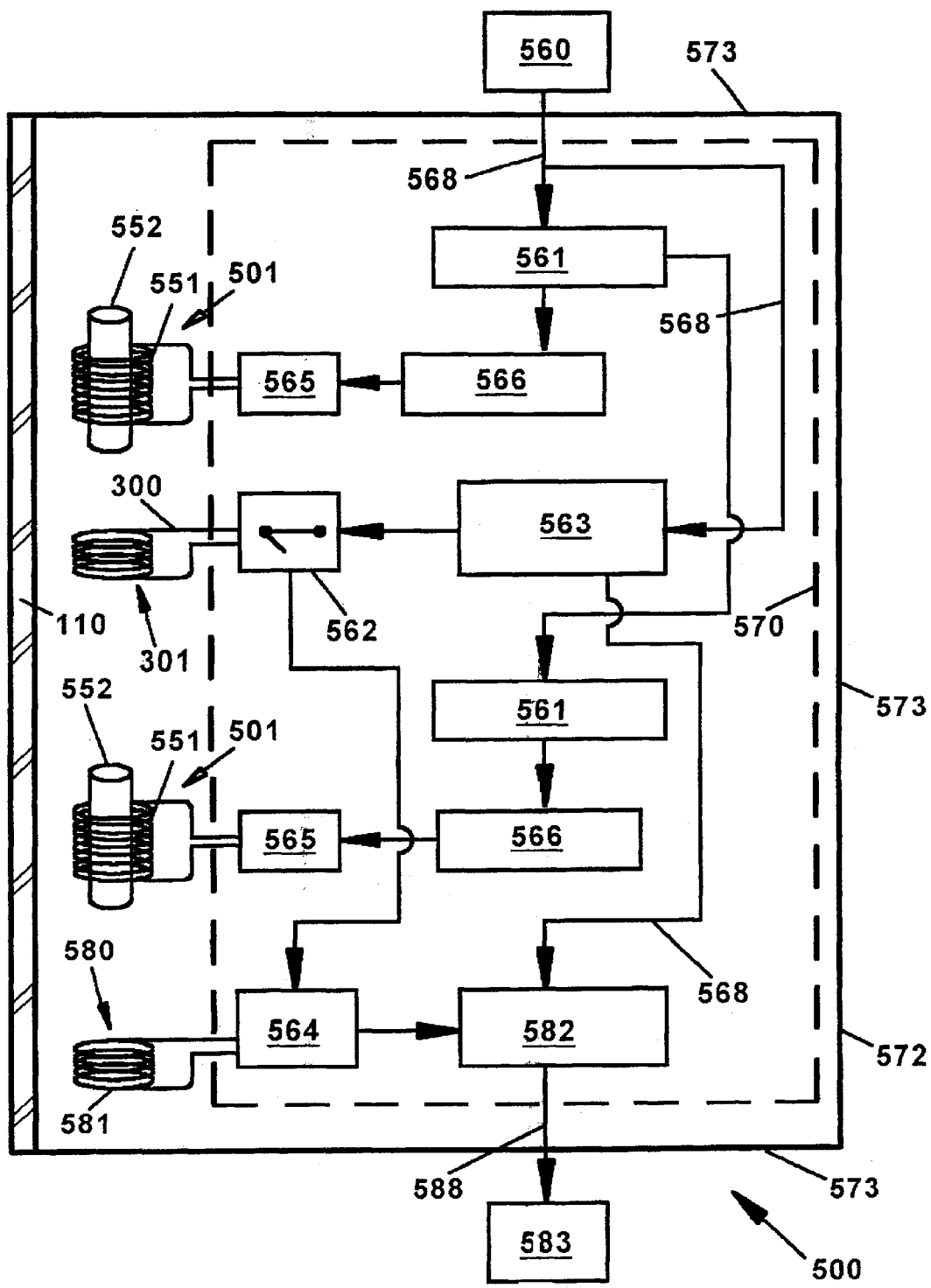
FIG. 1 is a schematic illustration of the principal components of one embodiment of the invention.

The above general description and the following detailed description are merely illustrative of the subject invention, and additional modes, advantages, and particulars of this invention will be readily suggested to those skilled in the art without departing from the spirit and scope of the invention.

DETAILED DESCRIPTION OF INVENTION

This invention pertains to a method and apparatus for measuring the subterranean lithology using Electromagnetic energy. The invention is applicable to the measurement from within uncased boreholes, i.e., and open-holes. Also combined into the configuration is Magnetic Lenses™ focus and Magnetic Antenna™ transmitter-receptor. These facilitate the present invention achieving increased penetration of electromagnetic energy into the geologic formation from the borehole with high resolution and the ability to control the direction in which the measurements are taken. The invention teaches a method and apparatus for concentrating magnetic flux to retard the dissipation of energy penetrating through the ground formation. The invention utilizes the Magnetic Antenna transmitter-receptor and Magnetic Lensing focus that counter the rapid dissipation of electromagnetic energy.

The invention may utilize one or more monostatic or bistatic configurations of magnetic flux transmitters and receivers in conjunction with at least one saturation flux generator. The apparatus subject of the invention has demonstrated the ability to concentrate electromagnetic energy, thereby creating the ability to detect electrically conductive objects at distances far greater than previously achieved. The creation of a Magnetic Antenna transmitter-receptor for transmitting and receiving oscillating magnetic flux utilizes the steps of partial magnetic saturation of a electrically conductive and magnetically permeable material, i.e., the EM barrier. The "Magnetic Lensing" focus is used to direct the oscillating flux of the transmitter in a controlled manner.

The invention utilizes inductive magnetic coupling. Accordingly, the detection apparatus does not need to be in physical contact with the geologic formation. In addition, the apparatus must remain electrically insulated from the antenna and the geologic formation. The invention utilizes inductive magnetic coupling to measure the changes in resistivity and lossiness within the geologic formation that signal the presence of material having different electrical properties. The apparatus measures and records magnetic flux that relates to the electrical resistivity of the ground subsurface at various depths or locations within the subsurface penetrated by the oscillating transmitted magnetic flux. The apparatus can thereby measure and record the location and amplitude of said resistivity in single or multiple directions, and at distances that facilitate locating electrically conductive materials. This invention provides a method and apparatus for measuring the electrical resistivity and lossiness of the formation, as well as the materials occupying the interstices of the formation. The invention permits changes in the resistivity to be mapped in order to identify the presence of hydrocarbons or other media of interest.

The present invention includes generating magnetic flux and coupling the flux with the antenna of the apparatus, thereby partially saturating the antenna and lowering the permeability of the material comprising the antenna. The antenna is electrically insulated from the other components of the invention, particularly the saturation coils, transmitter coils and receiver coils. The partially saturated antenna component is separately engaged with one or more frequencies of oscillating magnetic flux. The oscillating flux induce eddy currents within the electrically conductive antenna, thereby generating separate oscillating magnetic flux that is broadcast from the antenna into the surrounding geologic formation. This antenna is also used as a receiving antenna for oscillating magnetic flux induced in electrically conductive media within the formation A simple bistatic configuration of the present invention utilizes the following steps and devices: (1) a saturation component (magnetic saturation generator) containing a "saturation coil", preferably wrapped around a highly permeable core ("saturation core"). When the saturation coil is energized, it acts as an electromagnet. The saturation coil creates one or more fields of magnetic flux ("saturation flux") adjacent to the antenna structure consisting of an EM barrier. The saturation flux engages with the antenna, creates a partial magnetic saturation of at least a portion of the antenna. Saturation results in the magnetic permeability of the antenna being substantially lowered. When partially saturated, the antenna structure acquires greater capacity to engage or couple with additional magnetic flux, especially magnetic flux oscillating at relatively high frequencies. In such a state, that portion of the antenna has become "transparent" to magnetic flux. When fully saturated, that portion of the antenna cannot absorb further magnetic flux, thereby allowing additional flux to permeate through and out from the antenna. A partially or fully saturated section is known as a "transparency" or a "Metallic Transparency" region. (2) One or more magnetic flux transmitter components ("transmitters"), each utilizing one or more coils ("transmitter coil") located proximate to a Metallic Transparency region. The transmitters create one or more fields of additional magnetic flux oscillating at frequencies preferably equal to or greater than the saturation flux. This oscillating magnetic flux ("transmitter flux") is engaged with the partially saturated antenna (having greatly reduced magnetic permeability) thereby causing the transmitter flux to induce by eddy currents within the partially saturated antenna by known electromagnetic principals. The eddy currents generate a separate oscillating magnetic flux that can pass out from the antenna structure, through the air gap or void, and enter the geologic formation. (3) Electrically conductive media, e.g., ground water, soils, hydrocarbons, etc., contained within the geologic formation interact with this oscillating magnetic flux. Through the same basic electromotive forces, a separate oscillating magnetic flux is induced in the electrically conductive media contained within the formation. (4) The field of this induced magnetic flux extends back to apparatus of the present invention. As in step No. 1 above, the same or a separate but similar saturation coil creates a transparency within the antenna near a separate coil ("receiver coil") so that the induced magnetic flux emanating from the geologic formation can couple with the antenna, creating eddy currents within the antenna that induce an oscillating magnetic flux that can be received and measured by this receiver coil. This receiver coil also comprises part of the apparatus of this invention. (5) The receiver component, of which the receiver coil is part, converts the induced flux ("receiver flux") into electrical signal ("receiver current") that is filtered and processed in order to determine the electrical resistivity of the subsurface material. The receiver flux is electrically processed to concentrate and magnify the induced oscillating magnetic flux, thereby forming the receiver flux. The transmitter flux is nulled to minimize direct transmission of flux from the transmitter to the receiver. The transmitter flux is compared to the received flux and, using the changes in amplitude and phase, the electrical resistivity of the media in the surrounding geologic formation is determined and displayed. These fluxes may then be sent to the output display for further processing, display, and recording. The output display, power supply and other ancillary equipment may be located separate from the saturation coil, transmitter coil and receiver coil components.

Accordingly, the method and apparatus of the invention includes the capability of generating magnetic flux ("saturation flux") to engage and reduce the magnetic permeability of at least a portion of the antenna, thereby creating a Partial Magnetic Transparency region. The invention also includes the capability to generate and transmit one or more separate oscillating magnetic flux ("transmitter flux") into the Partial Metallic Transparency region created in the Magnetic Antenna transmitter-receptor. The invention also includes the capability to receive and measure any magnetic flux ("receiver flux") induced in the subsurface.

As will be discussed in greater detail below, the preferred embodiment of the to invention will include the ability to generate and send a plurality of transmitter flux of differing frequencies, either simultaneously or sequentially. The preferred embodiment will also include the ability to detect and measure receiver flux from a plurality of directions. An embodiment may also have the capability to partially saturate one or more portions of the antenna in order that one or more frequencies of oscillating magnetic flux may be induced within and focused or directed through partially saturated antenna utilizing the Magnetic Lensing™ focus.

The preferred embodiment of the invention will also incorporate one or more means to null direct coupling of magnetic flux between the transmitter and receiver, i.e., the direct transmission of the transmitter flux to the receiver coil. In addition, a preferred embodiment of the invention will include means to accurately measure and compensate for changes in antenna properties, e.g., conductivity, permeability and thickness.

It will be appreciated that there is a plurality of components or subsystems in the invention.

By altering the concentration of the saturation flux, the frequency of the transmitter flux, placement of the transmitters and receivers, or by the orientation of the transmitter in relation to the saturation coil, it is possible to vary the depth of penetration into the geologic formation, thus building a detailed characterization profile of the formation at various distances from the wellbore. The apparatus of this invention may utilize a monostatic or bistatic configuration with a transmitter placed with a separate magnetic saturation flux generator and the receiver placed proximate to or incorporated within a separate magnetic saturation flux generator.

There are pluralities of subsystems that may be incorporated into the invention. These include the following:

Magnetic Saturation Generator System
Magnetic Antenna System
Transmitter/receiver System
Magnetic Lensing focus System
Automatic Lensing System
Shielding System
Nulling System—geometric, electronic, permeability
Conductivity/Resistivity Measurement System All or some of these subsystems may be incorporated into the preferred embodiment of the apparatus subject of this invention. Each will be discussed in greater detail below.

1. Magnetic Saturation Generator System

The saturating magnetic flux system (hereinafter "magnetic saturation generator") creates a magnetic flux. It may utilize one or more permanent magnets; one or more electromagnets powered by dc current or by ac powered circuits. The generated flux is utilized to fully or partially saturate an EM barrier material, thereby allowing the permeability of the EM barrier to be reduced. If fully saturated, the permeability of the barrier material may be reduced to near 1 henry/meter. (Carbon steel may have relative permeability in excess of 10,000 at a typical magnetic flux density.) A fully saturated EM barrier material is, however, transparent to the transmission of additional magnetic flux. In this state of full saturation, the fully saturated or transparent portion of the antenna can not absorb further magnetic flux. Therefore, a second and oscillating magnetic flux from either the transmitter of the invention or emanating from an object in the subsurface will penetrate through the transparency of the antenna and into the surrounding geologic formation. When in a state of complete saturation, therefore, the barrier material will have relatively little influence upon the direction of magnetic flux penetrating through it. When partially saturated, however, the substantially reduced permeability of the EM barrier is allows greater penetration into the EM barrier by a separate oscillating magnetic flux, particularly flux oscillating at higher frequencies.

2. Magnetic Antenna

When a barrier material, e.g. carbon steel, is partially saturated by the Magnetic Saturation Generator, the EM barrier can be used to broadcast oscillating magnetic flux. In this manner, it is termed a Magnetic Antenna transmitter-receptor device. This antenna may also be used for Magnetic Lensing focus. Simply stated, when partially saturated, the permeability of the EM barrier comprising the antenna is substantially reduced, thereby allowing greater penetration by oscillating transmitter flux, particularly flux oscillating at higher frequencies. However, the relative permeability of the antenna is greater than 1. The partially saturated antenna continues to absorb a significant portion of the transmitter flux. Since the antenna is also electrically conductive, eddy currents are generated within the antenna. Separate oscillating magnetic flux induced by the eddy currents is emitted from the antenna. It has been found that the partially saturated region of the antenna may be small relative to the region within the antenna that contains the induced eddy currents. In this manner, the component serves as an antenna for the broadcast transmission of oscillating magnetic flux.

3. Transmitter/Receiver System

There may be a multiplicity of transmitter/receiver configurations and orientations. The transmitters and receivers may be together or separately configured with one or more magnetic saturation generators creating the magnetic flux used to partially saturate the antenna.

(a) Transmitter—There may be more than one transmitter arranged directionally around the antenna. In addition, oscillating magnetic flux of the same frequency from multiple transmitters may be bucked with respect to each other to propagate the transmitter flux further out into the geologic formation. Also this bucking or interaction among magnetic flux oscillating at the same frequency may be used to direct transmitter flux in a controlled manner. A plurality of Transmitters may be configured to achieve desired transmitter flux geometry.

(b) Receiver—There may be a plurality of receivers used in an evenly or unevenly spaced array. Receivers may be bucked to enhance the signal and null direct transmission of from the transmitter. The receivers may also be configured to establish directionality of received signals.

The transmitter component(s) and receiver component(s) may be housed in a carrier comprising an EM barrier, e.g., a ferromagnetic metal housing. The housing or a portion thereof, may comprise the Magnetic Antenna transmitter-receptor. Through the digitally controlled transmitter frequency, the transmitter may create any range of frequencies. Use of varying frequencies facilitates the investigation of various depths into the subsurface. It is understood that higher frequencies of magnetic flux attenuate more rapidly through the geologic formation. However, such frequencies may provide better resolution at distances closer to the apparatus. Further, a single transmitter may provide the multiple frequencies. The frequencies may be "chirped" or linearly varied in time.

4. Magnetic Lensing Focus System

The Magnetic Antenna™ transmitter-receptor can be utilized to focus or direct the induced oscillating magnetic flux. This feature is termed "Lensing" and the component termed a Magnetic Lens™ focus. The spatial variations of reduced permeability can be utilized to control and concentrate this induced magnetic flux broadcast from the partially saturated antenna. Thus the antenna can act as a lens to concentrate and direct oscillating magnetic flux transmitted into the surrounding geologic formation. This allows measurement of the electrical resistivity of media within the formation more distant from the apparatus than can be achieved by controlling the separation distance between the transmitter and receiver.

When the magnetic saturation generator creates a partially transparent region, a separate oscillating EM wave may be more efficiently transmitted into this partially transparent region. This enhanced efficiency is particularly noted for higher frequency oscillating flux. Eddy currents are generated in the antenna containing the partially transparent region. These eddy currents induce an oscillating magnetic flux. At least some portion of the induced magnetic flux is transmitted out from the barrier material comprising the antenna. However, the lines of flux may be bent or altered as they are emitted out from the surface of the antenna into the surrounding environment. This bending of magnetic flux can be controlled, allowing the lines of magnetic flux to be focused on an object existing on the opposite side of the EM barrier from the magnetic saturation generator transmitter. This focusing partially counteracts the normal rapid geometric spreading of magnetic flux. Concentrating the magnetic flux conserves the use of power.

One variation of the invention utilizes Magnetic Lensing focus to concentrate oscillating flux at selected distances from the antenna. This improves the efficiency and reduces the power requirement of the invention by directing the flux to a selected target area. It may also be used to direct or vary the location of flux concentration within the subsurface.

5. Automatic Lensing Focus System

There is a relationship between the amount of power utilized by the magnetic saturation generator required to achieve partial saturation and the power utilized by the transmitter. This relationship can be used to optimize the Magnetic Lensing focus and the strength of the receiver flux. It is important that the oscillating transmitter flux not penetrate through the thickness of the antenna. This wastes power since the magnetic flux permeating through the antenna is not available to induce the eddy currents required to create magnetic flux broadcast by the antenna. The permeating flux may also cause a portion of the antenna to be come fully saturated. As noted earlier, a fully saturated EM barrier can not be used to focus oscillating magnetic of the flux, even that flux that is broadcast from the antenna.

As will be discussed in greater detail later, flux oscillating at lower frequencies penetrates further into an EM barrier; e.g., an antenna made of ferromagnetic metal, than higher frequency flux. If the transmitter flux is oscillating at a relatively low frequency, and assuming an antenna of constant thickness, conductivity and permeability, less saturation flux will be needed to allow penetration into the antennas with the resulting induced eddy currents and broadcast of oscillating flux from the antenna or, alternatively, direction of flux by Magnetic Lensing focus. Greater saturation flux will be required for higher frequency transmitter flux to penetrate into the antenna. This relationship becomes more important when multiple frequencies are utilized. Additional adjustment must be made in the saturation flux to facilitate reception of the oscillating magnetic generated from within the subsurface. This is particularly important when a monostatic transmitter and receiver configuration is used.

When the transmitter and receiver are separated in a bistatic configuration, it has been found that optimized flux strength is achieved by increasing the saturation flux proximate to the receiver by as much as a factor of four over the power utilized to create the partial transparency proximate to the transmitter. This enhances the transparency of the antenna proximate to the receiver. This relationship between the magnetic flux for the receiver and transmitter can be derived by known methods. This relationship varies as the antenna thickness; permeability and conductivity also vary.

6. Ferromagnetic Shielding System

The ferromagnetic shielding allows the magnetic beam to be focused toward the target while not being influenced by other signals or devices. The shielding also enhances the reception by the receiver of flux that has been induced through the antenna and thereby decreasing unwanted "noise" reaching the receiver. The shielding thickness will depend upon the frequencies to be used, with thicker shields needed for lower frequencies.

7. Nulling System

The receiver system must be nulled with respect to the transmitter system. This nulling prevents the receiver system from being overwhelmed by oscillating magnetic flux emitted from the transmitter system. It also minimizes the interference of extraneous electrical signals, i.e., electrical noise. It has been found that a combination of three nulling techniques provides the best results. These three systems are (a) geometric, (b) electronic, and (c) transmitter flux absorption by permeability.

(a) Geometric nulling—A wide combination of geometric nulling systems may be used. The respective design and location of each transmitter and receiver may vary in consideration of the placement and design of the other transmitters or receivers and in consideration of the location and geometry of the Metallic Transparency region. Therefore, by not wrapping either the transmitter or receiver coils, or both, around the magnetic saturation generator of the antenna allows a number of advantages. These are:

1. Mechanical nulling by receiver or transmitter placement or rotation with respect to each other, or with respect to the antenna.
2. Directionality by being nearest the antenna side of the saturation core, or by rotation of the axis of the transmitter or the receiver.
3. Minimizing possible saturation of the magnetic saturation generator core that would cause uncontrolled dispersion of saturation flux. The dispersed saturation flux may achieve only partial saturation of a selected portion of the antenna. This may be a desired result. This is exactly opposite the concern cited in U.S. Pat. No. 5,038,107 which does not want to use an ac current on the magnetic saturation generator core that may take the walls or core out of saturation.
4. Since the transmitter coil can have an air core, laminated core or smaller inductor core than the magnetic saturation generator core, much higher frequencies can be used for the transmitter flux. This due to the inductive impedance resulting from the presence of a large metallic saturation core. This large saturation core drives up the total impedance.
5. Multiple transmitters, each at different frequencies, may broadcast simultaneously to perform spectroscopy over a large frequency range.
6. Transmitters comprised of differing coil geometry will have different flux geometry. Therefore varying the design of the transmitter, e.g., varying the coil length, may also be used to control the portion of the surrounding formation that will be investigated.
7. For applications utilizing full saturation of a portion of the antenna, the transmitters and receivers must be placed in sufficient proximity to the Metallic Transparency region to prevent a large amount of either transmitter flux or receiver Signal being absorbed into the non-saturated high permeability antenna.
8. Multiple transmitters can be used to "buck" each other, thereby causing the geometry of the transmitter flux to be altered. This may achieve a greater penetration into the surrounding formation without utilization of Magnetic Lensing focus.
9. Multiple receivers can be either nulled with respect to each other and/or built into an array for improving signal-receiving resolution. These techniques may incorporate reversing the direction of at least one of the transmitter coils or altering the length of at least one of the transmitter coils in relation to the other(s).

(b) Electronic nulling—In this nulling type, it is possible to either null by creating a receiver signal 180° out of phase and exactly in reverse amplitude to the transmitter flux. Another method is measuring the receiver signal attributable to direct coupling of the transmitter flux and subtracting this value from all other measured values of receiver signals. (c) Permeability Nulling—In this nulling method, a variety of ways may be used to absorb the transmitter flux before it reaches the receiver. This may be accomplished by separating the transmitter and receiver by enough high permeability material to absorb the transmitter flux before it reaches the receiver coil. Another absorption method is to isolate the transmitter from the receiver by highly permeable materials such as EM barriers or by placing the receiver coil a large enough distance from the transmitter such that the transmitter flux is absorbed prior to reaching the receiver coil.

8. Conductivity, Permeability Measurement System

To perform accurate measurements of the media, the properties of electrical conductivity and magnetic permeability must be measured.

(a) The conductivity is measured by analyzing the frequency spectral response over a sufficient range to measure the effects of conductivity on the various frequencies.

The Electronics System

The electronics component of the invention may be comprised of the DSP (digital signal processor), the power supply, a CPU, and the software. The CPU may be used control the oscillating magnetic flux frequency, chirp rate, average output, and the display and the amplification of the receiver signals.

It is possible to measure the electrical resistivity within a geologic formation utilizing the oscillating magnetic flux broadcast into the formation by the antenna subject of this invention. The depth of penetration of the oscillating magnetic flux into the media within the near field of the antenna is proportional to the separation distance between the transmitter and receiver of the invention. This is very useful for near EM barrier measurements. A series of receivers placed at varying distances from a single transmitter could establish various depths of measurement directionally into the surrounding geological formation proportional to these separations. It will be noted, however, the as the separation distance "D" between the transmitter and receiver(s) is increased, the density of the flux decreases at a rate of $1/D^3$ and that when the EM barrier is fully saturated, i.e., its relative permeability approaching "unity" or 1, Magnetic Lensing focus can not be utilized.

Reference will now be made in detail to the present preferred embodiments of the invention as described in the accompanying drawings.

FIG. 1 illustrates schematically one embodiment of the components of the apparatus 500 subject of the invention. The apparatus includes the antenna 110 and additional components contained within the apparatus housing 572. Components of the apparatus also include (a) a magnetic saturation generator 501 for creating a partial Metallic Transparency region into the antenna 110 and comprising a saturation coil 551, (b) a magnetic flux transmitter component 300, comprising the transmitter coil 301, a switch 562, and a low noise amplifier (LNA) 564, (c) a receiver component 580 for the receipt and measurement of magnetic flux penetrating through or induced within the antenna and comprising a receiver coil 581, (d) a frequency generator 563, (e) a pulsar 566, (f) one or more capacitors 561 and (g) a nulling device 582. The magnetic saturation generator, includes the saturation coil 551, saturation core or magnetic culminator 552. The antenna 110, shielding 573, may comprise the housing 572. The antenna 110, magnetic saturation generator 501, saturation coil 551, the transmitter 300, transmitter coil 301 and any associated core (not shown), the receiver 580, including the receiver coil 581, and the associated components described above and depicted within the apparatus housing 572, can be lowered into, maneuvered through and raised out of a open borehole. The output display 583, and operator controls (not shown) and power source 560 are typically located at the well head or surface and linked to the apparatus housing 572 by means of standard cables and connectors 568 and 588. The operator's console or display 583 may also record and display historical information and trends.

Figure 1A:
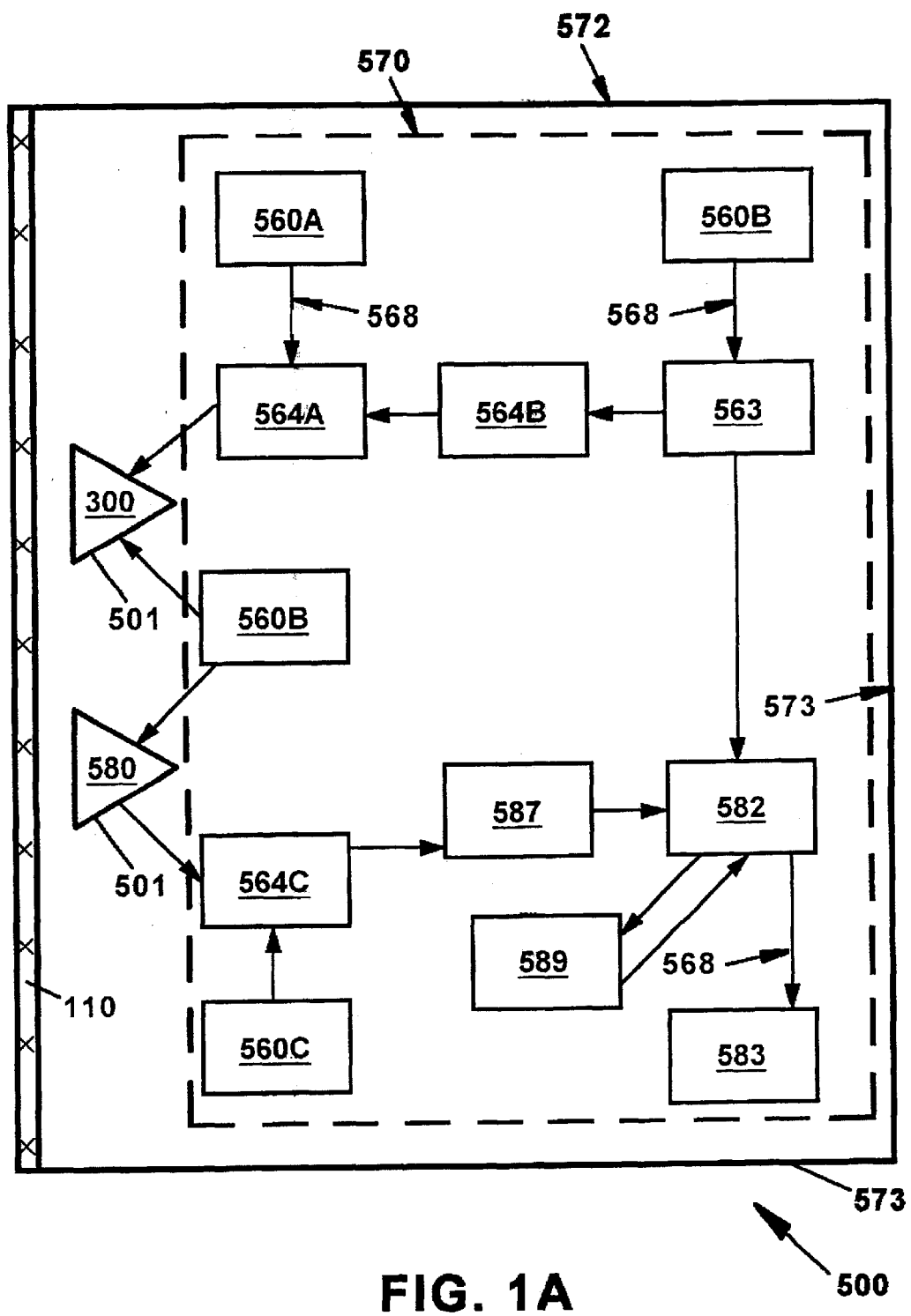
FIG. 1A is a schematic illustration of an alternate embodiment utilizing high voltage and low voltage power sources.

FIG. 1A illustrates an alternate embodiment utilizing a high voltage 560B and low voltage power source 560A. The low voltage power source may be utilized for the transmitter flux and for the digital flux processor. The high voltage power source may be used with an amplifier for desired amplification of the transmitter flux. A dc power supply is preferably used for generating the saturation flux. It may also be found to be advantageous to utilize an analog to digital flux converter. It is envisioned that such a converter, as well as other sub-components, may be contained within the electronic component 570 discussed above.

The saturation coil 551 is a principle element of the magnetic saturation generator 501. It may be utilized in conjunction with one or more transmitter components, receiver components, or combinations of both. The saturation coil generates a magnetic flux that engages (or couples) with and partially saturates the antenna. As discussed above, the partial saturation reduces the magnetic permeability of the antenna. The transmitter coil 301 is the principle element of the transmitter component ("transmitter") 300. The transmitter creates the oscillating magnetic flux ("transmitter flux") that engages with the partially saturated antenna 110.

When the antenna is partially saturated with magnetic flux from the magnetic saturation generator, additional transmitter flux from the transmitter 300 may penetrate and engage with the antenna. Preferably, the saturation coil generates a low frequency or constant magnetic flux. The oscillating magnetic flux of the transmitter will preferably be at a higher frequency than the frequency of the saturation flux. In a preferred embodiment of the invention, the transmitter has the capability to generate a plurality of separate magnetic flux, each having distinct frequencies. When partially saturated, it is possible to penetrate or engage the antenna with greater quantities or higher frequencies of oscillating magnetic flux.

FIGS. 1 and 1A illustrate that the receiver 580 may be combined with a separate magnetic saturation generator 501, thereby allowing the receiver to be placed away from the transmitter. This has a number of advantages, including facilitating nulling between the transmitter and receiver. An embodiment of the apparatus of the present invention in which the transmitter and receiver are located proximate to separate magnetic saturation generators 501 is termed a "bistatic arrangement" or "bistatic configuration."

The saturation coil 551 and saturation core 552, the transmitter coil 301 and the receiver coil 580, are often depicted separately from the other components described above, e.g., amplifiers, switches, frequency generators, power supplies, etc., and depicted within the "electronics component" 570. For clarity, many of the drawings contained within this specification do not depict the electronics component 570. Further, the drawings may show an illustration of a coil only, but may be variously labeled as a magnetic saturation generator, saturation coil, transmitter or receiver. It is understood that the other components or sub-components are deemed to be included as necessary. In addition, the components of the invention, including but not limited to the saturation coil, transmitter coil and receiver coil are not placed in electrical contact with the antenna, shielding (if any) or the surface of the borehole.

Figure 2:
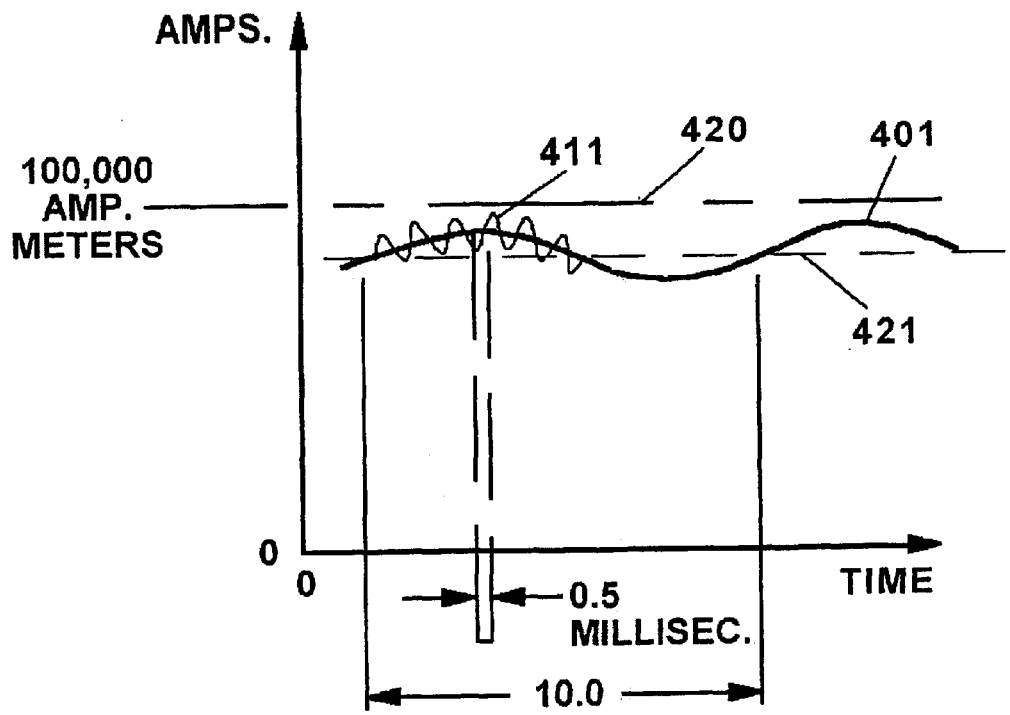
FIG. 2 illustrates a relationship between an oscillating saturation flux, maintained below the level required for complete saturation, and a higher frequency oscillating transmitter frequency.

FIG. 2 illustrates a graph of current versus time with respect to the present invention. FIG. 2 illustrates several significant features in practicing the present invention: the level or quantity of saturation flux required to achieve the chosen level 421 of permeability reduction of the antenna, the higher frequency transmitting flux 411 and, as compared with the transmitter flux, the lower frequency of the actual saturation flux 401. The higher frequency transmitter flux 411 is imposed on the lower frequency saturation flux 401. FIG. 2 illustrates the higher frequency oscillating transmitter flux as spikes 411 disposed along a lower frequency oscillating saturation flux 401. In one embodiment of the present invention, the transmitter flux 411 may be transmitted only during the duration of each cycle of the oscillating saturation flux 401 that is above the level of partial saturation 421 required to achieve the selected reduction of antenna permeability. The selected level of current remains below the level 420 required to place any portion of the antenna in complete saturation. Among other advantages, the latter embodiment minimizes energy consumption. In the latter embodiment, it is possible to have multiple transmissions of transmitter flux 411 during each phase that the saturation flux 401 is above the selected saturation level 421.

As noted above, FIG. 2 illustrates the saturation flux 411 maintained continuously below the level of flux that would be required to place the antenna in total saturation 420. However, when partially saturated, the antenna will allow a significantly greater portion of one or more distinctively higher frequency transmitter flux, e.g., 411, to couple, i.e., penetrate, into the antenna, to generate eddy currents within the antenna or, alternatively, be of sufficient magnitude to achieve the selected level of saturation when combined with the saturation flux 401. It will be appreciated by persons skilled in the art that the eddy currents can be controlled by changes in the saturation flux field, the transmitter flux field or transmitter flux frequencies, or a combination of all three. This may be of particular utility when multiple transmitter frequencies are utilized.

Figure 2A:
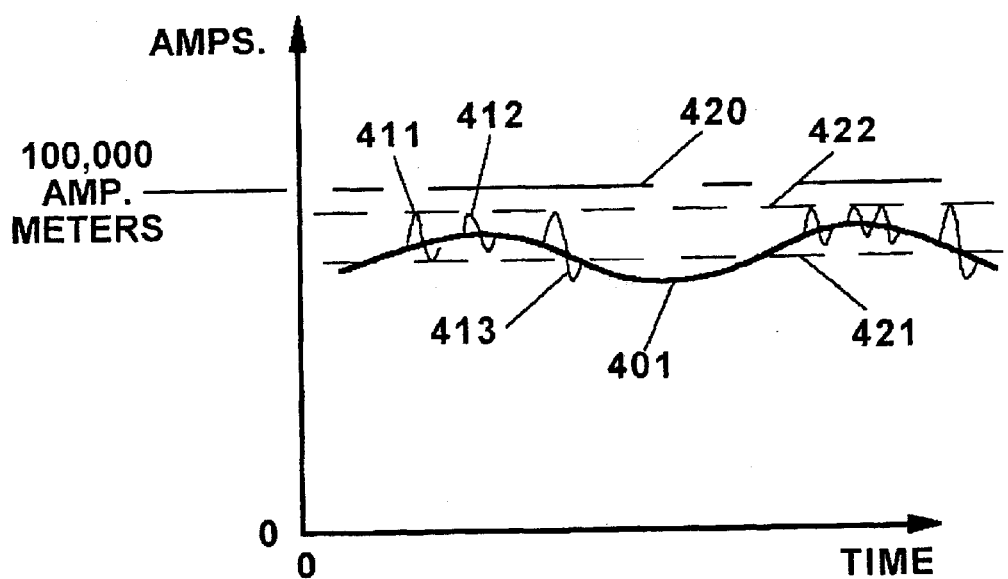
FIG. 2A illustrates adjusting the transmitter flux amplitude to compensate for oscillation of the saturation flux.

FIG. 2A illustrates an embodiment of the invention wherein the amplitude of the transmitter flux is adjusted 411 412, and 413 to compensate for the oscillating amplitude of the saturation flux 401. A constant level of partial saturation may therefor be maintained 422.

In other embodiments, the saturation flux may be generated from at least one permanent magnet, a low frequency ac current or a direct current dc electromagnetic device.

Illustrated schematically as an apparatus in FIG. 1 and conceptually in FIG. 2, the saturation coil 551 generates the saturation flux 421, which in turn creates the partial saturation within the antenna 110. The saturation coil is comprised of conductive material preferably wrapped around a highly permeable core 552 (saturation core) and powered either by dc current or an ac current oscillating at a low frequency. The transmitter flux 411 may be generated by the transmitter 300, comprised of the coil 301 of conductive material, powered by alternating current, preferably at a controlled frequency, wrapped upon or near the saturation coil 551. Preferably, the transmitter flux is at a higher frequency than the saturation flux. It is preferred that the frequency of the transmitter flux be at least a multiple of 10 greater than the frequency of the saturation flux. As discussed above, the higher frequency of the transmitter flux relative to the saturation flux allows, for example, 10 wavelengths of the transmitter flux to be emitted, and thereby induce the intended eddy currents within the antenna before the flux falls below the level 421 required to achieve the selected partial saturation.

In FIG. 2, the high frequency transmitter flux 411 is illustrated being pulsed at less than 0.5 millisecond rates. If the lower frequency saturation flux 401, generated by the saturation coil is pulsed or activated "on" for 10 milliseconds, there is sufficient time for ten transmitter flux pulses (e.g., with a wavelength of only 0.5 millisecond) 411 to engage with the antenna while at the selected level of partial saturation, thereby inducing ten pulses of eddy currents that broadcast ten pulses of magnetic flux from the antenna into the formation. As explained in preceding portion of the specification, the 10 pulses of oscillating flux radiating from the antenna during the "on" pulse, depicted as 130 of FIG. 2A, of the saturation flux 401 may induce oscillating eddy currents in the geologic structure or media contained within interstices of the formation which, in turn, induce separate oscillating magnetic flux that may be detected by the antenna and measured by one or more receivers comprising part of the apparatus subject of this invention.

Figure 2B:
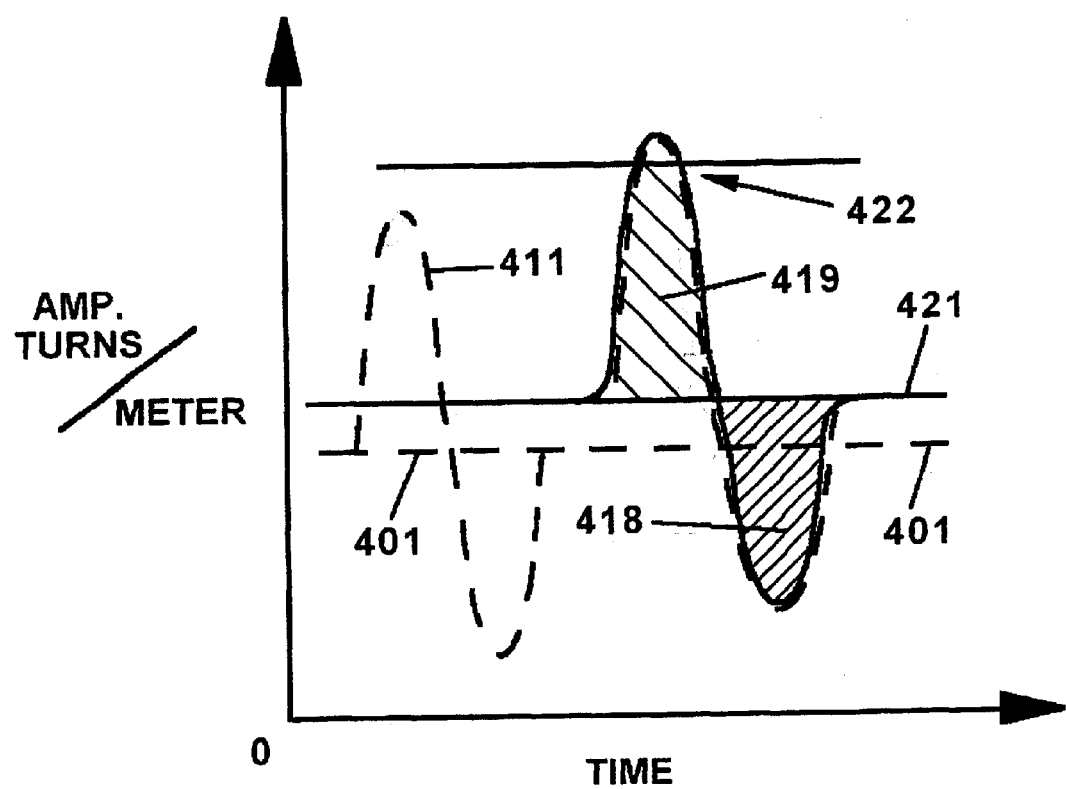
FIG. 2B illustrates the saturation flux and the selected partial saturation level.

FIG. 2B illustrates the combined flux field 422, comprised of the higher frequency transmitter flux 411 and the saturation flux 401, may alternatively exceed 419 or fall below 418 the level 421 of saturation selected to create the partial transparency within the antenna.

For most applications, a power source of 300 watts or less is sufficient to create the transmitter flux and saturation flux. The strength of the transmitter or saturation flux may be increased by utilizing the charge storing capacitors 561 shown in FIG. 1. The capacitors 561 are slowly charged then quickly discharged through a switch contact and then through the low impedance large coil 551. At the same time, the higher frequency small flux coil 300 is pulsed.

With reference to the preceding abbreviated outline of the invention and FIG. 1, the invention comprises the following steps and utilizes the referenced components and subcomponents: (1) the saturation coil 551, when energized, acts as an electromagnet. The saturation coil creates one or more fields of magnetic flux adjacent or near the antenna 110. The saturation coil partially saturates at least a portion of the antenna immediately proximate to the saturation coil 551. This partial saturation results in the magnetic permeability of the antenna being substantially lowered. (When fully saturated, that portion of the antenna cannot absorb further magnetic flux, thereby allowing transmitter flux to pass through that portion of the antenna. In such a state, that portion of the antenna has become Metallically Transparent to magnetic flux. In order to create a full Metallic Transparency region, the full saturation must extend through the thickness of the antenna). (2) The transmitter 300 then creates one or more fields of additional magnetic flux having frequencies preferably equal to or greater than the saturation flux. The reduced permeability increases the quantity of transmitter flux that is engaged with antenna. This second field of magnetic flux engages with partially saturated antenna, thereby creating the induced eddy field. The separate oscillating magnetic flux generated by the eddy currents broadcasts into the formation. (3) The resistivity or lossiness of the formation (or media contained within the formation) can be measured by interaction with the oscillating flux broadcast from the antenna. Through basic electromotive forces, separate eddy currents may be induced in the electrically conductive media and a resulting separate oscillating magnetic flux is broadcast from the media. (4) The induced magnetic flux travels back to the antenna. As in step No. 1 above, the same or similar saturation coils 551 create a partial transparency near the receiver 580 so that the induced magnetic flux broadcast from media within the formation can couple with the antenna, facilitating the detection and measurement of the resulting signals within the antenna by the receiver 580. (5) The receiver converts the induced flux (receiver signal) into electronic receiver current that is filtered and processed in order to determine the resistivity of media located outside the EM barrier. The received signal is processed using various electronic components (which may be located within the electronic component 570) to concentrate and magnify the induced oscillating magnetic flux. The invention may contain means 582 to electronically null the transmitter flux to minimize direct transmission of flux from the transmitter 300 to the receiver 580 and to minimize the interference of electronic noise. The transmitted flux may be compared to the received signal and, using the changes in amplitude and phase, the resistivity is determined and displayed. These signals are then sent to the output display 583 for further processing, display, and recording.

Figure 3A:
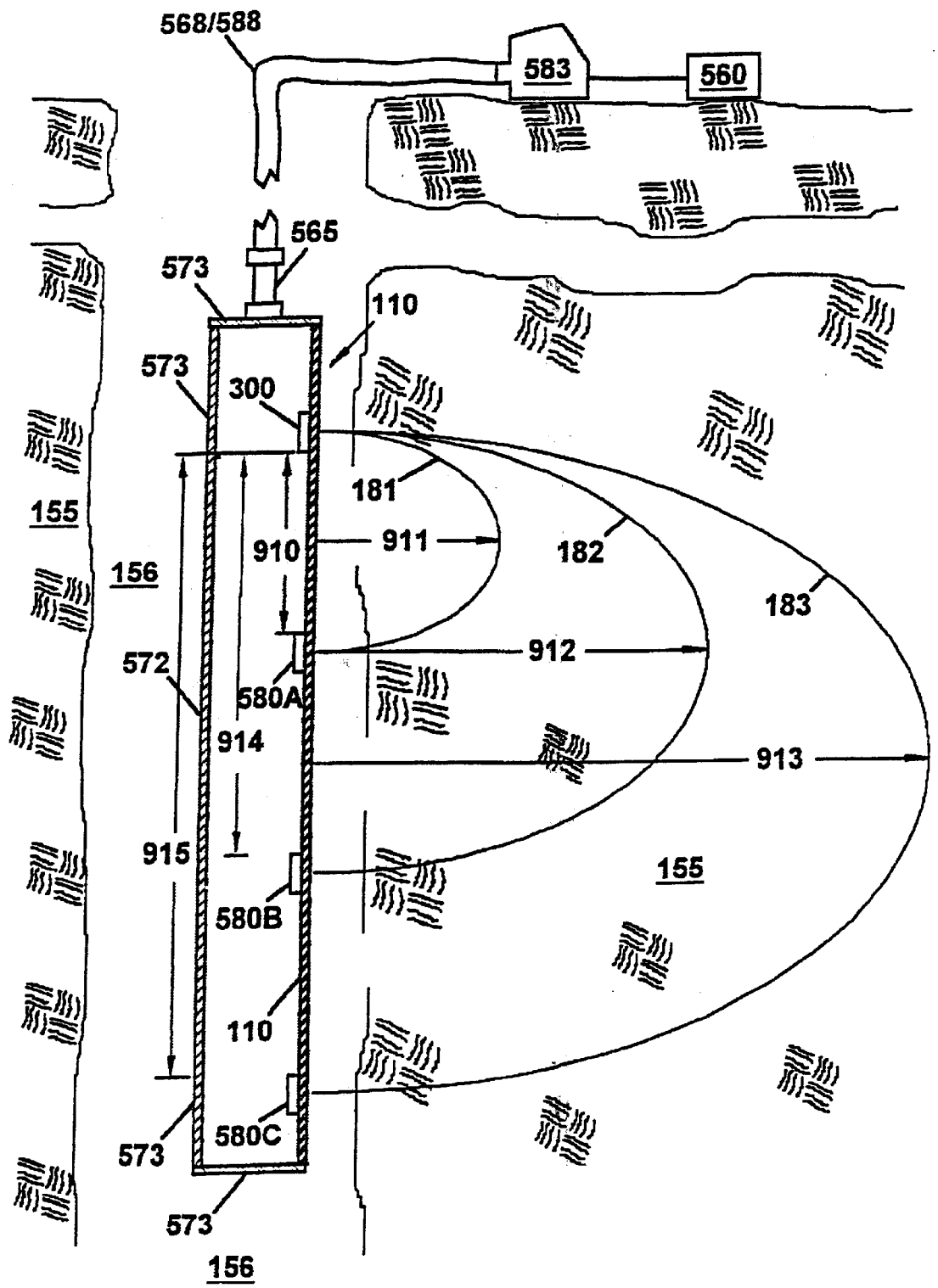
FIG. 3A illustrates the relationship of the depth of penetration into the geologic formation and the transmitter-receiver separation in a bistatic configuration.

FIG. 3A illustrates the apparatus 500 containing components of the invention installed within a housing 572 configured to be lowered and alternately raised through a well bore 156 to transmit oscillating magnetic flux into the surrounding geologic formation 155. It should be noted that the antenna 110 may to comprise a portion of the housing. A ferromagnetic shield 573 that surrounds the 5 remaining sides of the apparatus may be included. The apparatus may have a self-contained power source e.g., battery, and data can be transmitted by telemetry or stored electronically. As indicated, FIG. 3A shows the antenna 110 to comprise the $6^{th}$ side of the housing 572 proximate to the transmitter 300 and receivers 580A, 580B and 580C. The output display 583 and power supply 560 are connected to the apparatus by cables 568 and 588 located at the ground surface 101.

FIG. 3A shows a separation distance "D" 910 between the transmitter 300 and receiver 580. The transmitter 300 and receiver 580A, 580B and 580C may each be incorporated into or used in proximity to separate magnetic saturation generators (not shown). A single transmitter flux can be used to detect electrically conductive media at varying distances within the ground by locating separate receivers at varying distances from the transmitter.

Within the near field, the distance of preferred flux reception will be a function of the distance "D" of the receiver from the transmitter, e.g., 910 or 914 or 915. Lines 181, 182 and 183 represent 3 flux lines of the same transmitter flux. The receiver 580A, located distance 910 from the transmitter, will receive fluxes from electrically conductive media located along the arc of flux line 181. The most distant flux will be detected from an object at a distance 911 from the antenna. Receiver 580C, located distance 915 from the transmitter 300, will receive flux from electrically conductive media located along line 183. The most distant receiver signal will be induced within an object located at a distance 913 from the antenna. This will also be the most distant location from the transmitter generating the flux that the receiver can detect an object. The geometry of the configuration results in the most distant flux for any transmitter/receiver combination will be at a point between the transmitter and receiver. The greatest distance capacity will not exist directly in front of the transmitter. It will be appreciated that the power required to generate a flux detectable by 580C within an object (not shown) at a distance 913 will be significantly greater than the power to create a flux detectable by 580A within an object (not shown) at a distance 911.

Another embodiment of the invention, the antenna may be contained within the housing and the adjacent covering or portion of the housing 572 consisting of a non-permeable material such as stainless steel. It may also be manufactured of material that is also not electrically conductive, such as a ceramic or glass fiber reinforced material, e.g., a fiberglass structure. The antenna may be located outside the housing. The adjacent portion of the housing between the antenna and other components of the apparatus would also need to comprised of similar non-permeable or non-electrically conductive material. The remaining portion of the housing may comprise the ferromagnetic shielding 573. It will be appreciated that the shield may also be made of other EM barrier material.

Figure 3B:
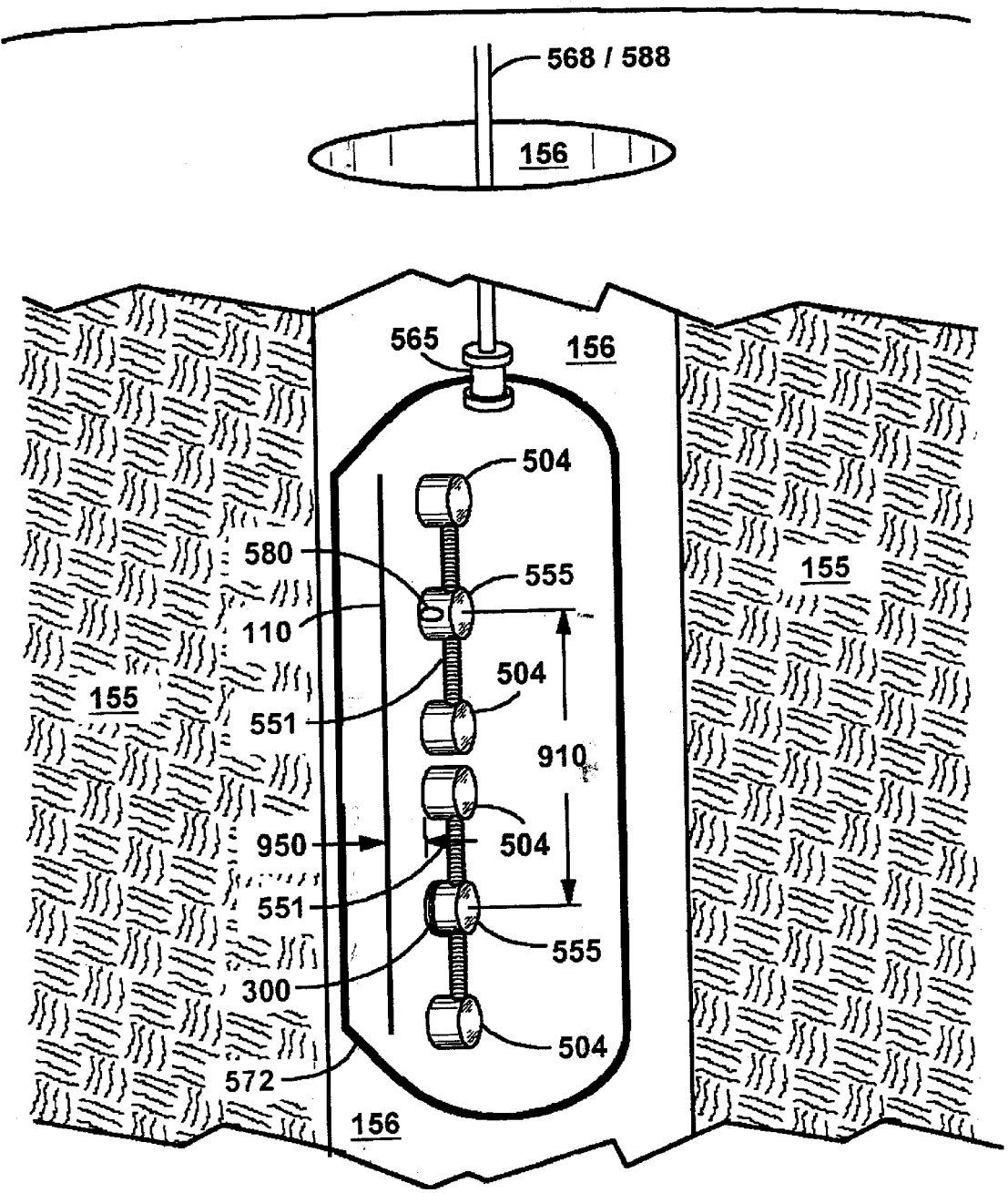
FIG. 3B illustrates an embodiment of the invention utilizing a bistatic configuration within a housing placed inside an open borehole.

FIG. 3B illustrates a bistatic configuration of the receiver 580 and transmitter 300. The apparatus, including the antenna 110, is contained within the housing 572. The apparatus is shown in an uncased borehole 156 within a geologic formation 155.

Figure 3C:
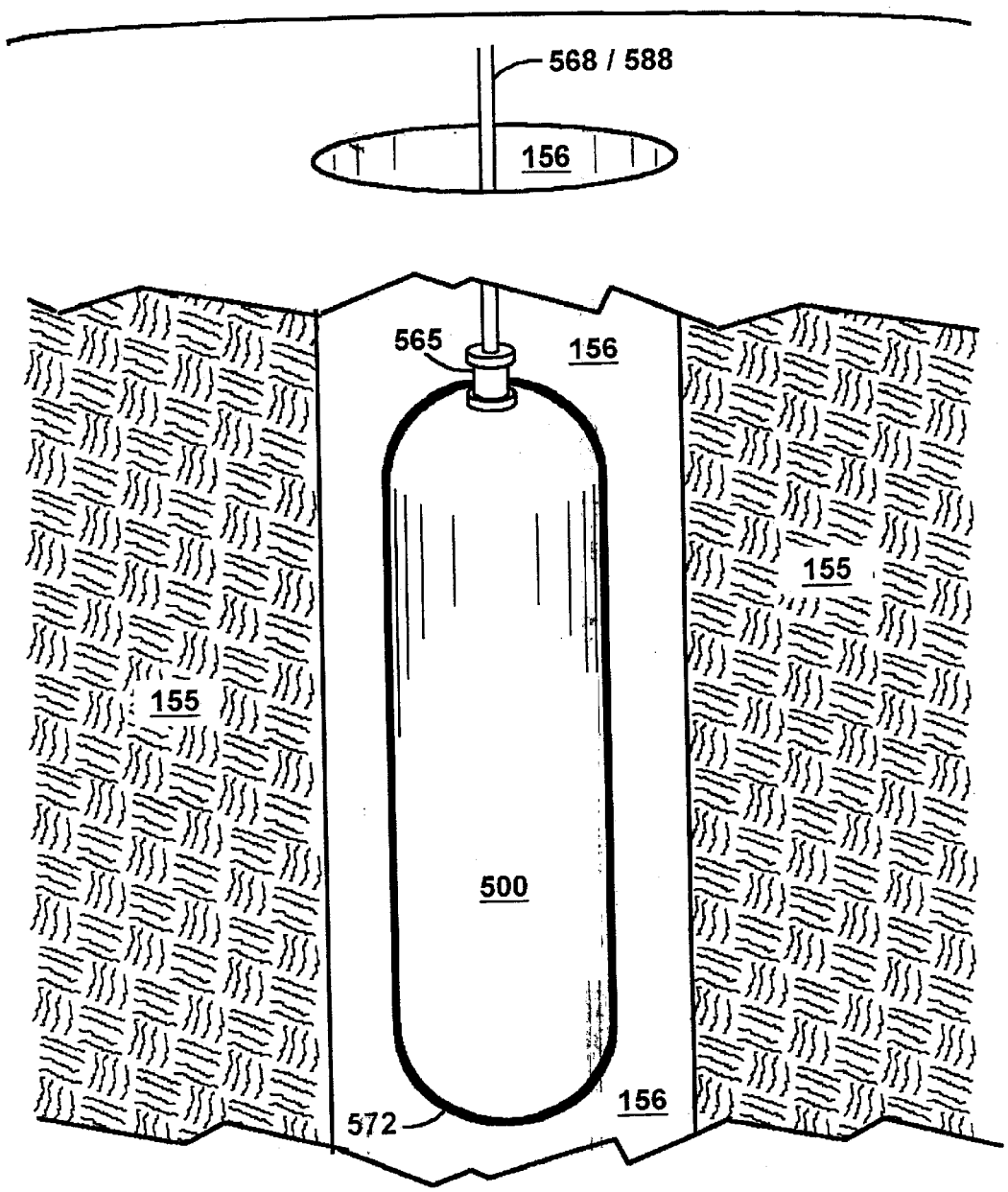
FIG. 3C illustrates an embodiment of the invention contained within an enclosed housing suspended by power and transmission cables into an open borehole.

FIG. 3C illustrates a cylindrical housing 572 containing the invention 500 within the borehole 156 and connected to the surface by means of communication/power cables 568/588. The cables connect with the coupling device 565 into the housing.

Figure 3D:
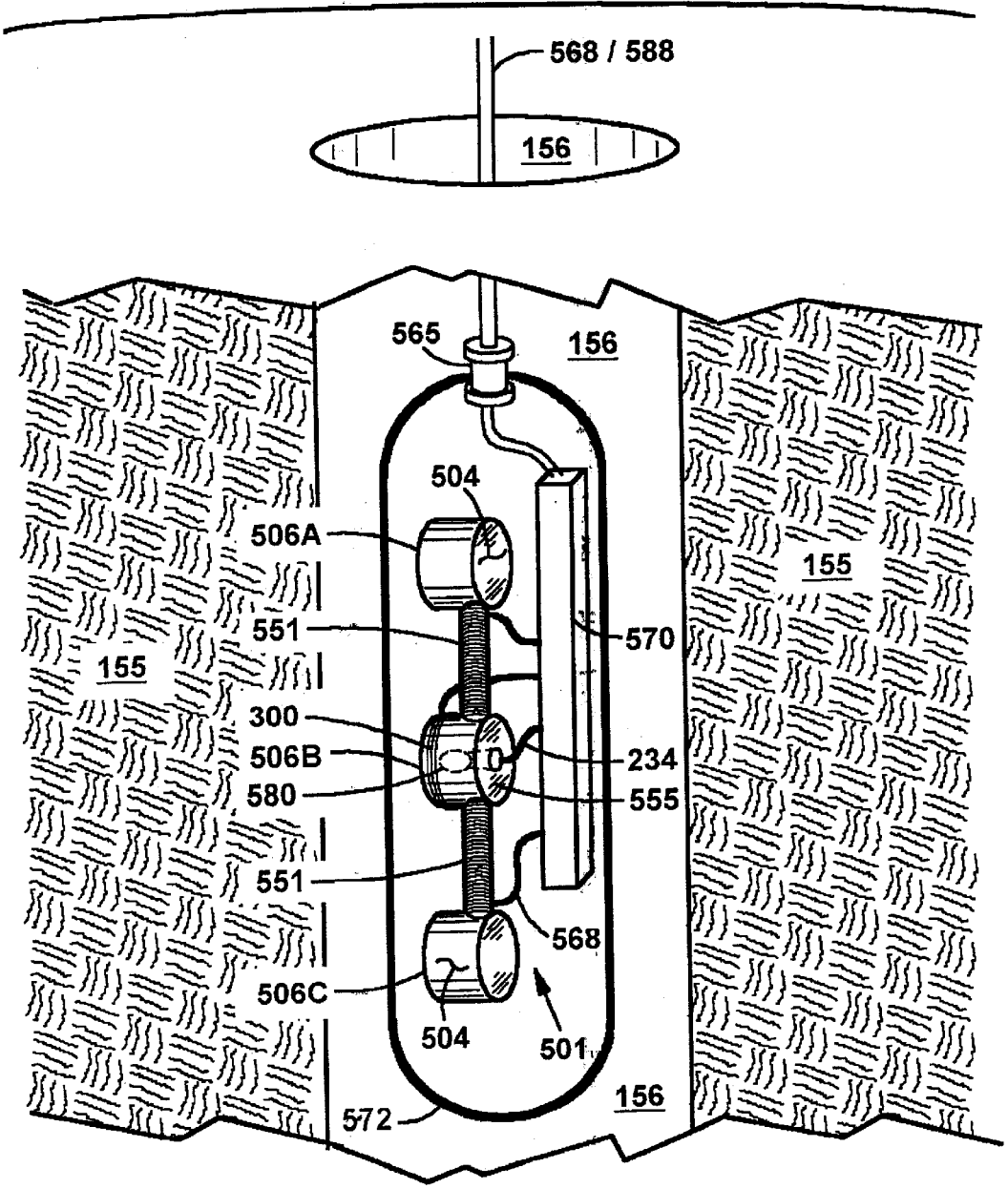
FIG. 3D illustrates a monostatic embodiment of the invention with the electronics contained within an enclosed housing.

FIG. 3D is a cutaway view of the housing depicted in FIG. 3C and shows an embodiment of the apparatus subject of the invention consisting of a monostatic configuration and two separate saturation coils in a single axis. Two like poles 504 are at opposite ends of the magnetic flux generator 501 contained within the housing 572. The electronic components 570 are also shown within the housing with connecting power connection 568 and receiver communication lines 234. A magnetic culminator 555 containing the transmitter and receiver components joins the separate saturation coils. The magnetic culminator 555 contains the transmitter 300 wrapped on the outside diameter with the receiver 580 contained within a cavity in the culminator. The receiver 580 is located on the axis extending orthogonal from the center of the plane formed by the circumference of the transmitter coil 300. The receiver is also geometrically nulled to both the transmitter coil and the saturation coils 551. The antenna, not shown, would be proximate to the surfaces of the saturation core 506A, 506B and 506C.

Figure 3E:
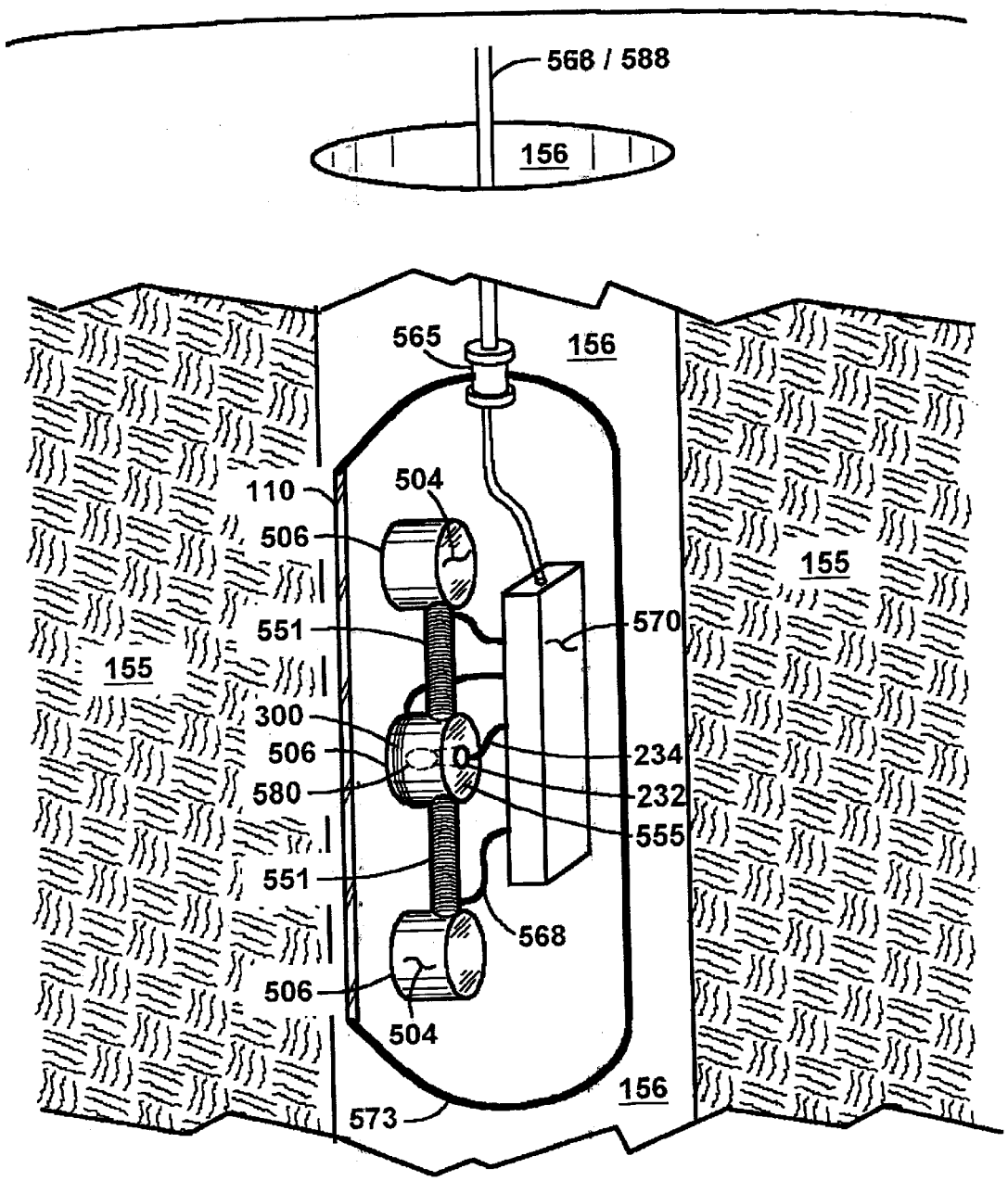
FIG. 3E illustrates another monostatic embodiment of the invention wherein the antenna structure is incorporated as part of the housing wall.

FIG. 3E illustrates another configuration wherein the antenna 100 is incorporated into the wall of the housing 572 and the remainder of the housing comprises a ferromagnetic shield 573. Note that the antenna is proximate to the surface of the magnetic saturation core 506A, 506B and 506C. It will be appreciated that the antenna and magnetic flux generator are not in electrical contact.

Figure 3F:
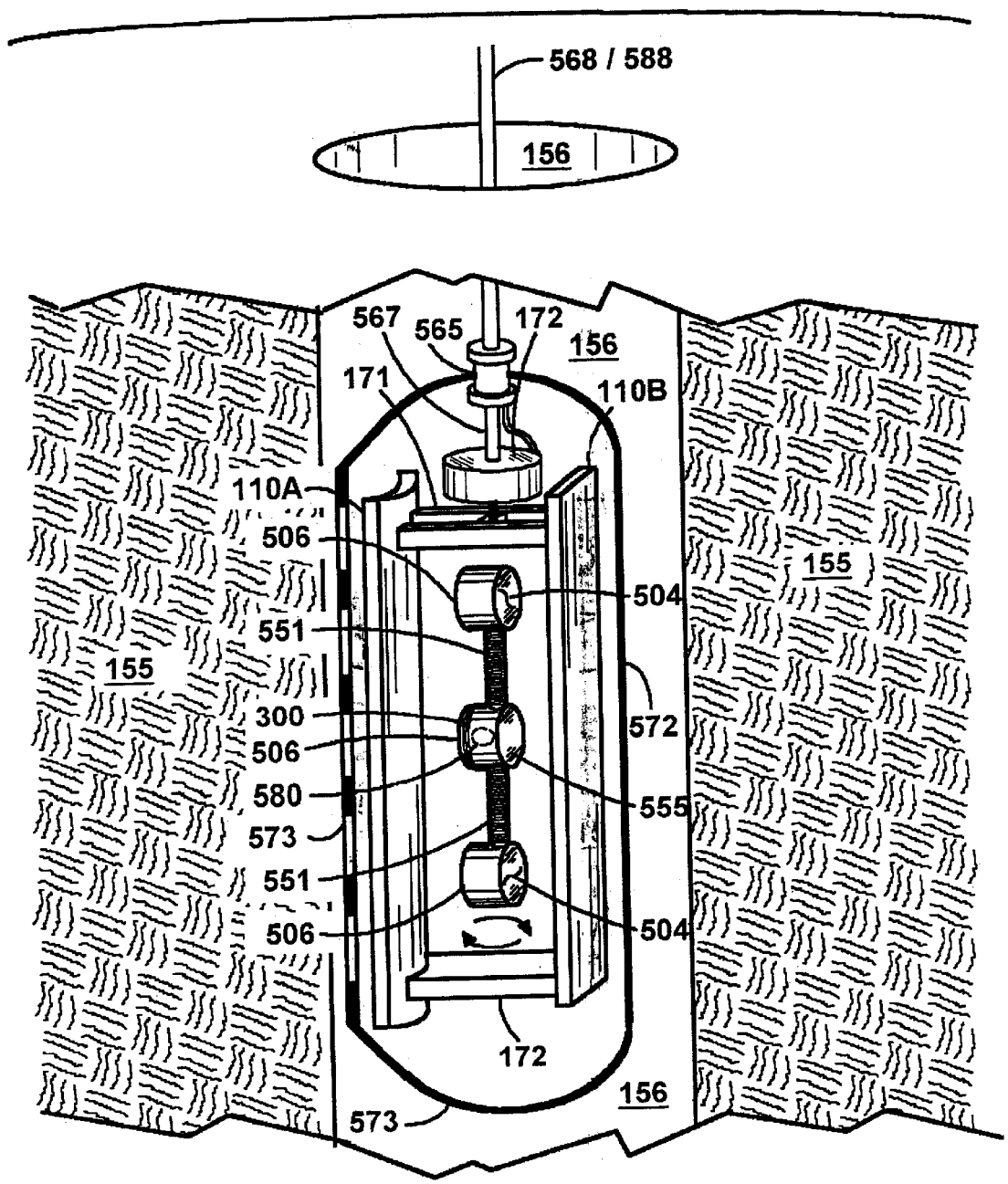
FIG. 3F illustrates another embodiment of the invention wherein two different antennas may be separately and consecutively utilized with the magnetic flux generator.

FIG. 3F illustrates an embodiment of the invention comprising two separate antennas 110A and 110B that may be alternately maneuvered to a desired position proximate to the magnetic flux generator surfaces 506A, 506B and 506C. It is intended that one method of accomplishing this interchange is to rotate the antennas by means of drive mechanism 172 and the attachments 171 and 172 holding the two antennas in a fixed relationship to the other. Note that a portion 571 of the housing 572 is preferably comprised of a non electrically conductive and magnetically permeable material and that other surface areas of the housing may be comprised of a ferromagnetic shield 573. The housing surface area 571 is intended to be located proximate to the surface of the magnetic flux generator 506A, 506B and 506C. It will be appreciated by persons skilled in the art that the magnetic, electrical or geometric properties of the separate antennas may be different in order that different results may be achieved through Magnetic Lensing focus.

Figure 3G:
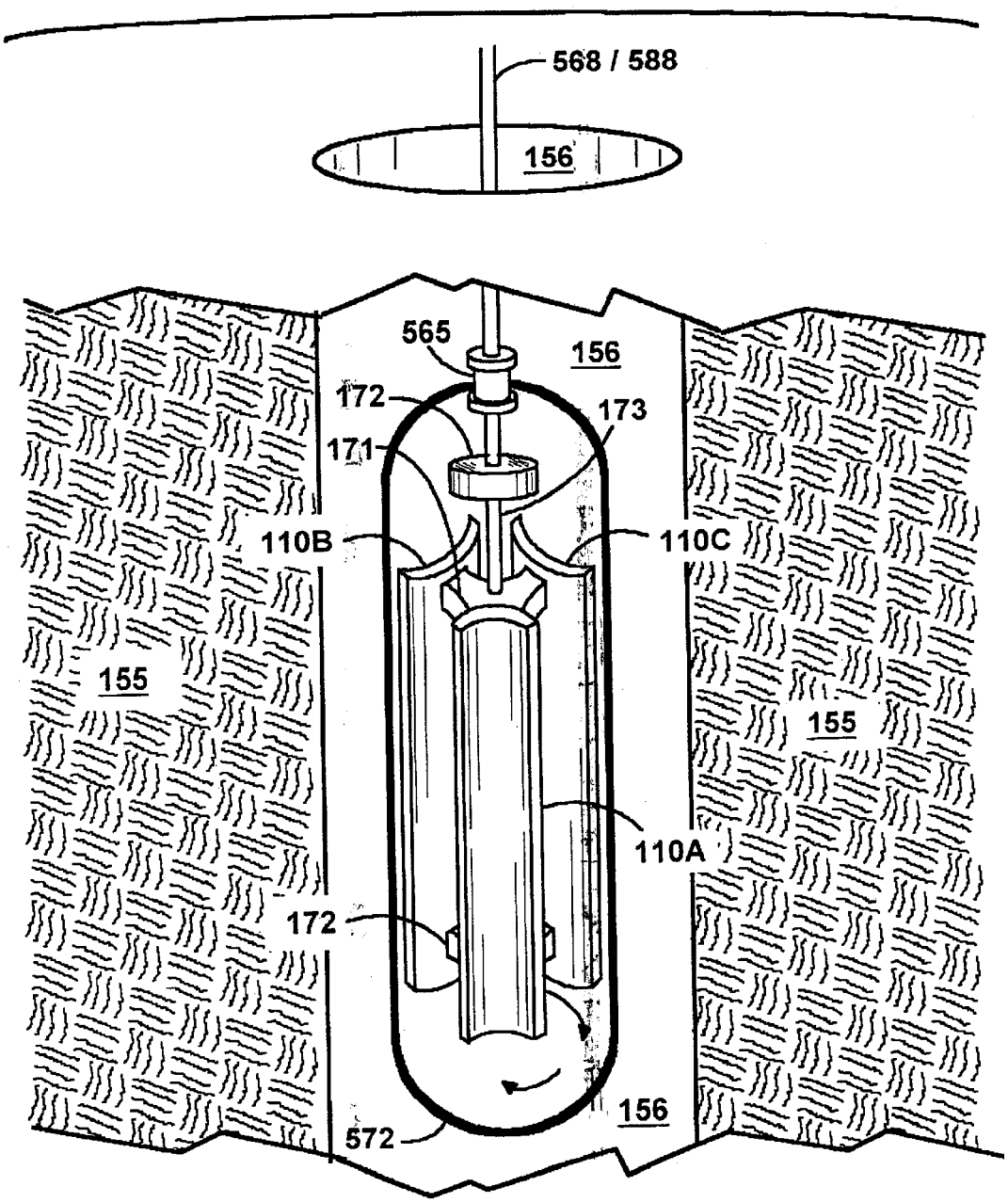
FIG. 3G illustrates another embodiment of the invention wherein three separate antenna structures may be utilized with one or more magnetic flux generators.

FIG. 3G illustrates another embodiment wherein three alternate antennas 110A, 110B and 110C may be alternately placed proximate to the magnetic flux generator (not shown). The antennas can be rotated in a controlled manner by means 172 connected to the shaft 173 extending in the axial length of the housing 572 and attached to the devices 171 and 172 that maintain the several alternate antennas in a fixed relationship to the others.

Figure 3H:
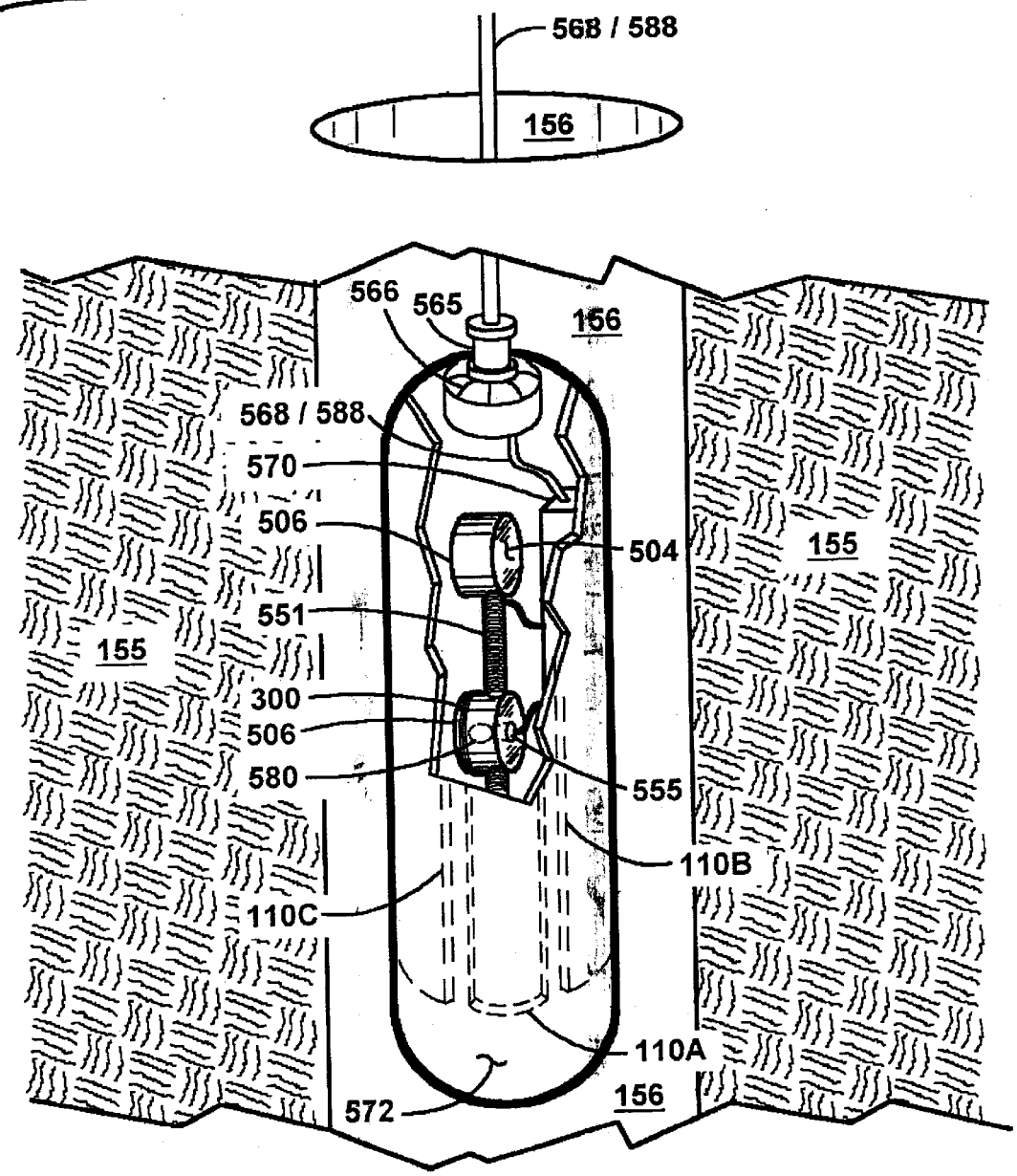
FIG. 3H illustrates another embodiment of the invention wherein separate antenna structures are incorporated into the housing wall enclosing one or more magnetic flux generators and the housing may be rotated on its axis to change the antenna structure engaged with a magnetic flux generator.

FIG. 3H illustrates yet another embodiment whereby the differing antennas 110A, 110B and 110C are incorporated into the wall of the housing 572. The housing itself can be rotated in order that the desired antenna will be placed proximate to the surface of the magnetic flux generator 506A, and 506B. This rotation of the housing is intended to be accomplished by use of a rotation mechanism 566. It will be appreciated by persons skilled in the art that the number and properties of the alternate antenna are not limited to the illustrations contained in the foregoing figures.

In other embodiments, the apparatus can be configured with a plurality of components. For example, multiple receivers could be utilized with one or more transmitters. In other embodiments, one or more receivers could be utilized with separate antenna. In still other embodiments, the apparatus components may be configured in series or parallel. Other embodiments may utilize a plurality independent mobile transmitter and receivers. The apparatus may also be configured with a plurality of housing components interconnected and containing multiple configurations of components, i.e., transmitters, receivers or electronic components. This may facilitate measurements being made in multiple directions or to simultaneously make multiple measurements for increased accuracy, including measurements with multiple frequency or different lensing or transparency configurations.

Figure 4A:
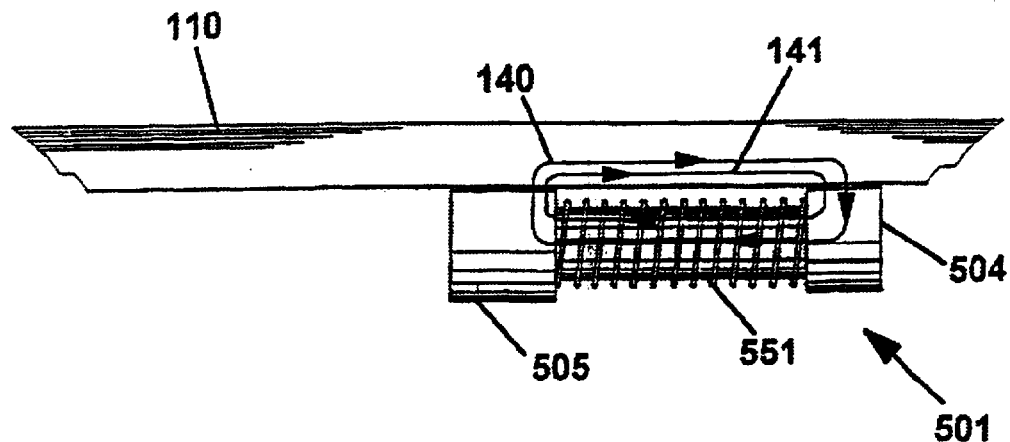
FIG. 4A illustrates a magnetic saturation generator coupling with an antenna.

FIG. 4A is a single axis magnetic saturation generator device 501 that may be utilized as part of the apparatus subject of this invention. The one-dimensional magnetic saturation generator 501 has magnetic flux lines 140 and 141, pole orientations north 505 and south 504. It is of course recognized that the pole orientations may be switched without a change in the subject invention. This saturation flux may engage or couple to the antenna 110. It is also noted that most, if not all of the magnetic flux will shift to the side of the inducer adjacent to the antenna. This is attributable to the high magnetic permeability of the antenna, i.e., ability to absorb magnetic flux. It will be appreciated that as the permeability is reduced, the ability to absorb magnetic flux is diminished.

Figure 4B:
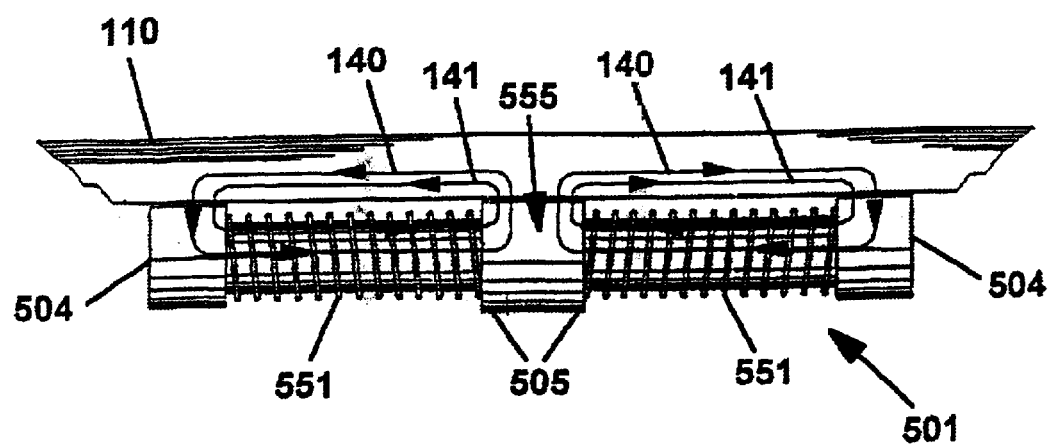
FIG. 4B illustrates a single axis magnetic saturation generator utilizing a magnetic culminator.

FIG. 4B is another embodiment of a single axis magnetic saturation generator 501 but having two cores 551 and south poles 504. The two north poles 505 are combined into a magnetic culminator 555. It will be appreciated by persons skilled in the technology that the culminator must be of sufficient magnetic permeability, mass and geometric configuration in order that no part of it become saturated by the saturation flux or by a combination of the saturation flux and transmitter flux.

FIG. 4C is a two-axial magnetic saturation generator device 500 utilizing a magnetic culminator 555. The two-axial cross-flux magnetic saturation generator is adjacent to the antenna 110. The four like poles 504 are connected to four separate cores 551. The opposing magnetic poles are contained within the mass of the magnetic culminator 555. FIG. 4D is a three-axis magnetic saturation generator device 501 also incorporating a magnetic culminator. The three-axis device is adjacent to the antenna 110.

Figure 5A:
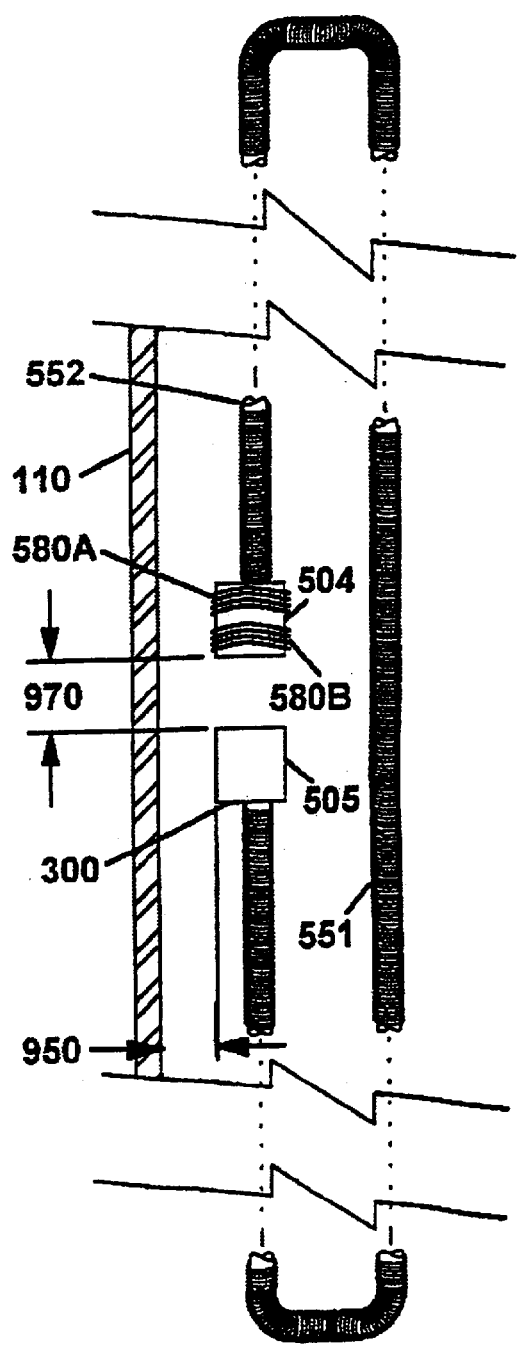
FIGS. 5A and 5B illustrate separate magnetic saturation generators. Each generator is intended to be utilized in conjunction with the other in a bistatic configuration.
Figure 5B:
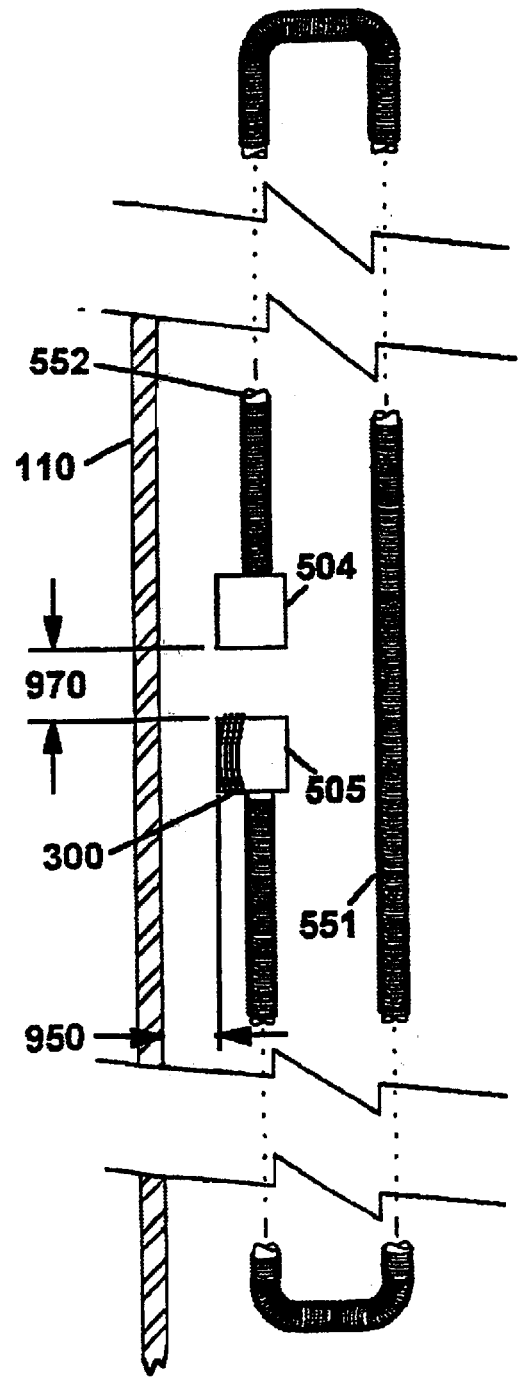

FIG. 5A and FIG. 5B illustrate magnetic saturation generators comprises of elongated coils wrapped upon highly permeable cores. As with the magnetic culminators, the saturation cores must not become saturated by the transparency flux. In regard to FIG. 5A, the complete length of the saturation coils 551 contribute to the magnetic flux generated between the magnetic culminator 555 and each South Pole 504. Similarly, for the configuration illustrated in FIG. 5B, the complete length of the saturation coil 551 contributes to the quantity of magnetic flux (flux density) existing between the South pole 504 and North pole 505. This is important since the length of the coils can greatly exceed the space 970 between the magnetic poles. It has been found that electromagnetic coils wrapped on a core for at least a distance of up to 100 diameters of the core diameter still contribute to the pole strength and the amount of magnetic flux existing between the two magnetic poles.

Figure 5C:
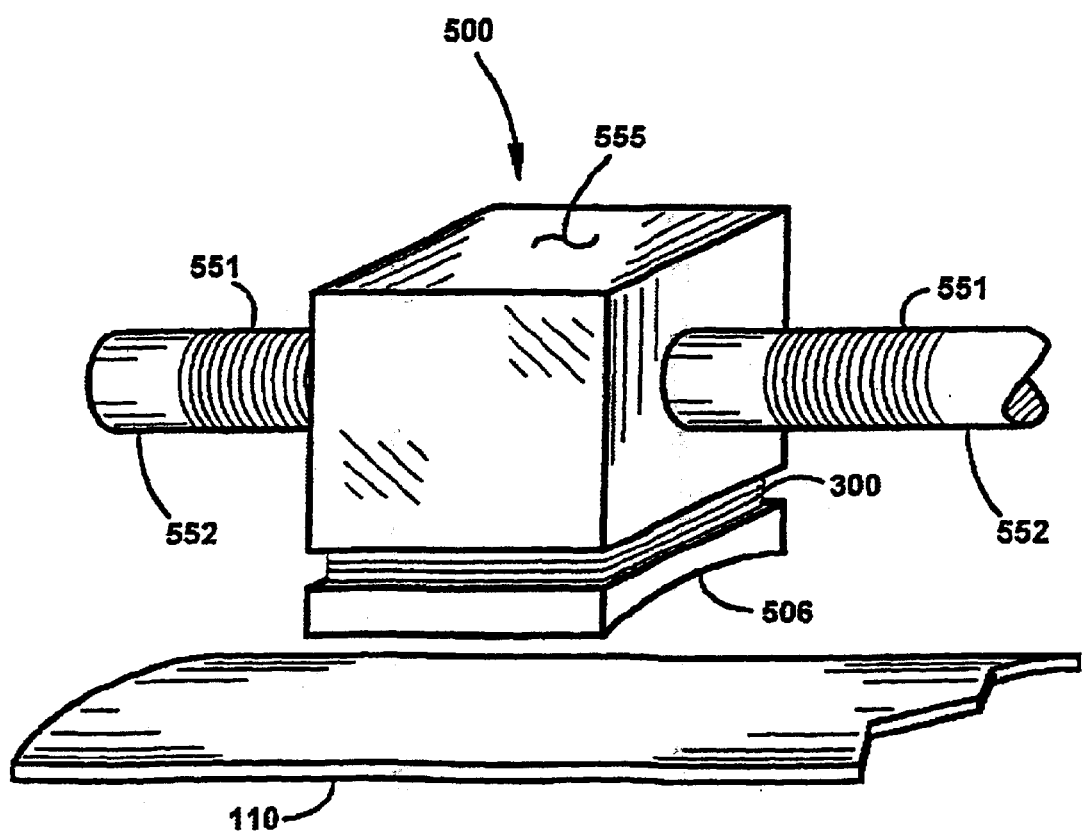
FIGS. 5C and 5D illustrate magnetic saturation generators, each incorporating culminators, that are intended to be utilized together in a bistatic configuration.
Figure 5D:
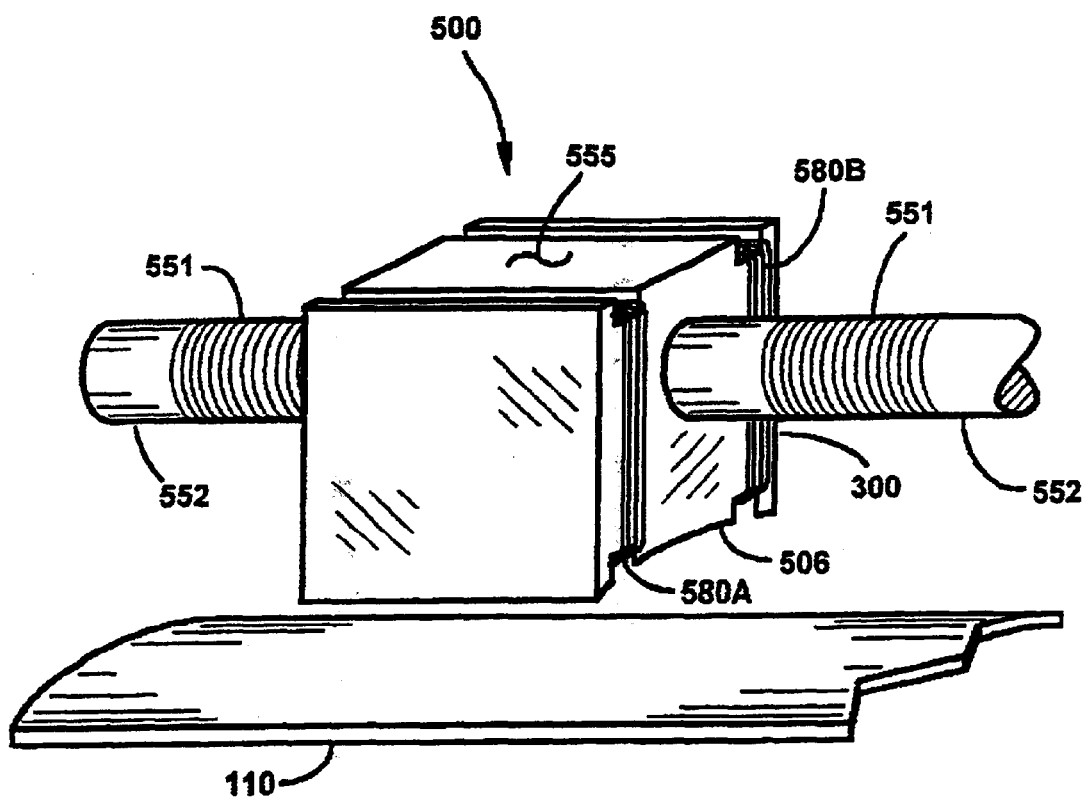

FIGS. 5C and 5D illustrate transmitter 300 and receiver 580 components incorporated into the separate magnetic culminators 555 of two separate magnetic flux generators 501. In an apparatus consisting of the combined components illustrated in FIGS. 5C and 5D, the saturation coils 551, transmitter 300 and receiver 580 are each nulled 90° to the other. This may be used to facilitate the nulling of flux. In FIG. 5D the two receivers 580A and 580B are also wound opposite to the other to electrically null the receiver from the transmitter. Note also the relationship of the surface 506 of the culminator 555 and the antenna 110. Note further FIGS. 5C and 5D depict the same antenna 110 extending between the separate culminators. This illustrates a bistatic configuration. Note that the separate saturation flux generators allows control of the level of partial saturation of the proximate to the transmitter or receiver.

Figure 5E:
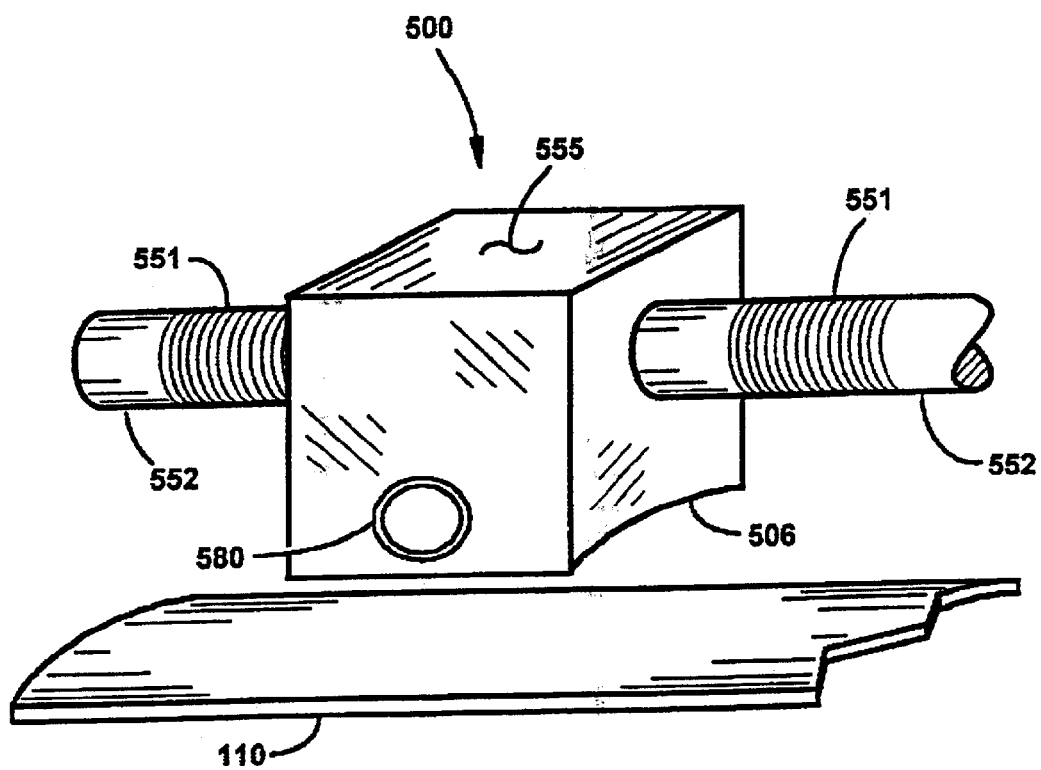
FIG. 5E illustrates an alternate embodiment of the component illustrated in FIG. 5D.

FIG. 5E illustrates a magnetic culminator 555 that incorporates a single receiver 580. One face 506 of the magnetic culminator is designed to conform to the concave interior surface of the antenna 110.

Figure 5F:
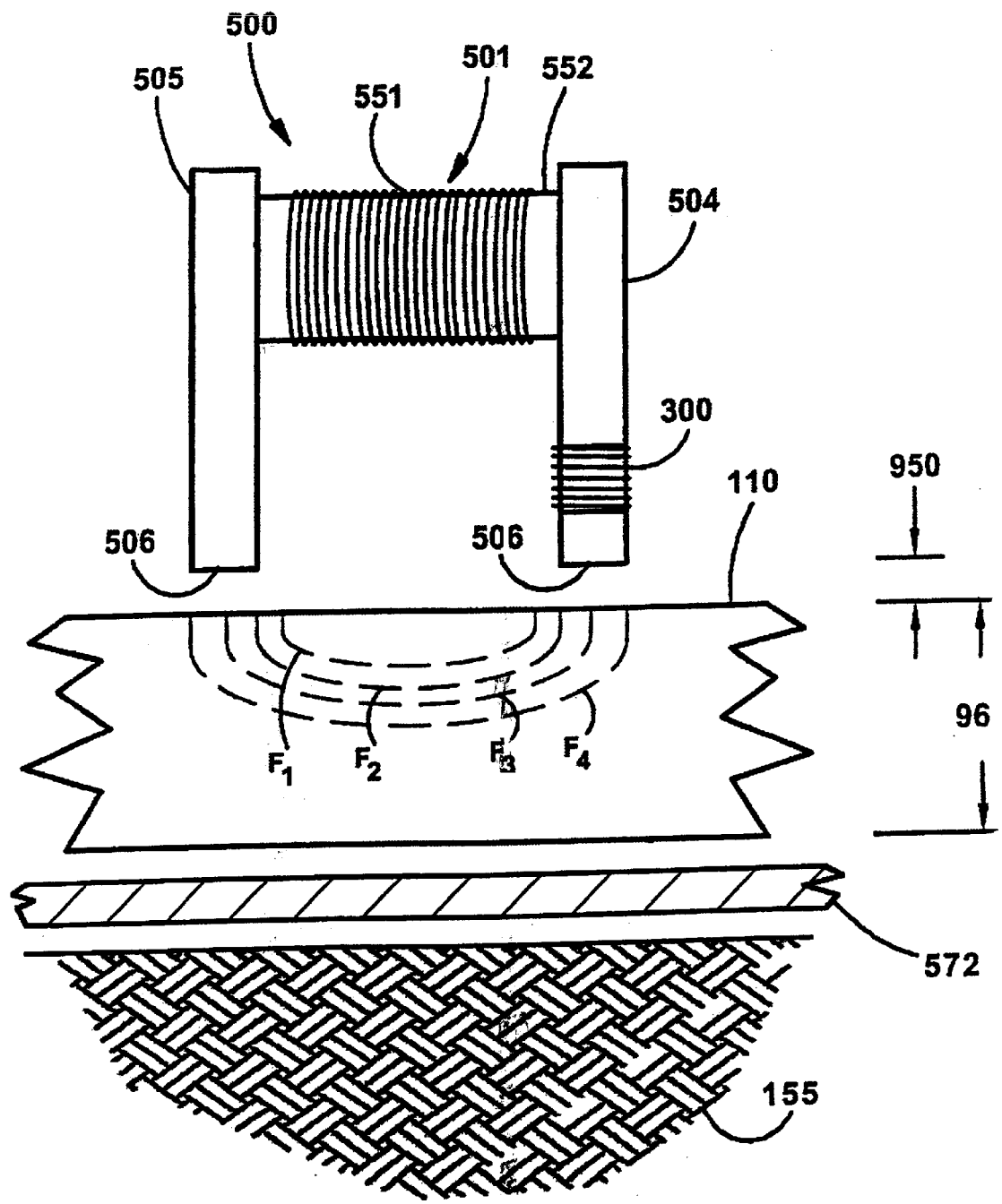
FIGS. 5F and 5G illustrate another embodiment of separate magnetic saturation generators intended to be utilized together in a bistatic arrangement.
Figure 5G:
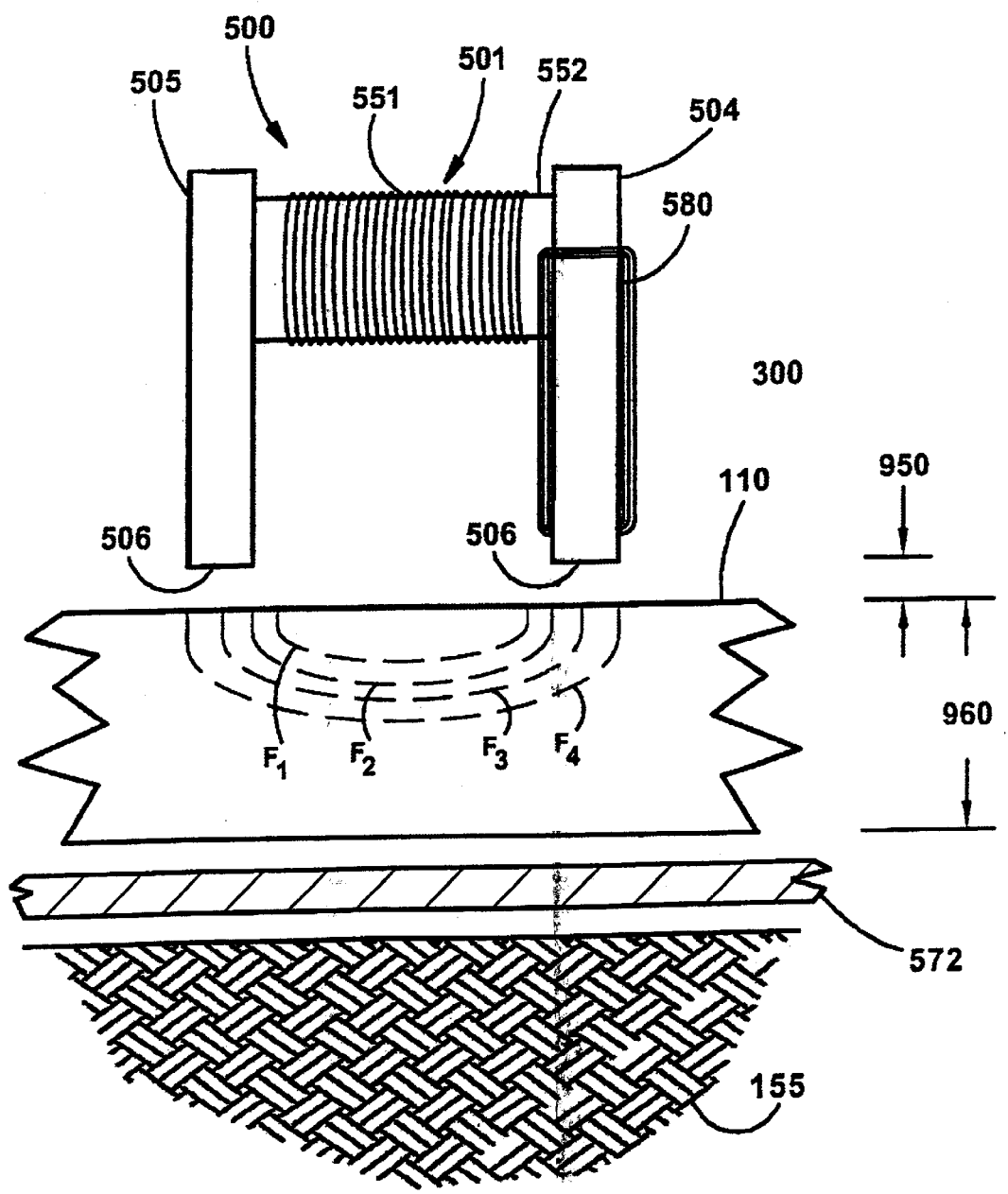

FIGS. 5F and 5G together illustrates a bistatic configuration with a separate saturation flux generator 501—transmitter 300 arrangement and separate saturation flux generator 501—receiver 580 arrangement. It will be noted that this configuration does not utilize a magnetic culminator. FIGS. 5F and 5G also illustrate the saturation flux lines F1 through F4 engaged with the antenna 110. The surface ends 506 of each pole 504 and 505 may be curved to conform to the interior curvature, if any, of the antenna 110. The gap or spacing 950 between the surface ends 506 of the apparatus prevent an electric current between the apparatus and the antenna. FIGS. 5F and 5G also illustrate the relationship or position of the of the magnetic flux generators 501, transmitter 300, receiver 580, antenna 110 and housing wall 572 to the surrounding geologic formation 155. It will be appreciated that the antenna 110 may be combined as one element of the housing 572.

Figure 6A:
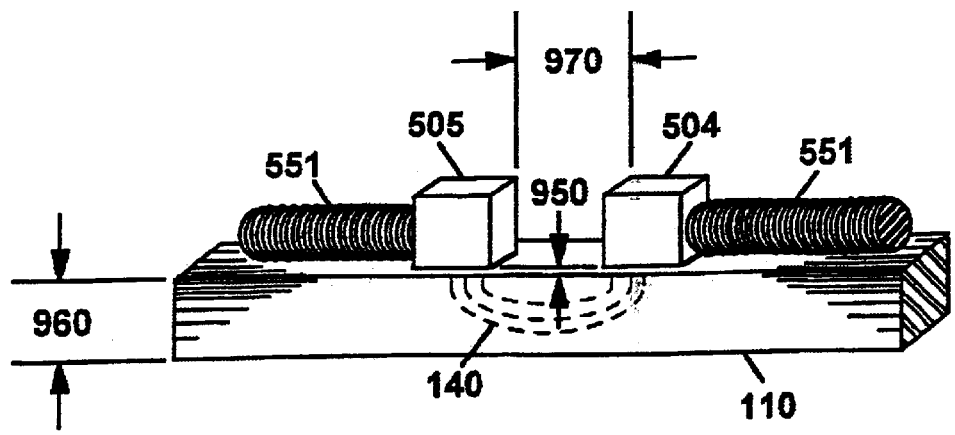
FIGS. 6A, 6B and 6C illustrate alternate magnetic flux coupling mechanisms.
Figure 6B:
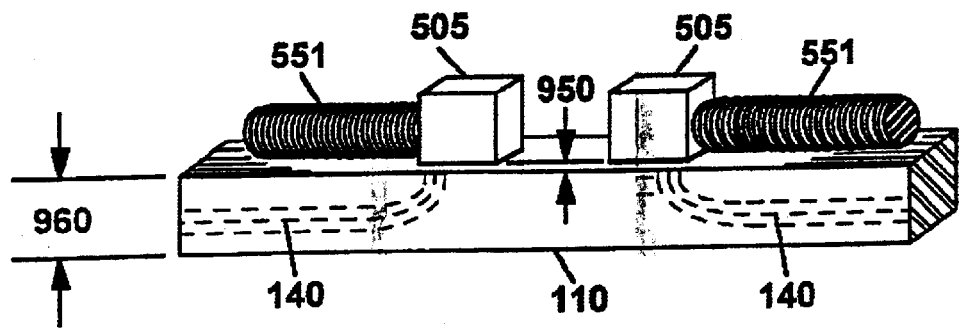
Figure 6C:
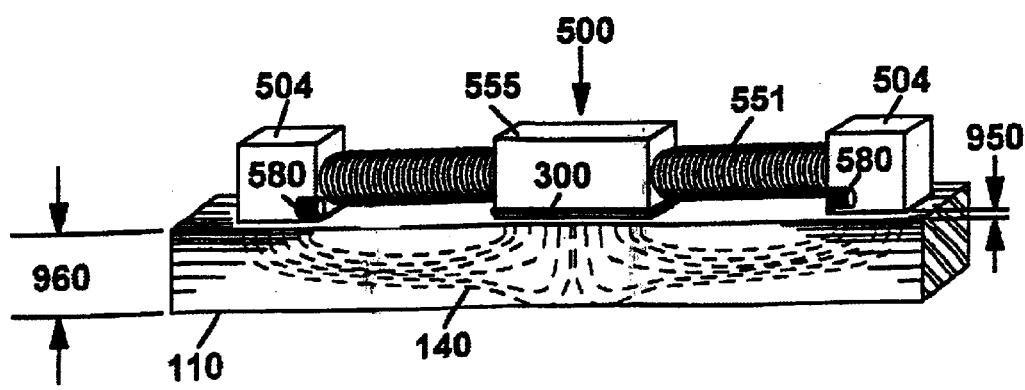

FIGS. 6A, 6B and 6C show the geometry of the saturation flux 140 engaging the antenna 110. FIG. 6C illustrates a configuration with the transmitter 300, wound around the magnetic culminator 555, is more centrally located in relation to the magnetic flux lines engaging or penetrating the greatest distance into the depth 975 of the antenna 110. In FIG. 6B, two opposing South poles are brought together or in close proximity between two North poles. The magnetic flux field lines emitted from the opposing South poles push the flux field out into the antenna 110. However a large unsaturated volume region remains.

FIG. 6C shows the use of the magnetic culminator 555 containing two like poles 505. It has already been demonstrated that multiple like poles may be combined into a single magnetic culminator. Note that the magnetic flux lines bulge, facilitating the saturation of the thickness 960 of the antenna. This results in the location being well suited for placement of a transmitter 300. Note that the apparatus is not in contact with the antenna as shown by the gap 950.

It has also been found that enhanced magnetic coupling, i.e., penetration of the antenna 110 by the saturation flux without total flux saturation, is achieved utilizing this magnetic saturation generator configuration 501. In this case, coupling allows more energy to be transferred to the antenna 110 from the magnetic saturation generator 500.

Moreover, it is a goal of the invention to minimize the energy needed to achieve the selected level of partial saturation. For the configuration illustrated in FIG. 6A, the spacing between the two unlike poles 970, however, is limited by the thickness of the antenna 960. Therefore, if the material is "T" inches thick 960, to at least partially saturate all the way through the antenna the spacing 970 between the two poles 504 and 505 must be at least "T" inches apart in the simple configuration shown in FIG. 6A. However by "bucking" the poles, the same "T" inches depth of penetration may be achieved but with less than "T" inches separation between like poles. The benefit of minimizing the distances between the poles is that less energy, i.e., amp turns are required for partial or full saturation of the thickness of the subtended antenna. Oscillating transmitter flux, particularly higher frequency flux, can penetrate into the antenna at this location and thereby generate the eddy currents.

Figure 7:
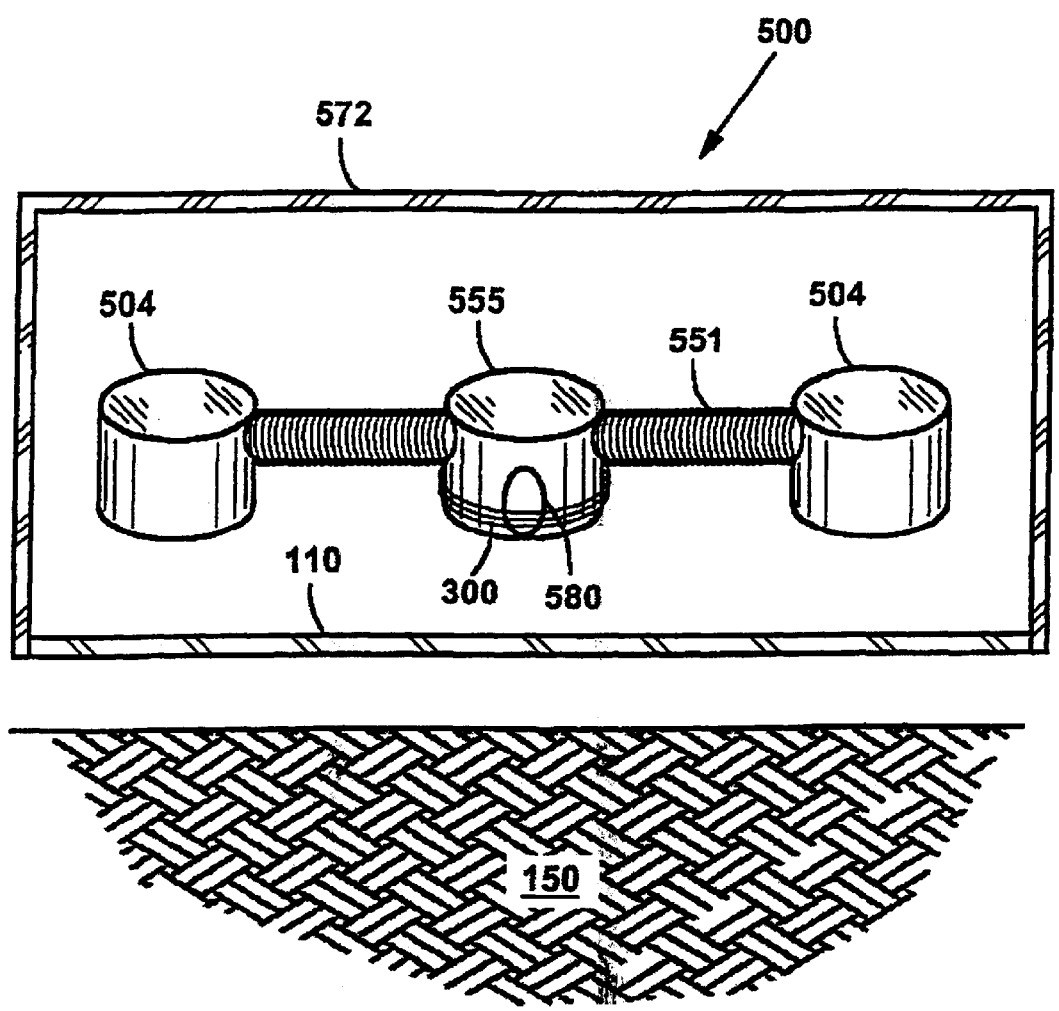
FIG. 7 illustrates an embodiment of the apparatus subject of the present invention utilizing a monostatic configuration.

If very long distances are to be measured outside and away from the antenna, then it may be advantageous if the transmitter and receiver are positioned in a bistatic array, i.e., each located within or in conjunction with separate magnetic saturation generators. This facilitates nulling and reduces the energy requirements. However, a monostatic configuration can be used to obtain measurement by nesting the nulled receiver inside the transmitter coil 300. This configuration is shown in FIG. 7. In FIG. 7, the area of the antenna subject to the greatest concentration of saturation flux is a function of the transmitter coil diameter. For the above reasons, FIG. 7 illustrates a preferred embodiment of the invention, allowing compact size, decreased mass and energy consumption, and enhanced accuracy.

As the number, diameter and length of the coil increases, the mass and the permeability of the magnetic culminator must also increase in order to achieve the concentration of magnetic flux energy of the saturation flux. It will be appreciated that the antenna also may have to be modified to prevent the antenna going into total saturation. It will also be appreciated that neither the magnetic culminator nor any other component of the magnetic flux generator is in electrical contact with the antenna.

Figure 9A:
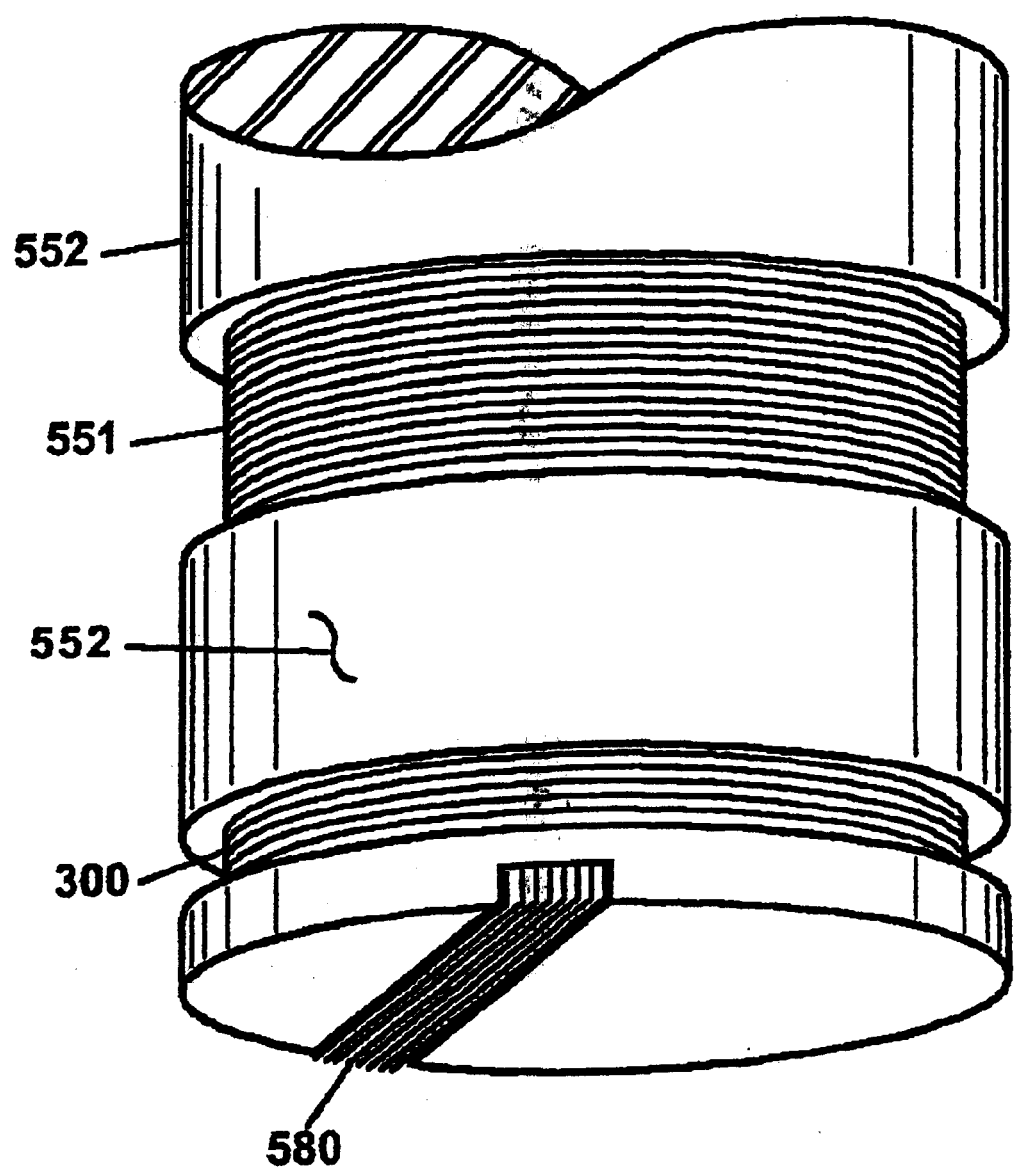
FIG. 9A illustrates a saturation core containing both a receiver and transmitter.

FIG. 9A illustrates an embodiment of the invention wherein the saturation coil 551 and the transmitter coil 300 are separately wrapped around the same flux circuit core 552. A receiver coil 580 is wrapped orthogonal to the transmitter coil. The Flux Circuit core is a simple cylindrical shape with both the saturation coil 551 and the transmitter coil wrapped in parallel around the axis of the saturation core 552. Since the saturation coil 551 and transmitter coil 300 have the same diameter, they will have the same magnetic moment (amp turns/meter) arms. This enhances the efficiency of the apparatus since the percentage of transmitter flux engaging with and permeating into the antenna in enhance.

Figure 9B:
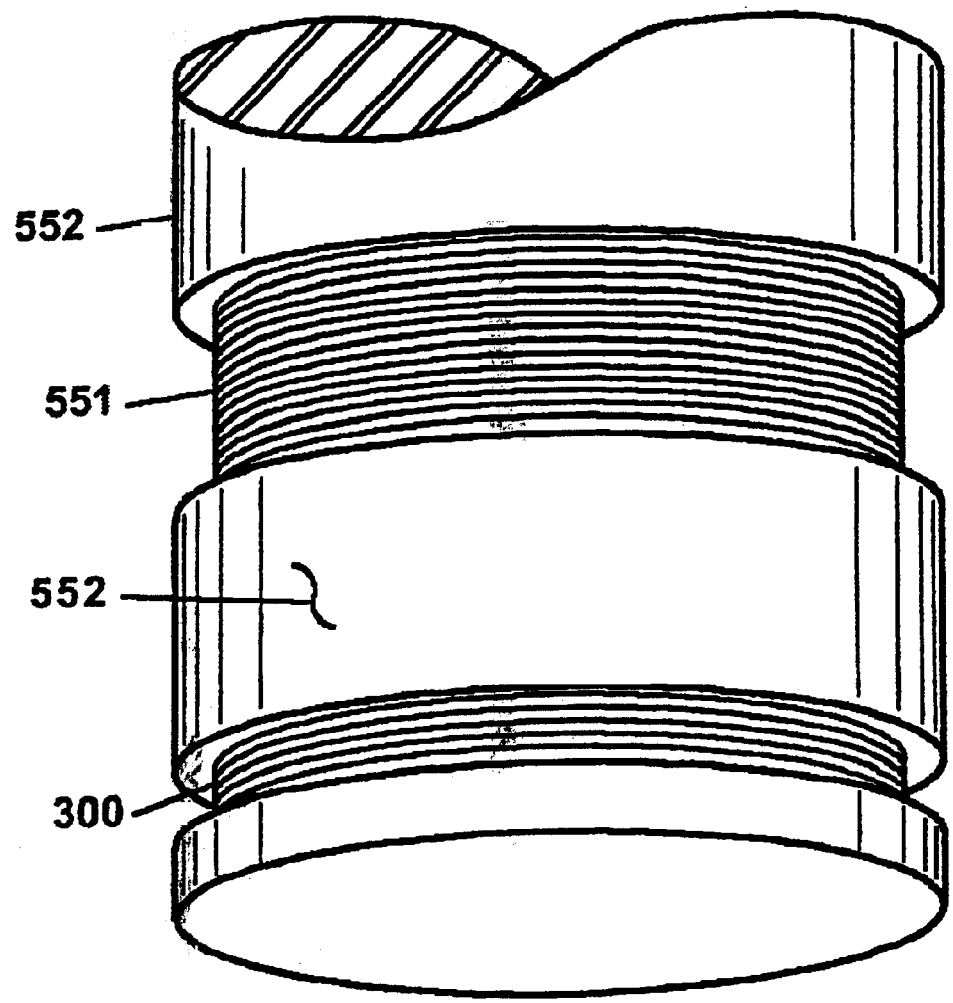
FIG. 9B illustrates a saturation core containing a transmitter.
Figure 9C:
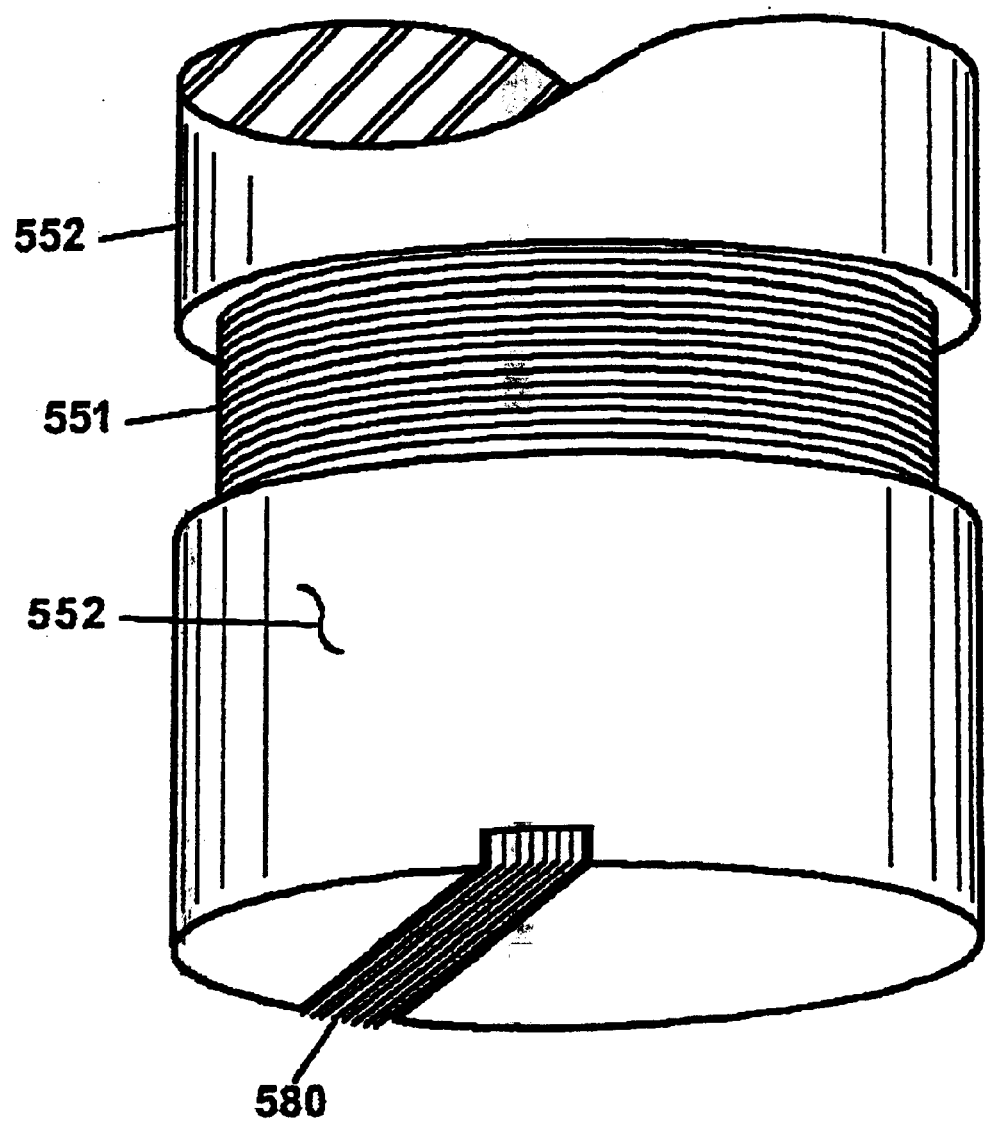
FIG. 9C illustrates a saturation core containing a receiver.

FIGS. 9B and 9C illustrate the saturation core of 9A modified for a bistatic configuration. For the reasons stated previously, it will be appreciated that the saturation flux can not be allowed to saturate the saturation core 552. Further, the transmitter flux will generate eddy currents in the flux circuit core. Further it will be appreciated by persons skilled in the art that the greatest saturation will occur along the circumference of the saturation core in as much as the permeability of the near saturated or partially saturated flux circuit core will be lowest at the circumference, i.e., edge of the cylinder. Since the permeability of the saturation core, comprising a barrier material, will approach the permeability of air, the angle of refraction of the magnetic flux (not shown) induced by the eddy current within the saturation core will increase from the perpendicular. It will be further appreciated that this configuration has created or utilized Magnetic Lensing focus capacity within the magnetic saturation generator. This configuration also is a preferred embodiment due to its compact size, energy efficiency, accuracy of measurement and ability to utilize Magnetic Lensing focus. FIGS. 9B and 9C, viewed in combination, also illustrate the placement of a receiver coil 580 nulled to the transmitter coil 300.

Figure 10A:
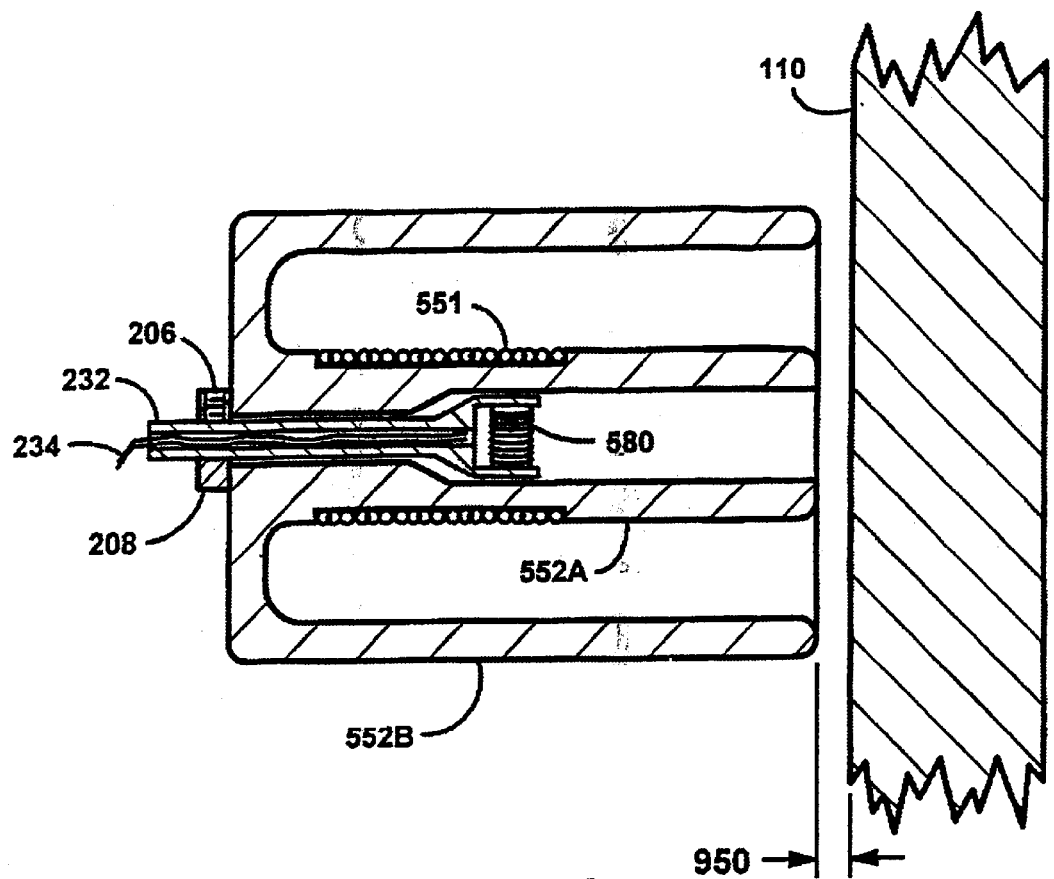
FIG. 10A illustrates a cross sectional view of the two-part saturation core containing a saturation coil and adjustable nested receiver coil.
Figure 10:
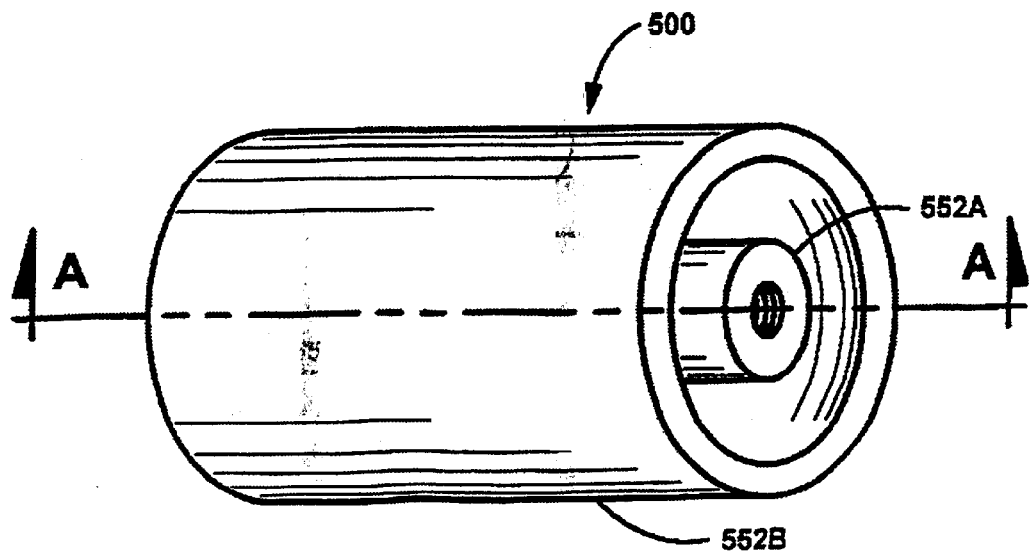
FIG. 10 illustrates a two-part saturation core.

FIG. 10 illustrates another embodiment of the invention 500 used in conjunction with a two part saturation generator to create the necessary partially saturated area in the antenna (not shown) to practice the present invention. The saturation core comprises an outer cylindrical portion 552B and an inner cylindrical portion 552B. The saturation coil and one or both of the transmitter and receiver coils are disposed on, in or around the outer cylindrical portion 552B and the inner cylindrical portion 552A.

FIG. 10A illustrates an embodiment of an apparatus 500 used to partially saturate the antenna 110 for practicing the present invention as may be adapted in FIG. 10. A transmitter coil 300 is disposed at the remote end of the outside diameter of the inner cylindrical portion 552B of the saturation core. A saturation coil 551 is disposed on the inner end of the outside diameter of the inner cylindrical portion 552A of the saturation core. A receiver coil 580 is disposed within the inside diameter of the inner cylindrical portion 552A of the core. The receiver coil 580 can be located at different positions using a shaft 232 which telescopes within the inside diameter of the inner cylindrical portion 552A of the saturation core. The telescoping shaft 232 can also rotate using a setscrew adjustment 206 and a setscrew housing 208. The positioning of the receiver coil may also be remotely operated. Also, wiring 234 can be channeled through the shaft 232.

Figure 10B:
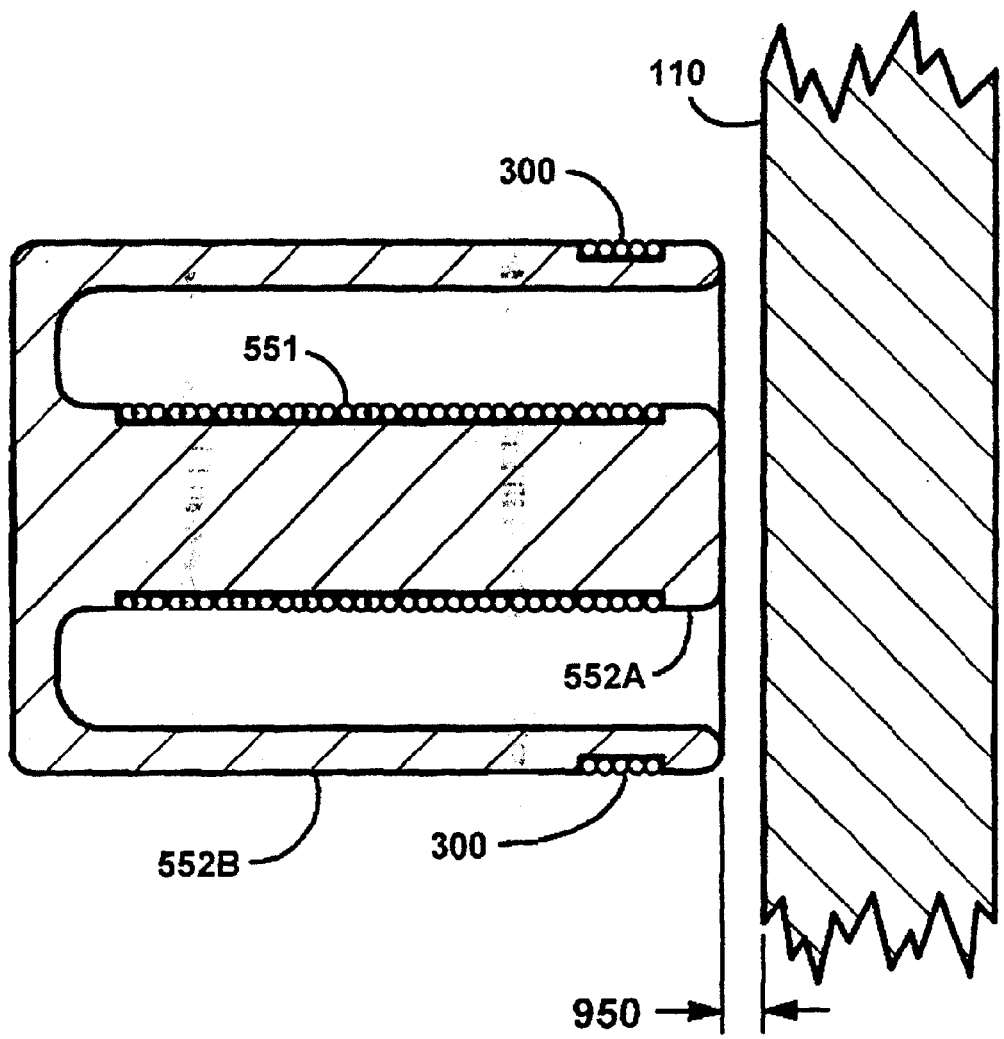
FIG. 10B illustrates a cross sectional view of the two-part saturation core containing a saturation coil and transmitter coil.

FIG. 10B illustrates the counter part component of FIG. 10A used for practicing the present invention in a bistatic arrangement as may be adapted in FIG. 10. A transmitter coil 300 is disposed at the remote end of the outside diameter of the outer cylindrical portion 552B of the saturation core. A saturation coil 551 is disposed along the outside diameter of the inner cylindrical portion 552A of the saturation core.

Figure 10C:
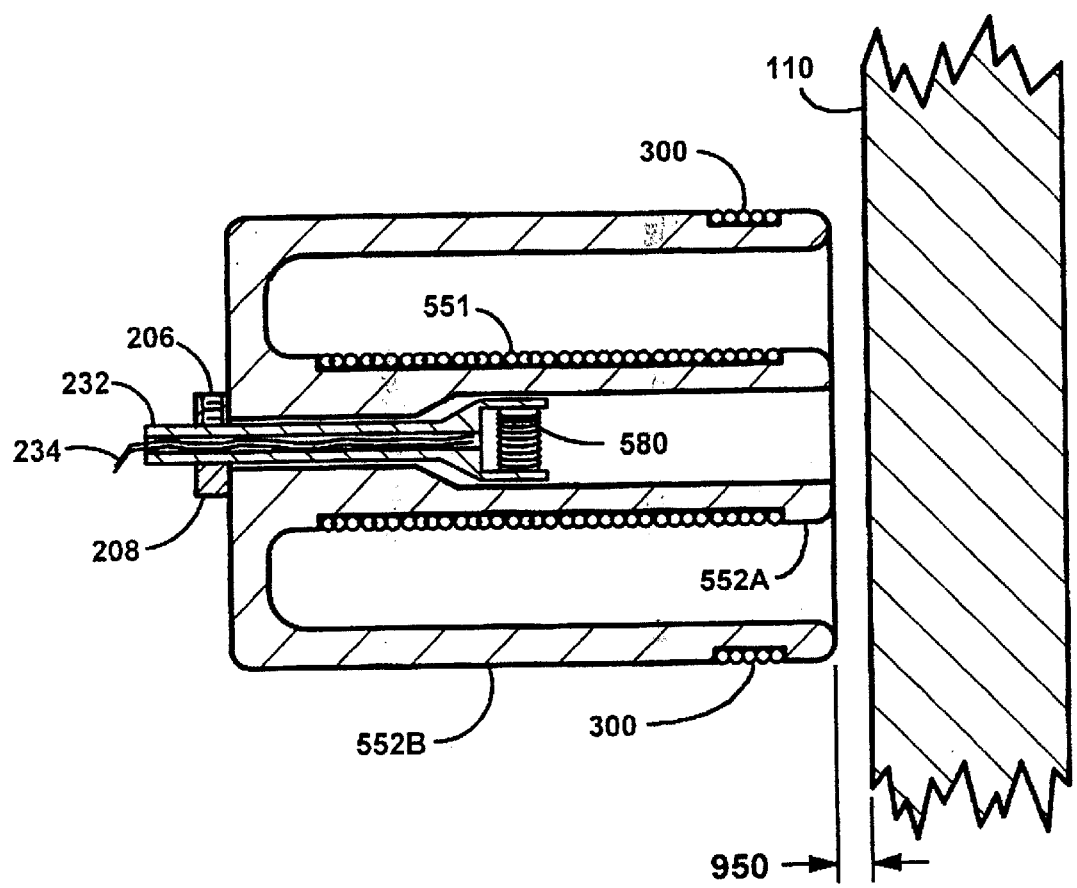
FIG. 10C illustrates the cross sectional view two part saturation core containing a saturation coil, transmitter coil and adjustable receiver coil nulled to the saturation and transmitter coil.
Figure 10D:
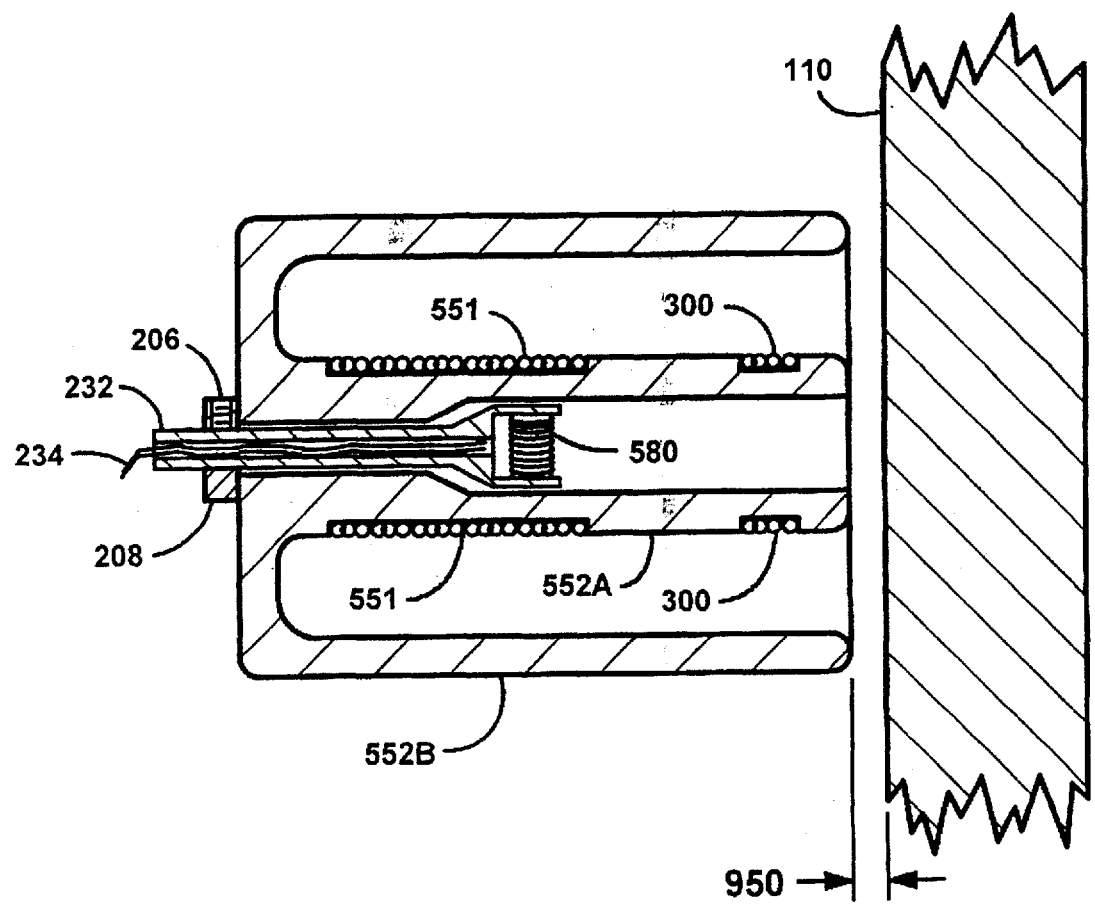
FIG. 10D illustrates an alternate embodiment of the saturation core of FIG. 10C.

FIGS. 10C and 10D illustrate comparable monostatic configurations.

Figure 11:
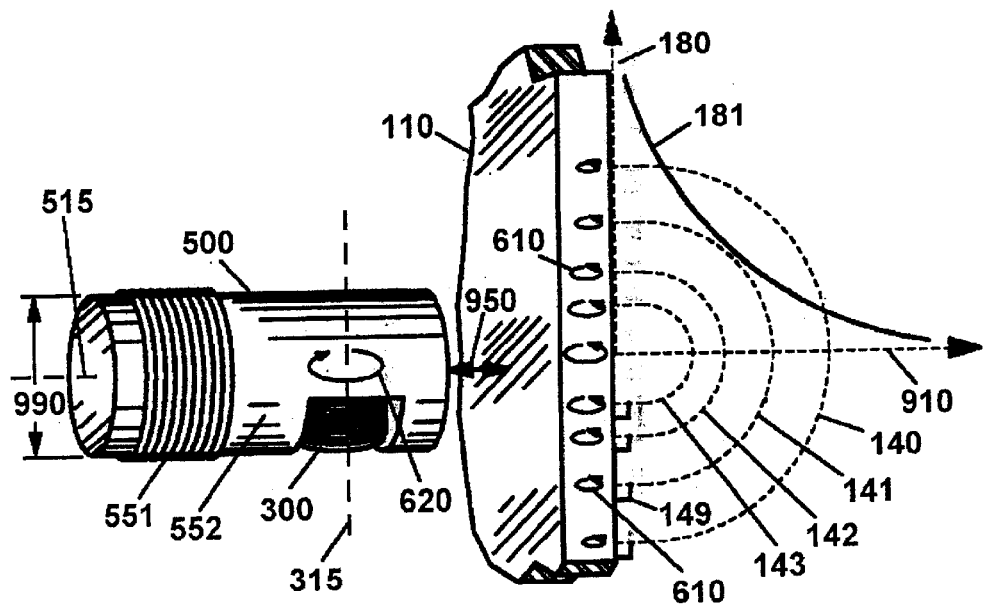
FIGS. 11, 12, 13A, 13B, 14A and 14B illustrate embodiments of Magnetic Lensing focus.

FIG. 11 illustrates a saturation core 552 is axially wrapped with insulated wire, forming a saturation coil 551, to create a powerful low frequency or dc magnetic field along the longitudinal 515 axis of the core 552. The saturation core is comprised of an EM barrier, i.e., a ferromagnetic metal or other highly magnetically permeable material, used so that the magnetic flux created by the saturation coil does not disperse. "Low" frequency is defined by relationship to the frequency of the transmitter flux wavelengths needed to make a measurement, e.g., if ten wavelengths are needed for the measurement, then the low frequency must be a least 1/10 of the frequency of the transmitter flux.

Figure 12:
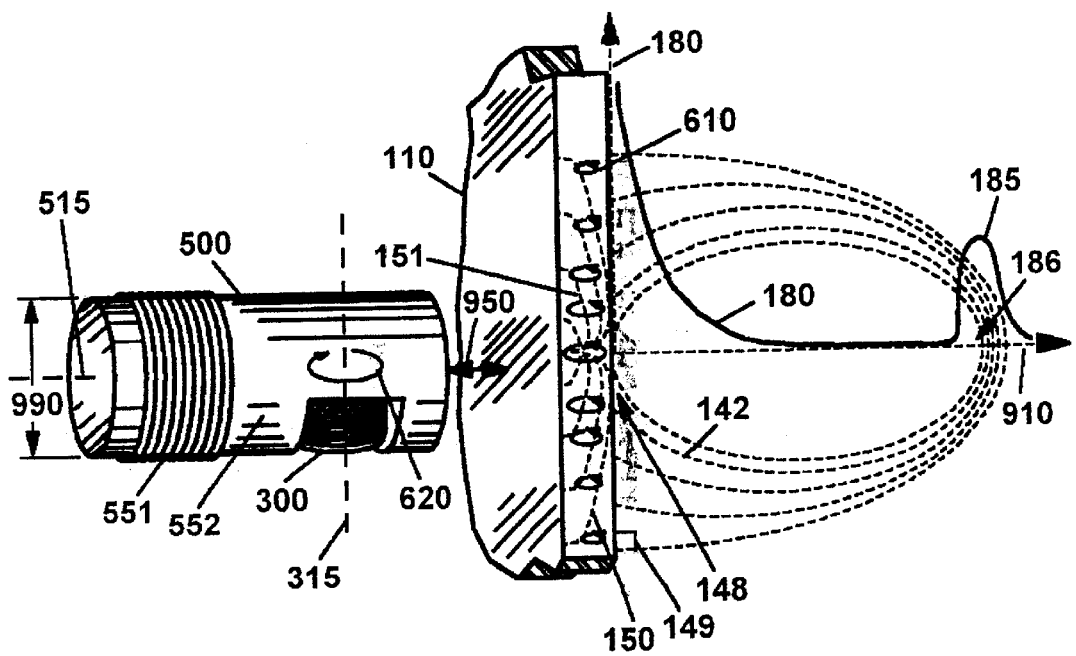

FIG. 12 shows an embodiment of the invention wherein a separate transmitter 300 wrapped such that the eddy currents 620 generated in the core have an axis 315 perpendicular to the axis 515 of the cylinder radius core 552. This core is then placed in some gap or distance 950 to the antenna 110. The optimum size of the gap 950 between the core 552 and the antenna 110 is proportional to the magnetic moment of the transmitter/saturation core diameter 990 and any lensing derived from the surface of the core 552 by the transmitter flux being focused by the saturation flux.

As previously mentioned, when a gap is present, e.g., insulation causing the space between the saturation core 552 and antenna 110, the wrapping of the transmitter 300 on the core 552 utilizes this gap to create the Magnetic Lensing effect at the surface of the saturation core, analogous to the Lensing that can be created at the antenna surface using partial saturation. This Magnetic Lensing focus counteracts the decreasing transmitter flux, i.e., the decrease in the transmitter flux density as the distance from the transmitter or saturation core increases. The rate of this decrease in transmitter flux density is the inverse cube of the gap distance between the saturation core interface to the antenna. This is illustrated by the relationship of magnetic flux intensity decreasing to zero as the inverse cubed of the distance (D) 950 away from the surface, i.e., Intensity Plot=$1/D^3$. Note that in this example, the transmitter is located on the saturation core. It will be appreciated by persons skilled in the art that the saturation core concentrates the transmitter flux. It will be appreciated that a ferromagnetic material or other electrically conductive and magnetically permeable material ("EM barrier") is used for the Magnetic Lensing component.

As illustrated in FIG. 11, there is less lensing in the gap 950 and on the antenna 110 due to the limited penetration of the transmitter flux into the unsaturated core 552. However, the eddy current generated within the antenna by the low frequency transmitter flux will also induce oscillating magnetic flux. The transmitter 300 induced eddy currents 610 in the antenna 110 are shown in FIG. 11. The resulting magnetic flux lines 140, 141, 142 and 143 generated from these electrical eddy currents inside the antenna are shown in FIG. 11 intersecting the antenna surface perpendicularly 149.

FIG. 12 depicts the change caused by the activation of the saturating coil 551. In this embodiment, as shown in FIG. 11 and FIG. 12, the transmitter 300 is a separate coil from the saturation coil 551. It is also assumed that the saturation flux is either dc generated or has frequency much less than the oscillating transmitter flux. The magnetic flux field lines 150 of this constant or low frequency magnetic saturation flux are shown within the antenna 110. This constant or low frequency magnetic flux lowers the permeability of the antenna. The region of greatest influence of the magnetic flux of the saturation core 552 is shown near the surface of the antenna 110 proximate to the saturation core and decreasing into the antenna. As the permeability of the antenna is reduced by the increasing magnetic saturation from the saturation flux, the transmitter flux lines begin to change their surface angle of impingement away from the perpendicular. It can be readily appreciated that the impingement angle 148 at the surface will be the limited to the flux angle that would exist if the antenna were not present. This limit is approached as the permeability of the antenna approaches unity with the permeability of the matter or media in the gap or space, e.g., air, adjacent to the antenna. This changed impingement angle is shown in FIG. 12 near the region of the core's greatest influence in having reduced the permeability on the antenna. Further away radially from the saturation core, the magnetic flux lines again impinge perpendicularly to the antenna surface 149.

Also shown in FIG. 12 is a plot 180 of the resulting flux intensity variation along the centerline 910. This shows an intensity spike 185 due to the concentration of the induced flux at some fixed distance away from the antenna surface. This flux field concentration is the same effect as would be obtained from an optical "lens" and is termed "Magnetic Lens" effect. The distance away from the EM barrier plate at which these flux lines are concentrated is called the "magnetic focal length." The place these flux lines are focused is called the "magnetic focal point" 186. This focal point may be moved toward or away from the barrier material 110 by reducing or increasing the magnetic moment of the transmitter and the transparency coil or the geometry of the magnetic fields in the metal plate.

It will be appreciated that there is another embodiment wherein the transmitter coil is superimposed electronically on the coupling saturation coil. There are separate advantages to this configuration and the configurations shown in FIGS. 11, 12, etc. When limited by physical and power constraints, it is advantageous to utilize the configuration wherein the saturation coils and transmitter coils are physically separated but magnetically coupled. Both configurations are claimed as part of this invention.

Figure 13A:
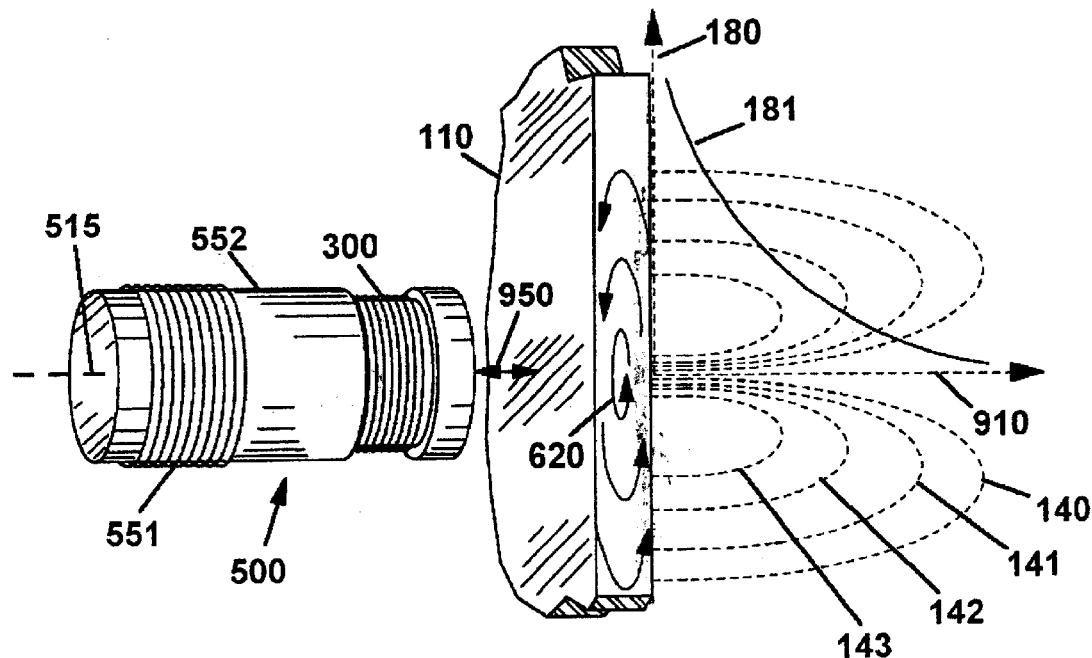

In FIG. 13A, the transmitter coil 300 is rotated to be approximately parallel to the antenna 110, ignoring temporarily that the antenna surface may be curved. The transmitter induced eddy currents 620 generate the magnetic flux field having geometry illustrated by field lines 140–143. Note the density of the magnetic flux field lines along line 910 as the flux field emerges from the partially saturated antenna surface 110. Supplemented on the FIG. 13A is the plot 181 of the decrease in magnetic field intensity 180 as the distance from the surface 910 increases. The magnetic flux field intensity 180 decreases to zero along the plotted line 181. This illustrates that the intensity decreases in relation to the distance (D) 910 away from the surface, i.e., Intensity Plot=$1/D^3$.

Figure 13B:
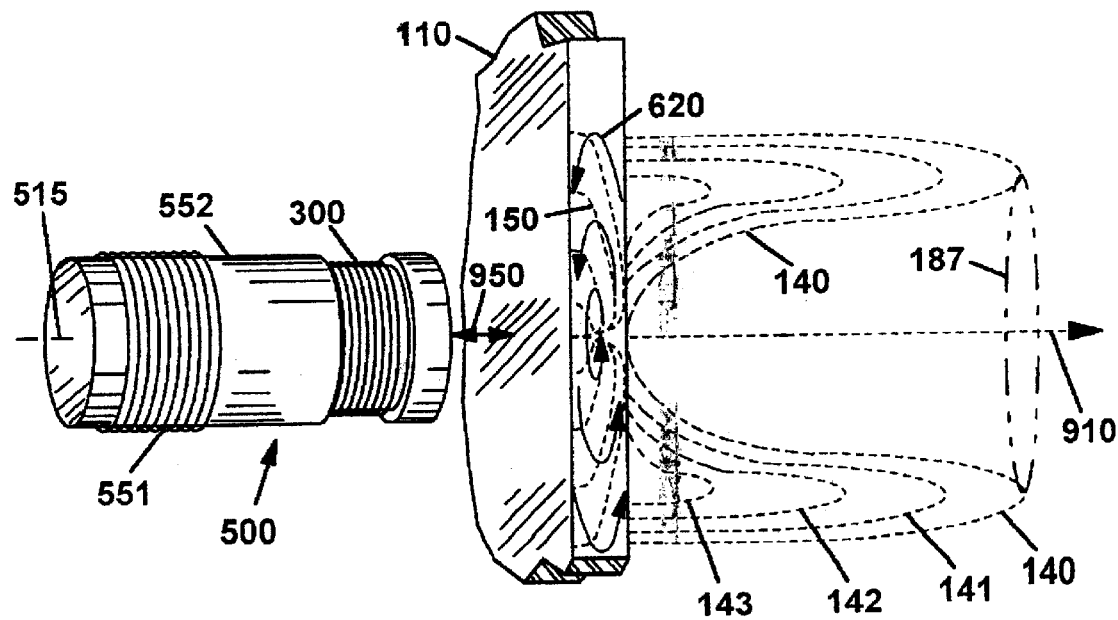

FIG. 13B shows the transmitter induced magnetic flux field 140, 141, 142 and 143 when the magnetic saturation generator 500 is turned on. There is a concentration of the flux lines off the centerline 910 and Magnetic Lensing occurs in a different geometry from FIG. 12. The shape of the transmitter induced magnetic flux field has changed. The focused flux fields create a "focal circle" 187 or "focal plane" instead of the focal point 186 geometry illustrated in FIG. 12.

Figure 19:
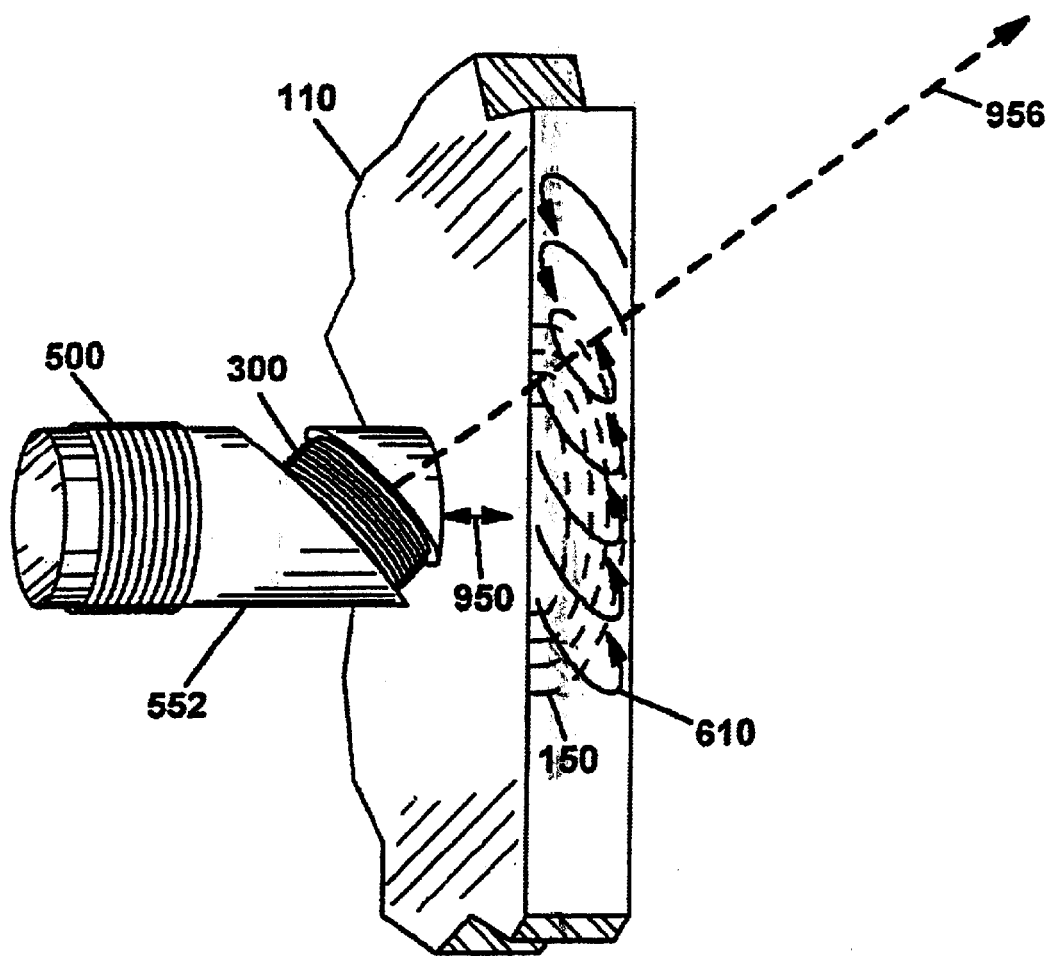

There are advantages to winding the transmitter coils 300 in this manner with respect to the surface of the antenna 110. The main advantage is that all elements of the transmitter coils can be made equidistant from the surface of the antenna 110, therefore inducing an eddy current uniformly parallel or perpendicular to the surface of the antenna and inducing a symmetrical magnetic flux field. If non-uniform eddy currents were desired, then it would be possible to rotate the axis of the transmitter coil 300 to be some angle between perpendicular (as in FIGS. 11 and 12) or parallel (as in FIGS. 13A and 13B) to the antenna. (This geometry is illustrated in FIG. 19.)

It will be appreciated that there is an eddy current generated in the core 552. The eddy current induces a separate oscillating flux opposing the transmitter flux. As the transmitter coil 300 is moved axially along the core 552 away from the antenna 110, more of the energy of the transmitter is consumed by this opposing eddy current. Note that this decrease of transmitter energy is experienced in spite of the gap 950 between the core 552 and the antenna 110 remaining relatively constant.

Using this Magnetic Lensing focus allows the power used by the transmitter magnetic saturation generator to be minimized yet allows detection of objects and the measurement of resistivity at distances not otherwise possible.

Figure 14A:
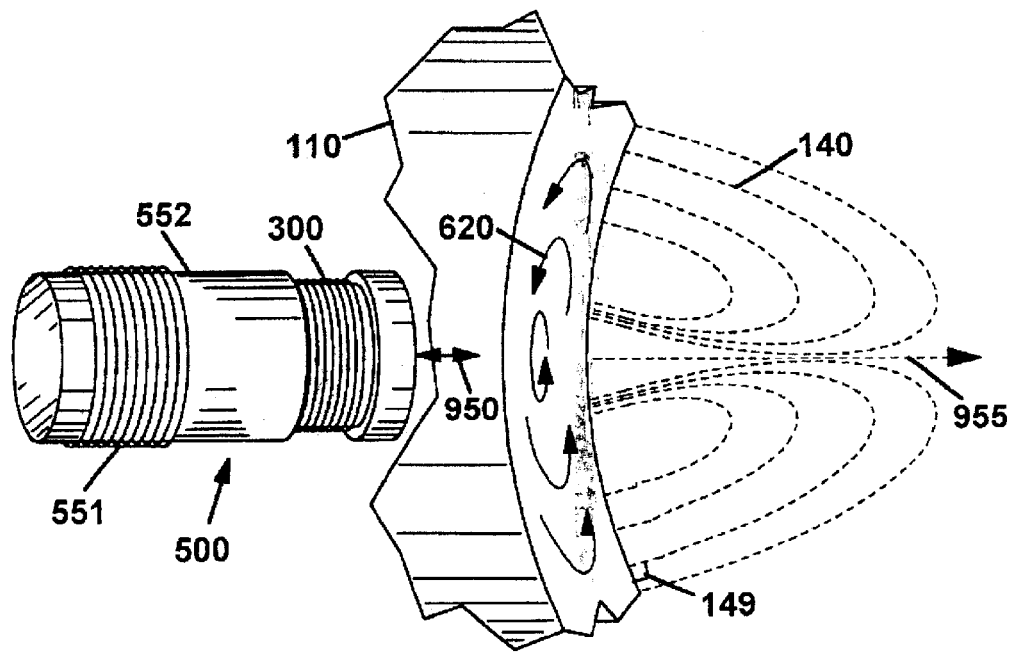
Figure 14B:
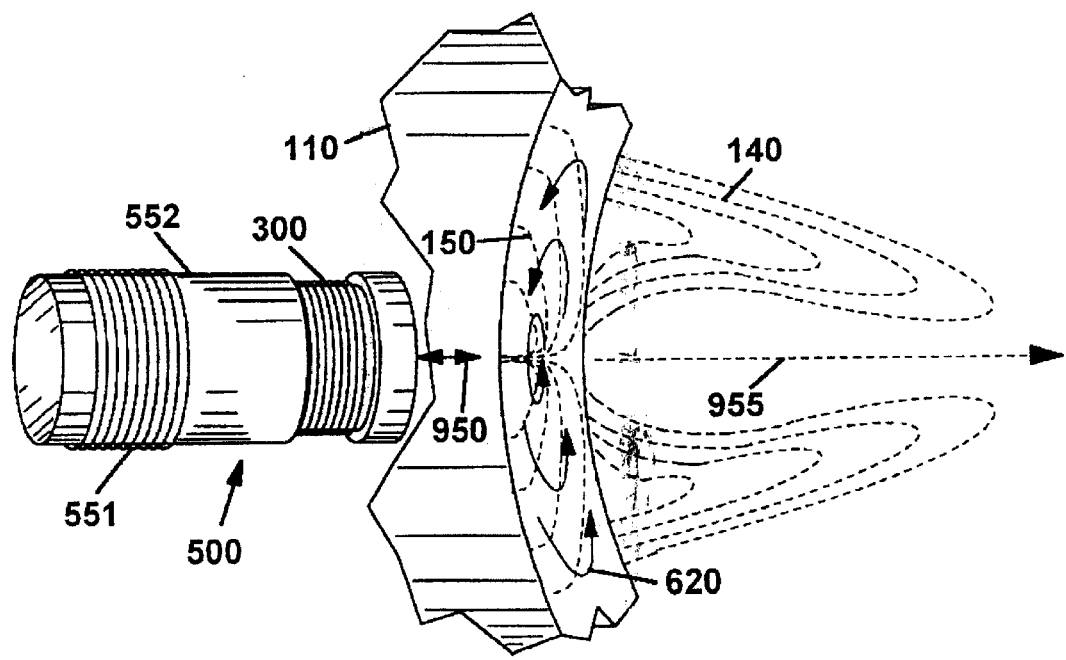

FIG. 14A and FIG. 14B illustrate another embodiment of the invention with the curved antenna surface 110. It will be appreciated that, for configurations of the apparatus optimizing a compact structure, achieving increase energy efficiency and using nested receivers and transmitters, the effect of the curved surface of the antenna may be minimized and the lensing effect illustrated in FIGS. 12 and 13B will be increasing applicable. It will also be appreciated that known techniques for creating flexible ferromagnetic shapes of parabolic or other geometry of the antenna structure may be used to allow adjustment of the magnetic focal distance. It also has been shown that multiple antennas may be utilized, these alternate antennas varying in composition or shape.

Figure 15:
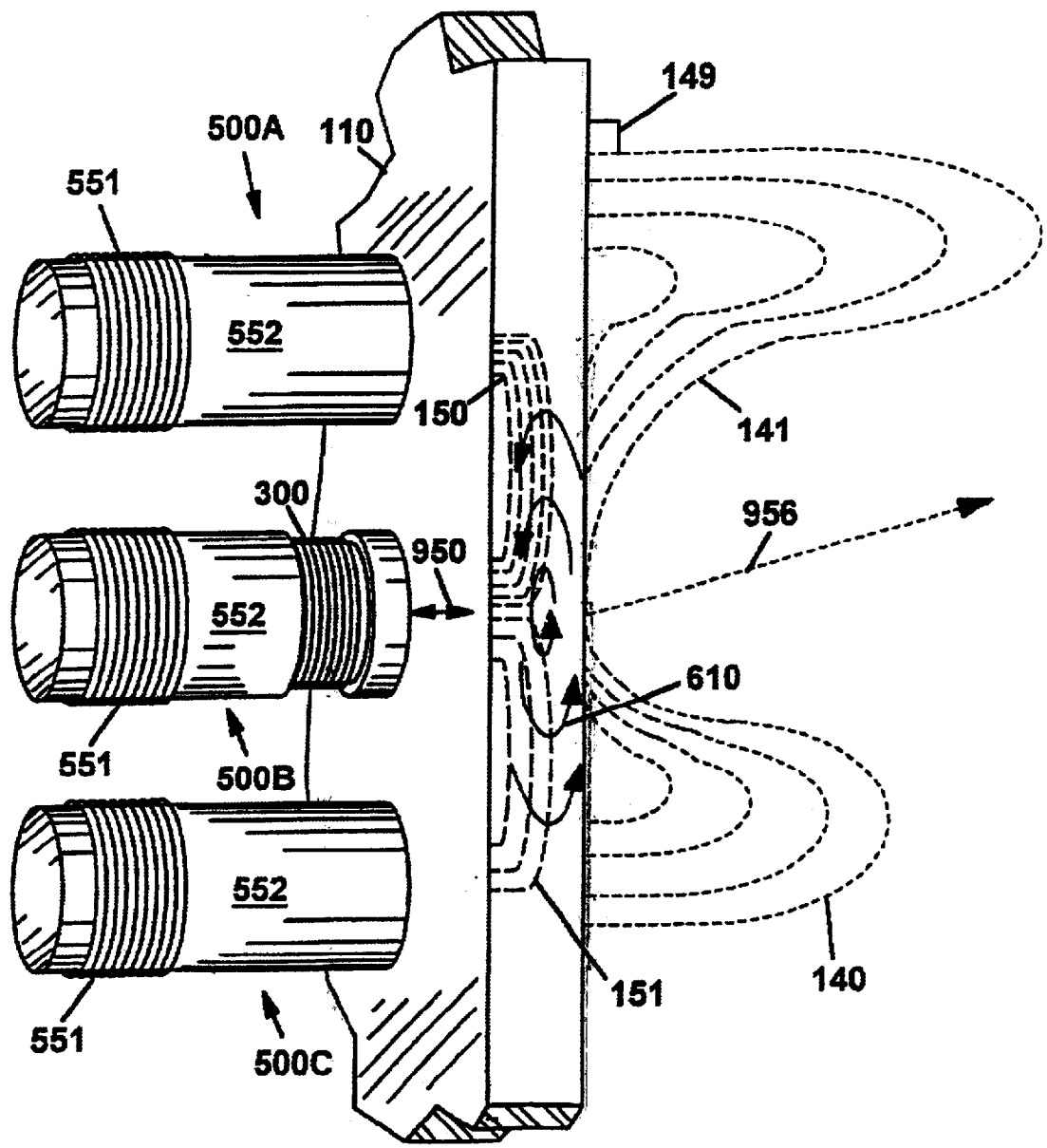
FIGS. 15 through 19 illustrate further embodiments of Magnetic Lensing focus utilized in the invention.

FIG. 15 shows beam directivity and steering capabilities by an inter-play of a plurality of magnetic saturation generators, e.g., 500A, 500B and 500C and one transmitter 300. In this Figure, the magnetic saturation generator 500A and 500B are creating the maximum permeability reduction within the antenna 110 proximate to transmitter 300 and magnetic saturation generator 500A. This creates the maximum bending of the flux lines 140–143 induced by transmitter 300 towards magnetic saturation generator 500A. There is a maximum beam steering available by this single transmitter technique.

Figure 16:
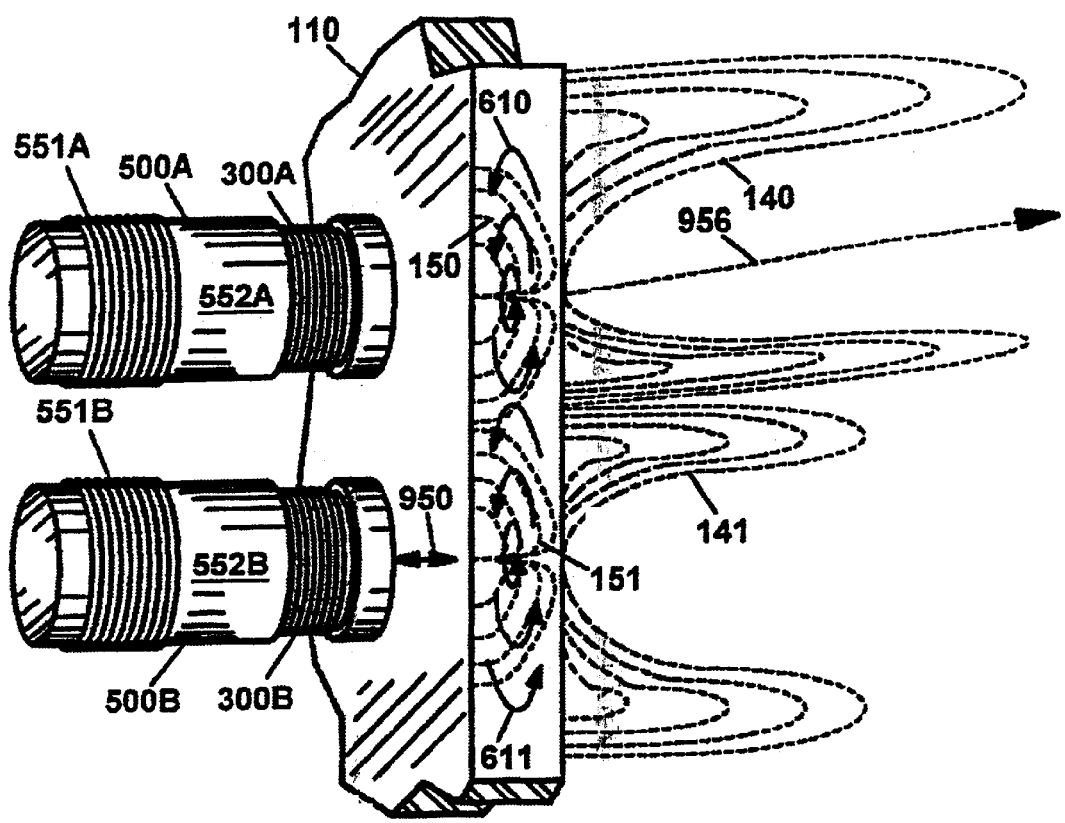

FIG. 16 shows two transmitters, 300A and 300B with bucked transparency magnets 551A and 551B. The transmitters are both wound with their coils substantially parallel to the antenna 110. To deflect the transmitting current 150 and 151 from 300A to the top, transmitter 300B should be increased in strength (at the same frequency) and saturation flux of 500B must be increased over saturation flux of 500A.

Figure 17:
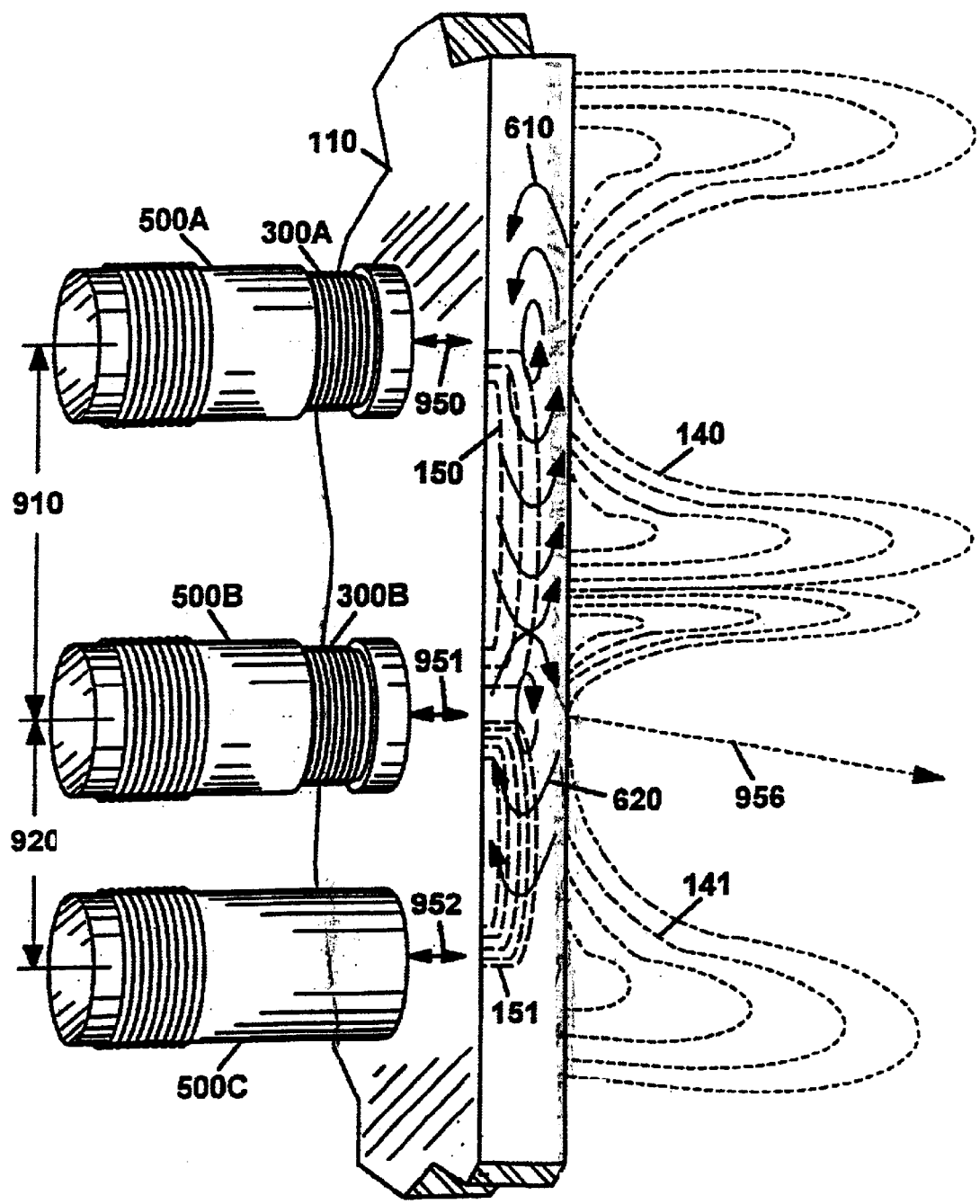

In FIG. 17, another transparency magnet 500C is added to increase the current to the distance $D_{2-3}$. 910. This will bend the flux field 140–143 downward while transmitter 300A is made much more powerful than transmitter 300B to push the flux field down.

Figure 18:
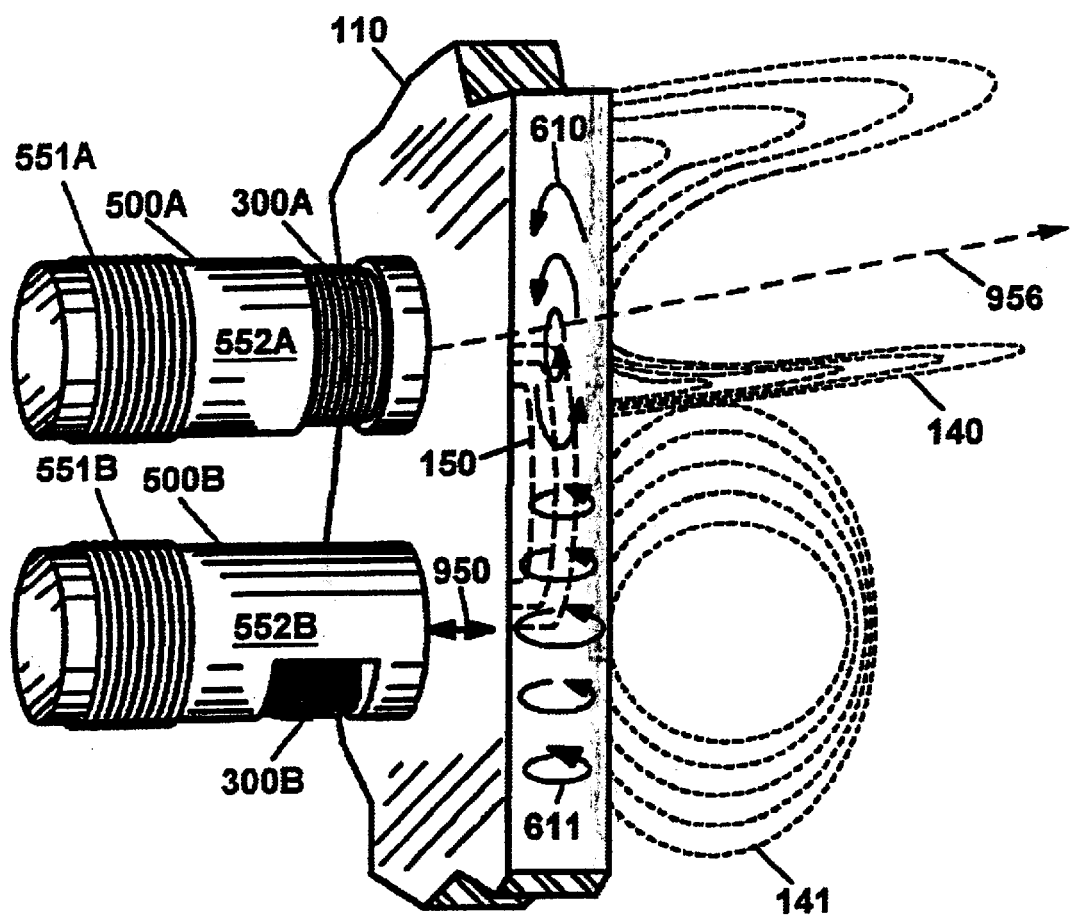

In FIG. 18, another embodiment of the invention relating to beam movement is shown. This embodiment utilizes the transmitters 300A and 300B having equal diameters but oriented at 90° to the other. Again, it is possible to use combinations of transmitters and magnetic saturation generators 500A and 500B having unequal saturation strengths to bend the flux field.

FIG. 19 shows the transmitter 300 at an oblique angle to the antenna 110. It is also oblique to the transparency coil 551 and transparency core 552. The antenna is not fully saturated and the oscillating magnetic flux field of the transmitter 300 induces eddy currents 610. These eddy currents are also at an oblique angle to the surface of the antenna 110. Further, the eddy currents 610 induce a corresponding magnetic flux Field radiating out of the antenna 110. It should be noted that the field lines do not extend out of the antenna toward the magnetic saturation generator but rather field lines stay in close proximity of the antenna surface.

It will also be appreciated by persons skilled in the art after review of the foregoing figures, that Magnetic Lensing focus and Magnetic Antenna transmitter-receptors may also advantageously utilize antenna of varying geometrics. This may be accomplished by multiple solid components of EM barrier material that can be mechanically modified during use. This may include changing the curvature or the thickness of the antenna or combining the EM barrier in a plurality of layers.

Additional advantages may be obtained by providing mechanism for changing the orientation of the apparatus in a direction other than normal to the ground surface. Changing the orientation may facilitate locating depth within the ground of the subsurface object having a measure change in resistivity. The measurement of the depth of detected objects or media is determined by standard triangulation.

In regard to the Conductivity/Resistivity Measuring System of the present invention, it is possible to greatly improve existing methods of detecting objects having differing electrical conductivity of the geologic formation by using a spectrum of transmitter frequencies rather than one frequency. Using a range of frequencies allows a single device to measure the conductivity within a broad range of distance into a geologic formation without a large loss of resolution and accuracy. Therefore, for a given range of distance, a particular group of frequencies will provide improved resolution and better accuracy.

As the frequency increases, the conductive losses increase until the skin depth becomes much less than the thickness of the barrier material. As used herein, "skin depth" is proportional to the inverse of the square root of the product of permeability, conductivity and frequency.

Figure 20:
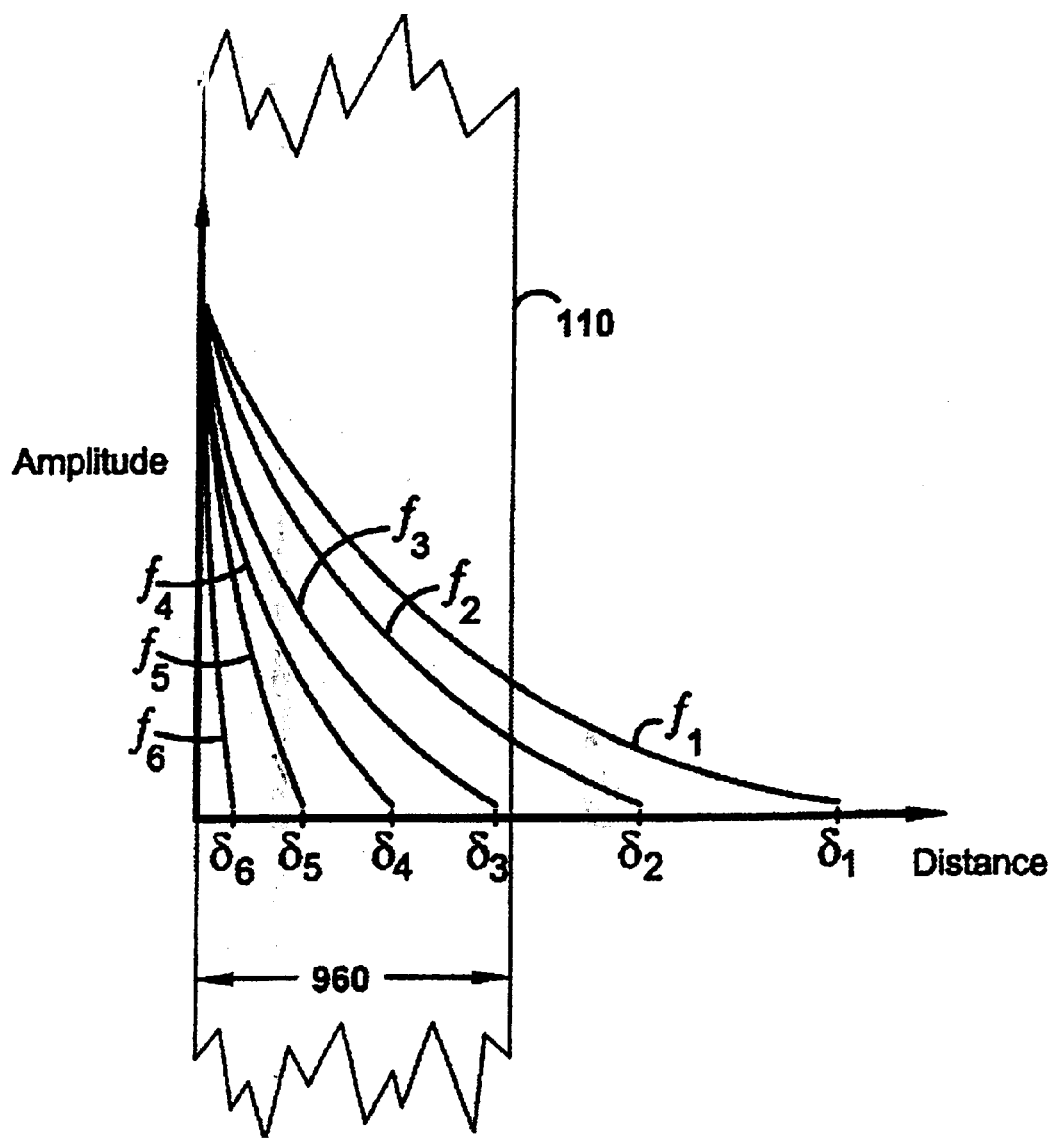
FIG. 20 illustrates the relationship between the frequency of oscillating magnetic flux and depth of penetration into the antenna.

FIG. 20 illustrates the relationship between flux frequency and penetration depth for a cross-section of a piece of a barrier material with a conductivity, a permeability and several imposed frequencies $f_x$, for the present invention. For oscillating magnetic flux of constant amplitude and varying frequency, and a metal with the same permeability and conductivity, it is known by skin depth theory that a flux oscillating at a lower frequency penetrates deeper than a higher frequency oscillating flux. Therefore, one can find an optimum frequency range that can characterize the conductivity of the barrier material. For an antenna structure of uniform composition, the relationship of the antenna skin depth, permeability, conductivity and the frequency of oscillating flux can be expressed as:

$$\delta = \frac{1}{\sqrt{\sigma \mu_r \mu_o f}}$$

where $\delta$=skin depth,
f=flux frequency,
$\sigma$=conductivity
$\mu_r$=relative permeability, and
$\mu_o$=absolute permeability.

In FIG. 20, the relationship of frequencies is $f_6 > f_5 > f_4 > f_3 > f_2 > f_1$.

To understand the relationship of the antenna thickness and transmitter frequency, it is necessary to generate an oscillating magnetic flux adjacent to or near the antenna to be measured. The magnetic flux must be of sufficient magnitude to saturate the antenna. The saturation flux may be generated by a permanent magnet, an electromagnet powered by dc current or ac current. The ac powered EM waves will preferably be of a relatively low frequency. Upon achieving saturation of a portion of the antenna, a second magnetic flux is generated with specific constant amplitude and engaged with the saturated antenna. The resulting magnetic flux from the antenna is monitored using a receiver. The receiver is located adjacent to or near the antenna to be measured. The receiver may be either co-located with the transmitter or at a distance away, e.g., as in a bistatic configuration. The transmitter frequency is increased incrementally while the amplitude is held constant and the received signal is monitored.

Figure 21A:
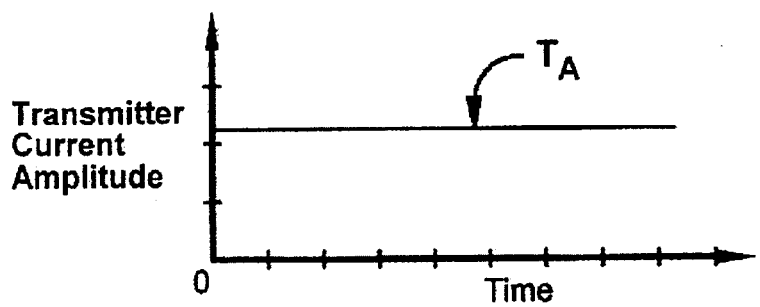
FIGS. 21A, 21B and 21C illustrate the relationship between the transmitter flux amplitude (FIG. 21A), the saturation flux amplitude (FIG. 21B), and the receiver signal amplitude (FIG. 21C).
Figure 21B:
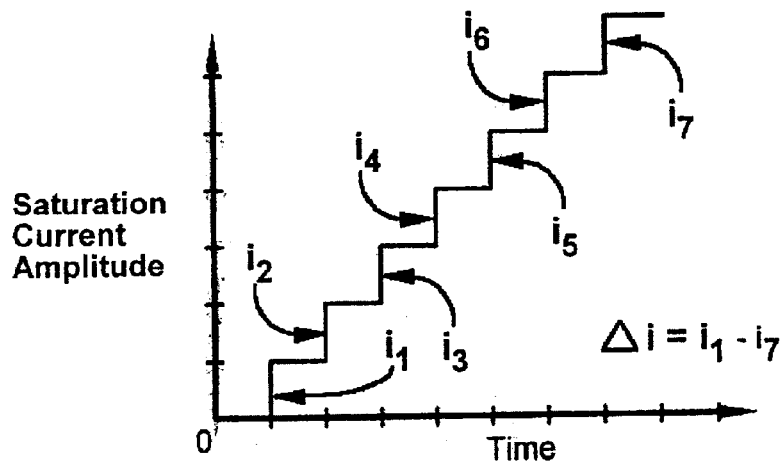
Figure 21C:
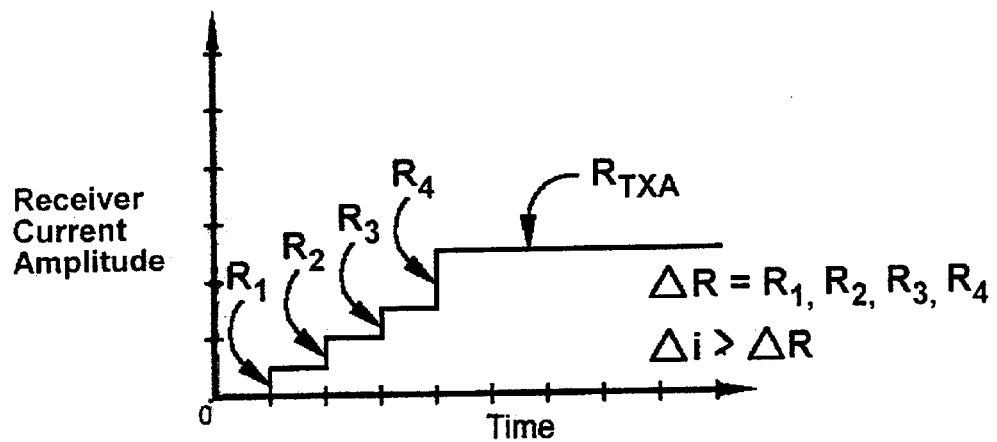

As required by skin depth theory, for a given wave of constant amplitude and varying frequency, the lower frequencies penetrate deeper into the antenna than the higher frequencies. The higher the frequency, the greater loss of flux, i.e., increased attenuation. See FIG. 20. Therefore, an oscillating magnetic flux of a specified frequency can be generated and engaged with the antenna. The received signal is monitored. The frequency of the transmitted flux is increased in a stepped fashion while continuing to monitor the received signal. The amplitude of the transmitted flux remains constant. As the frequency of the transmitted flux is incrementally increased, for example by stepping, the received signal will attenuate. With the amplitude held constant, the maximum frequency of the transmitter flux capable of penetrating the antenna is therefor determined when the receiver is no longer able to detect a signal. The last frequency to generate a received signal is the "maximum penetration frequency." A second step in understanding the relationships among geometry, permeability and conductivity is the approximation of permeability. Using the same transmitter, receiver, and saturation procedures described in the first step, a saturation flux is generated near or close to the antenna to be measured. The saturation flux has a known yet variable current. A transmitter flux of known and constant frequency and amplitude is generated at or near the antenna within a zone to be effected by the saturation flux. A receiver monitors the receiver signal from the transmitted flux returning for generating a resulting electromagnetic response. While monitoring the received response and holding the transmitter flux frequency and amplitude constant, the saturation flux is increased incrementally. Thus, the receiver signal will generally mirror the steps of the saturation flux but at different amplitudes than the transmitter flux. (See FIGS. 21B and 21C.) As the saturation flux increases, the antenna becomes more and more transparent to the transmitter flux (maintained at constant amplitude and frequency). However, until there is a significant reduction in the permeability of the antenna, no transmitter flux penetrates through. At a certain point, small amounts of transmitter flux can be detected thus, causing the amplitude of the receiver signal to increase to the stepped increases in the saturation flux. The stepped incremental saturation is continued while the transmitter flux is held at the constant amplitude and frequency and the resulting increments in the receiver signal are monitored. The resulting increase in receiver signal becomes more proportional to the increase in saturation flux. This is continued until no further changes are registered by the receiver in response to increases in the saturation flux. The point at which the received signal registers no change may be called "total saturation." See FIG. 21C. Once total saturation is achieved, increases in the current or amplitude of the saturation flux have no effect upon the received signal. Thus, the transmitter flux is coupled with the antenna. As the antenna becomes more saturated, (and its permeability approaches 1) the antenna becomes increasingly transparent, resulting in more of the transmitter flux penetrating though the antenna. The current history and the associated received signal, as illustrated in FIGS. 21A, 21B and 21C, provide for full or partial saturation of a localized area. Further, the current history and the received signal information can be used to mathematically determine the permeability and thickness. Once approximation is obtained on either permeability or conductivity, the other variable can be determined and the material thickness can then be calculated. It will be appreciated that this determination will also facilitate the design of an antenna.

The technique of the present invention for calculating the thickness of a material with unknown permeability and conductivity can be used to further classify various materials detected within the subsurface (and the geometry of such materials including, in some cases, thickness) such that a general lookup table can be created. The general lookup table can contain known results from numerous test samples allowing for quick lookup and display of thickness based on known samples meeting the test criteria. The test criteria can be for a range of thickness for specified materials having the same permeability and conductivity.

In order to obtain an accurate measurement of permeability and/or conductivity, electronic and geometric nulling is required. Geometric nulling positions the transmitter, receiver and saturation coils in the optimum locations for the particular system designed. Various designs are provided yielding excellent results. Also, an electronic nulling circuit can simultaneously null all of the transmitter frequencies. In practicing the present invention as described herein, one skilled in the art will know and appreciate how to arrange the transmitter, receiver and saturation coils in optimum locations for the particular system being used, and will know and appreciate how to simultaneously null all of the frequencies to provide electronic nulling.

FIG. 3E illustrates an embodiment of a magnetic saturation generator 501 used to generate the transparency current required to practice the present invention. The transparency current generator 501 is utilized to partially saturate a portion of the antenna 110 thereby facilitating the penetration or coupling of oscillating magnetic flux into the antenna. This greater coupling allows greater efficiency of generating eddy currents and broadcasting of the oscillating flux induced by the eddy currents.

The limitation of the displacement distance can be essentially eliminated by a utilization of a single magnetic saturation generator as illustrated in FIGS. 3D, and 7 in operative association with a magnetic culminator 555. The transmitter 300 and the receiver 580 are both located at the same culminator 555. The displacement distance D between the transmitter 300 and the receiver 580 is essentially zero because of the close configuration of the transmitter and receiver. In the illustrated configurations the receiver and transmitter are geometrically nulled. The configuration illustrated by FIG. 7 has the additional advantage of adaptation to the adjustable nested configuration of FIG. 10B wherein the saturation core is replaced with a magnetic culminator. For a given power, the displacement distance D between the transmitter 300 and the receiver 580 determines the resolution of the thickness measurement. The resolution effects the size of the object that is detectable with the formation.

Also, FIGS. 5A through 5E illustrate alternate embodiments of the Metallic Transparency region generator 501 for use with the present invention. The Metallic Transparency region generator illustrated in FIG. 5A comprises saturation core 552 upon which the saturation coil 551 is wound, two like magnetic poles 504 between which is a magnetic culminator 555. The core 552, upon which the saturation coils 551 of the electromagnet are wrapped, is located between each pole 504 and the culminator 555. Preferably, the magnetic saturation generator is contained within a housing (not shown) and connected to the power source and instrumentation (also not shown) by conventional means. It will be noted and appreciated by persons skilled in the technology that the magnetic saturation generator 501 is not in electrical contact with the antenna 110.

FIGS. 5F and 5G illustrate one embodiment of the apparatus 500 of the present invention. The apparatus is a bistatic embodiment FIG. 5F comprises a magnetic saturation generator 501 the saturation coil 551, the transmitter coil 300,and the antenna 110. FIG. 5G comprises a separate magnetic saturation generator 501; saturation coil 551, receiver coil 580 and antenna 110. The magnetic saturation generator 501 is disposed from the antenna 110 by a gap "G" 150. The antenna 110 has a thickness L 960. The apparatus 500 operates by energizing the saturation coil 551 for saturating the antenna 110, transmitting a transmitter flux from the transmitter coil 300, and receiving a response via the receiver coil 580. The relative penetration is caused by the change in the saturation flux. Thus, as the saturation flux increases from $i_1$, to $i_2$, to $i_3$, to $i_4$, the penetration depth of the transmitter flux increases from $F_1$, to $F_2$, to $F_3$, to $F_4$. FIG. 5C illustrates the corresponding incremental increased penetration $F_1$, $F_2$, $F_3$ and $F_4$. Also, consideration of the cross-sectional area of each component of the apparatus 500 is required to assure that no component goes into total saturation for a specific power requirement necessary to drive the magnetic flux across the gap G 950.

Figure 22:
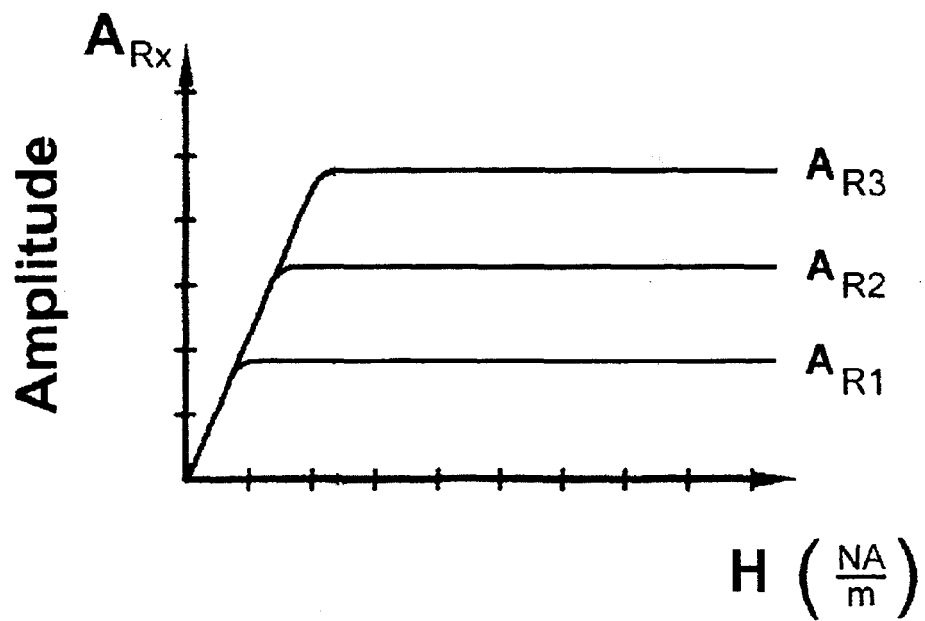
FIG. 22 illustrates the relationship between the flux density β and the change in magnetic field intensity H in amp-turns/meter.

FIG. 22 illustrates the relationship between the flux field β and the change in H (ΔH) in amp-turns/meter. The permeability μ is plotted. For the relationship between the flux field β and ΔH, the function defining the permeability μ remains the same. Although the function defining the permeability μ remains the same, the value of ΔH for thinner materials moves up the curve faster. Thus, incremental changes in H create a faster advancement up the permeability curve toward saturation. For example, a given $H_{L1}$ corresponds to the value of $β_{L1}$ and a corresponding $H_{L2}$ corresponds to the value of $β_{L2}$. Thus, the value for L2 moves faster up the permeability μ curve than the value for L1.

Figure 23:
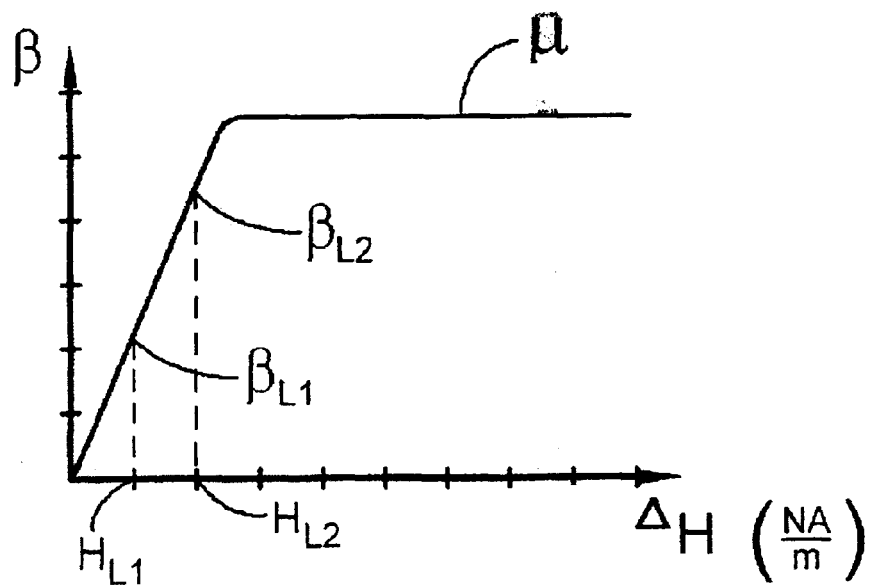
FIG. 23 illustrates the relationship between the receiver amplitude $A_{RX}$ and H in amp-turns/meter.

FIG. 23 illustrates the relationship between the amplitude $A_{Rx}$ of the receiver signal and H in amp-turns/meter. As in FIG. 22, the slope of the curve in FIG. 23 is related to the permeability μ. However, the receiver amplitude $A_{Rx}$ reaches a different maximum value depending on the thickness of the antenna. For thinner antenna, as with other materials, the receiver amplitude $A_{Rx}$ reaches its maximum value at a lower amplitude $A_{Rx}$. For thicker materials, the receiver amplitude $A_{Rx}$ reaches its maximum value at a higher amplitude $A_{Rx}$. FIG. 23 illustrates a thinner material having a maximum at $A_{R1}$, a thicker material having a maximum at $A_{R3}$, and an intermediate thickness material having a maximum at $A_{R2}$.

Figure 25:
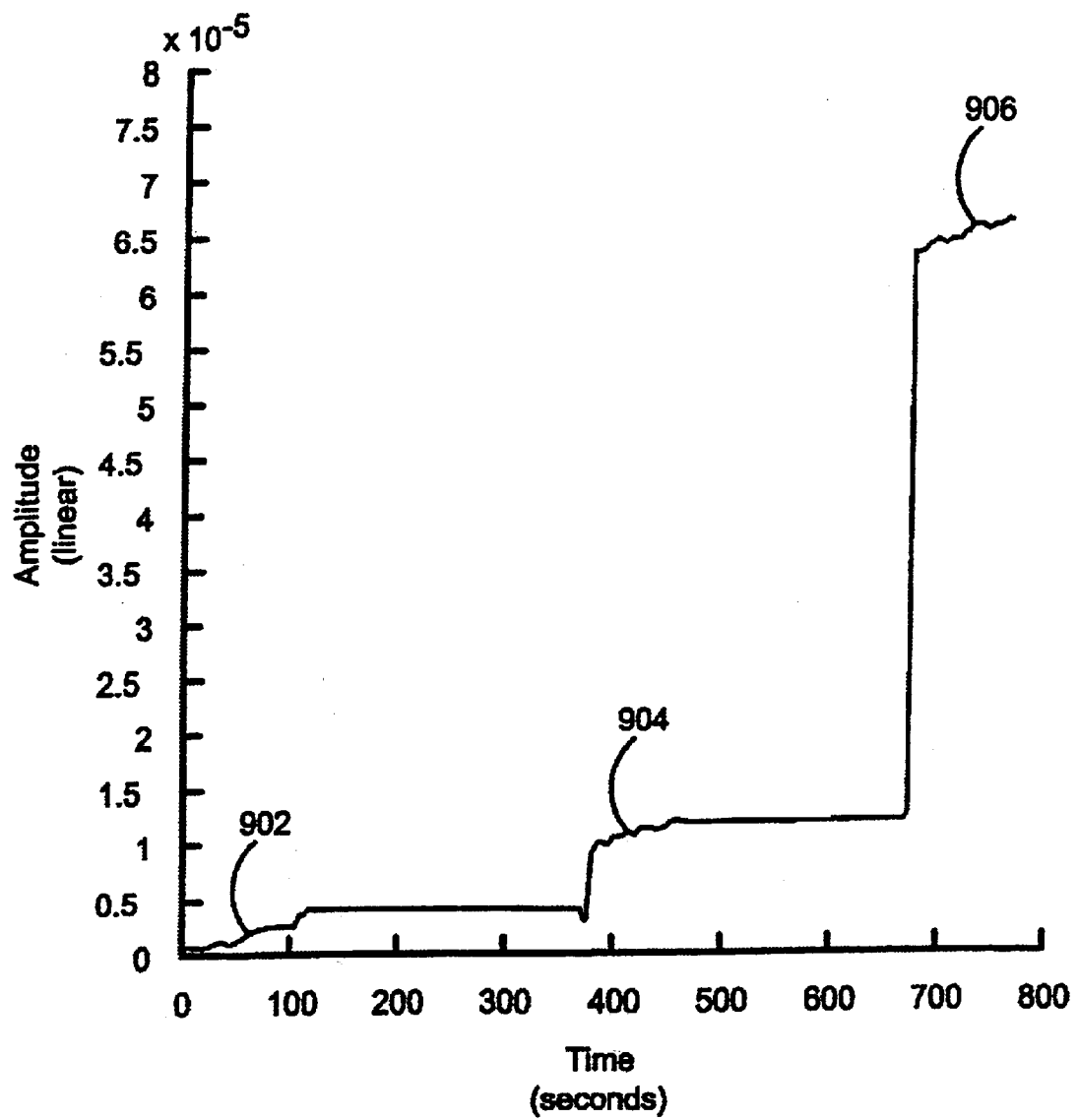
FIG. 25 is a graph of amplitude versus time for a bistatic configures magnetic saturation generator of the present invention coupling with differing barrier materials.

FIG. 25 is a graph of amplitude versus time for a bistatic configured magnetic saturation generator of the present invention. The frequency is held constant (fixed) and the barrier material, also of constant thickness, and is varied. The bistatic magnetic saturation generator was nulled using copper 902. Thereafter, the copper was replaced with brass causing the amplitude to vary from the original nulled position 904 to a new position 904. Since brass and copper have related properties, the dislocation 904 from the copper nulled position 902 is small. However, when the brass is replaced with aluminum the amplitude 906 varies significantly from the original nulled position 902. Aluminum and copper have significantly different physical characteristics.

Method of Procedure

As the apparatus moves through the axial length of the borehole, a number of procedures are carried out in the following manner at a particular point.

The value of the electrical resistivity of the geologic formation is measured by varying the "H" field by increasing the magnetic coils current by fixed amounts.

Using multiple measurements of conductivity, the location of the measured formation resistivity can be determined by trigonometry.

The depth of the penetration into the formation will also be determined by the relationship between the resistivity of the matter, the permeability (if any) and the frequency of the oscillating flux emitted from the antenna.

The invention may also be modified in a manner to allow it to contain its own power source. This power source can be a stored electrical power source such as one or more batteries. The apparatus may also incorporate powered devices to propel the apparatus along the ground surface. It will be appreciated that this would be of particular benefit when the apparatus is in a substantially horizontal portion of the wellbore. This capability may also facilitate use of the apparatus in portions of a wellbore that contain directional changes. This propulsion capability can be a supplemental means existing means for moving the apparatus through the wellbore. It may, in other embodiments provide the single means for movement of the apparatus. When combined with data recording and storage capabilities, the apparatus could operate independent of any attachment to the well head. The means for propelling the apparatus along the wellbore may include wheel or track devices separately attached to or incorporated into the housing of the apparatus.

The apparatus may also utilize one or more permanent magnets to provide the saturation flux. One benefit from the use of permanent magnets is that the electrical power requirements would be less.

Additional embodiments of the apparatus may utilize means to maintain a relatively constant distance between the apparatus and the interior surface of the wellbore. This component may be termed a constant distance control device. This device may employ non-conductive or non-permeable materials to provide this contact. It will be appreciated that contact between this device and the surface of the geologic formation is not for the purpose of transmitting electrical or magnetic energy from the apparatus into the formation. The constant distance control device may also include one or more flexibly tensioned attachments, such as wheels or tracks held by springs. These attachments may also not to be electrically conductive or magnetically permeable. When the apparatus of the this invention includes a cylindrical housing or other shape, the these attachments may be positioned on the circumference or perimeter of the housing (or to an auxiliary device attached to the housing) in a manner that the flexible tension device keeps the constant distance control means in contact with the interior surface of the wellbore.

In another embodiment of the invention subject of this specification, a single electrically conductive coil may be used to provide the saturation flux and the transmitter flux. The coil would first be powered with dc current sufficient to create the magnetic flux required to achieve the selected level of partial saturation of the antenna. The power could then be switched to ac current and multiple wavelengths of oscillating magnetic flux be emitted into the antenna. The power could then be returned to the dc current providing the partial saturation flux. This alternating powering could be repeated in rapid succession, thereby conserving power, space and weight requirements for the apparatus. The receiver could also be located proximate to the Metallic Transparency region created by the dual saturation and transmitter coil. Accordingly, a separate saturation coil would not be required to create the partial transparency needed to receive magnetic flux transmitted to the antenna. This would provide a further reduction of weight, energy and space.

For this embodiment, it will be appreciated that the ac frequency can be controlled and adjusted. It will be appreciated that use of low frequency ac generated magnetic flux will reduce impedance mismatch hindering amplification. It will also be appreciated that isolating electronics can be utilized to bypass the impedance mismatch problem to the amplifier.

Figure 26:
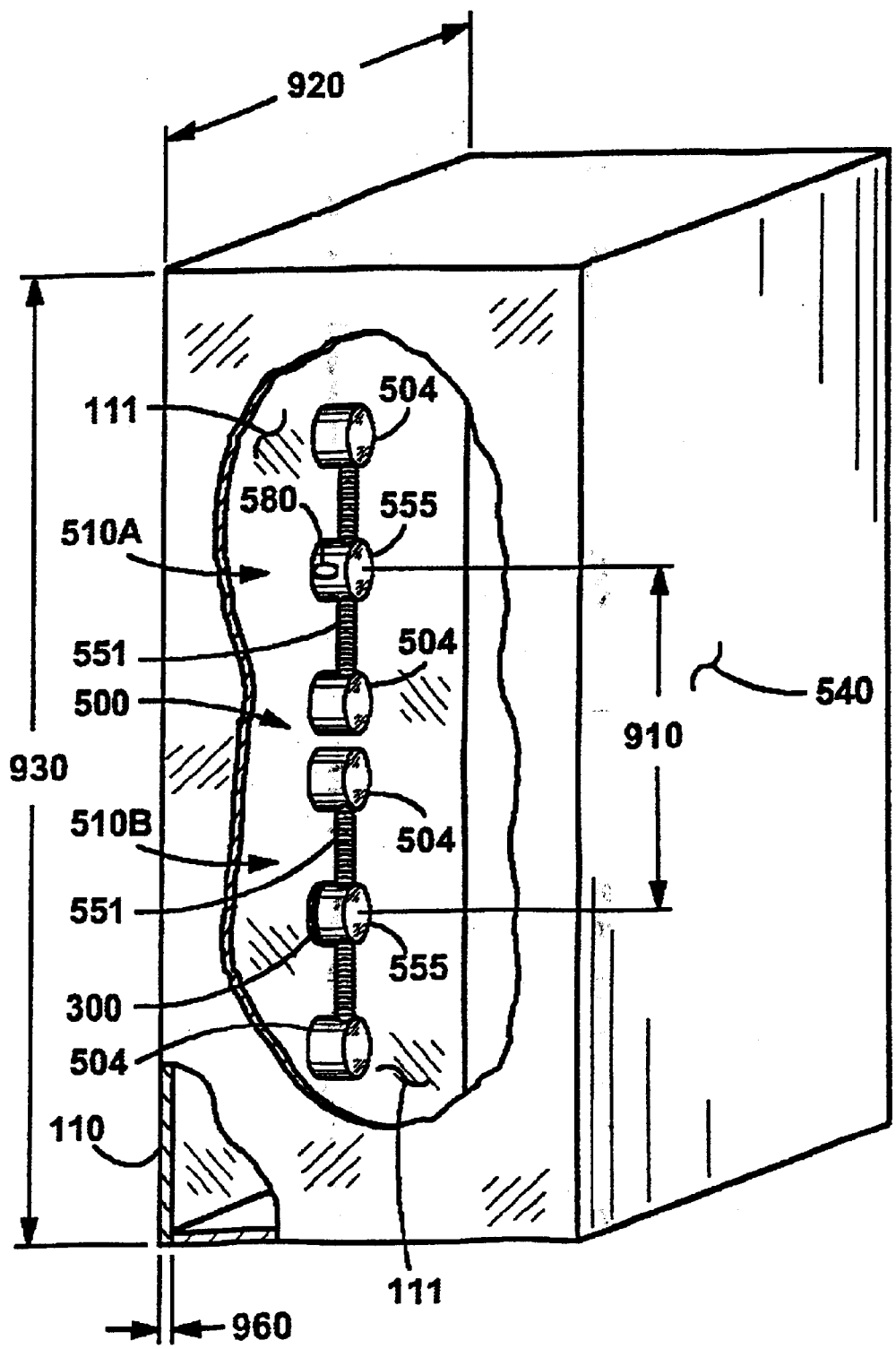
FIG. 26 illustrates the apparatus of the invention utilized in laboratory testing.

FIG. 26 illustrates the test apparatus used in a demonstration of the method and apparatus of this invention. The apparatus 540 contained a utilized a separated (bistatic) transmitter-receiver configuration 500. The receiver 580 and the transmitter 300 were each located in conjunction with two separate magnetic saturation flux generators 501A and 501B. The transmitter/receiver system, combined with a partially saturated EM barrier utilized as an antenna 110 proximate to the front 506 of both the magnetic flux generators incorporating the transmitter and receiver, focused oscillating magnetic flux. The antenna 110 comprised a ferromagnetic carbon steel structure ¼ inch thick 960, 2-ft wide 920 and ×4 ft high 930. The antenna comprised one side 111 of a steel box 540. It will be appreciated that the receiver coil 580 contained within the magnetic saturation generator 501A is wound orthogonal to the saturation coil 551. The magnetic saturation generator 501B incorporates a transmitter 300 with the transmitter coil also wound orthogonal to the saturation coil 551 and to the receiver coil 580. The distance 910 between the receiver 580 and the transmitter 300 is approximately 2 ft. It can be appreciated by those skilled in the art that in the bistatic configuration illustrated in FIG. 26, the distance between the magnetic culminators 555, separately containing the receiver 580 and transmitter 300, must be sufficiently small relative to the geometric size of a target object. Accordingly, the accuracy of the antenna thickness calculation is limited by the mass to be evaluated and the displacement distance "D" 910. However, as illustrated in FIG. 3A, the separation distance D is also relevant to depth of penetration into the formation.

Figure 27:
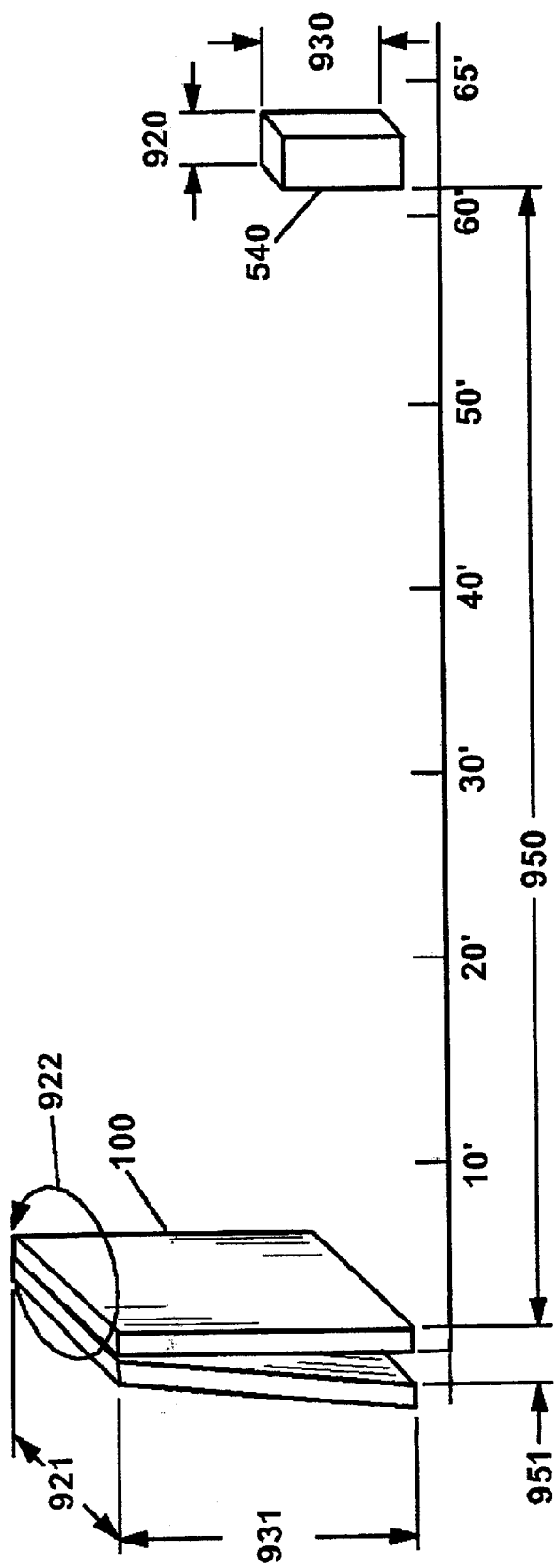
FIG. 27 illustrates a configuration of the test apparatus with an aluminum plate target.

FIG. 27 illustrates the relationship of the various components used in the demonstration. The side of the box 111, i.e., the antenna 110, was placed at varying distances 950 from an 8-ft 921×12 ft 931×½ inch thick aluminum plate 100 suspended from the top end. These distances were 30 ft, 45 ft and 60 ft. While the apparatus within the box 540 was activated, the aluminum plate 100 was moved and the response of the apparatus was recorded. While the plate 100 remained suspended at a distance 950 of 30 feet from the antenna within the apparatus 540, the bottom of the plate was first pulled back 951 a distance of 1 foot. The plate was then released and allowed to swing back and forth until it returned to its original suspended vertical position. The swinging movement caused the total distance between the antenna and the plate to alternately vary between 51 feet to 49 feet. As the swinging motion decreased over time, the variation of distance between the plate and the antenna also decreased.

Figure 28A:
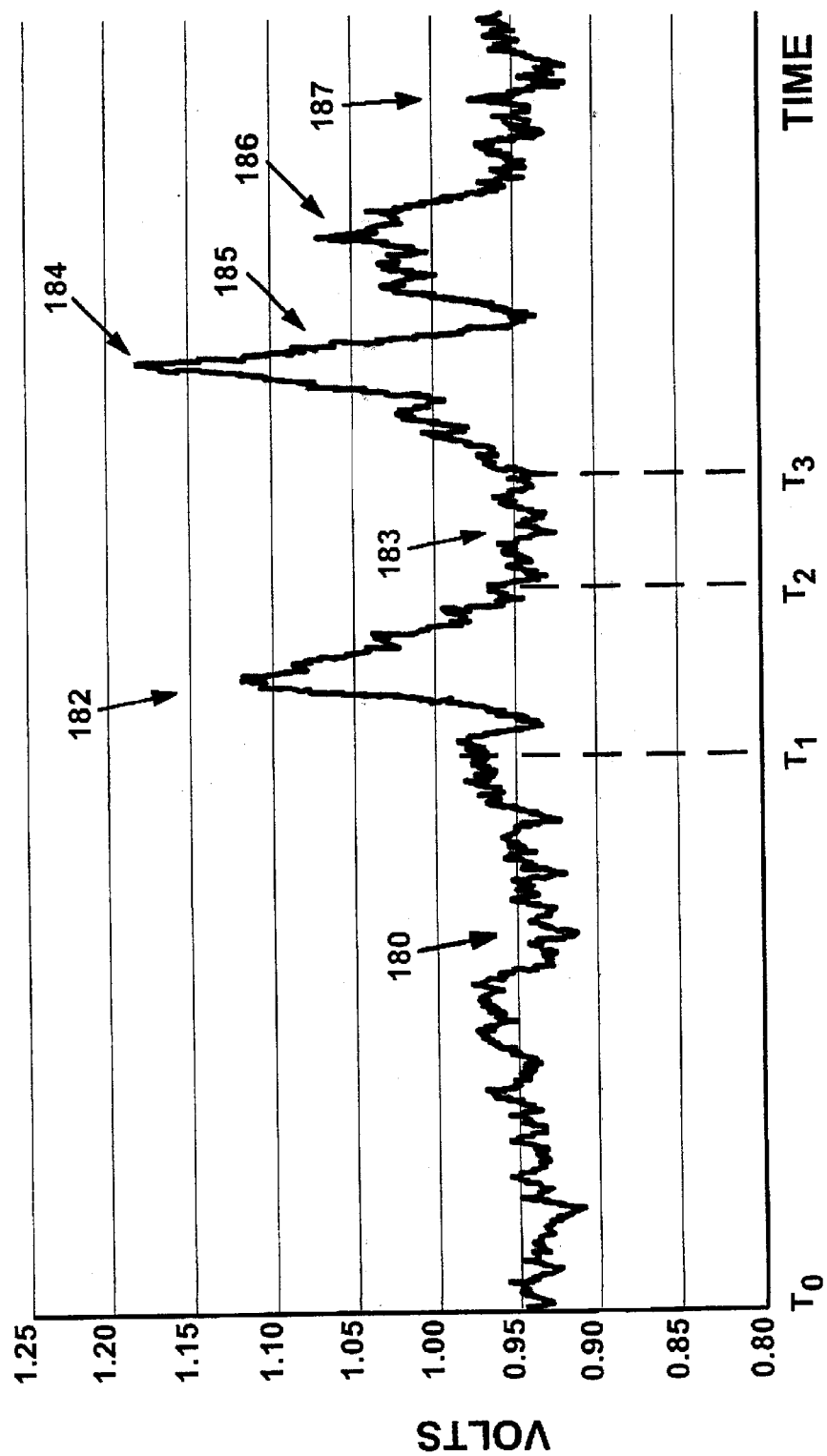
FIG. 28A illustrates the measured changes in voltage received by the test apparatus subject of the invention when the target aluminum plate was moved approximately 1 foot from a distance of approximately 30 feet.

FIG. 28A illustrates the response measured by the antenna to movement of the plate over time. In this experiment, the antenna is measuring changes (in volts) in the phase of eddy currents induced within the antenna by the oscillating magnetic flux transmitted from the target aluminum plate 100. As the distance 950 between the antenna and the aluminum plate changes, the antenna detects a change in phase. It will be appreciated that the plate is energized by oscillating magnetic flux from the transmitter within the apparatus 540. The oscillating magnetic flux induces eddy current with the electrically conductive aluminum plate. The eddy current, in turn, creates an oscillating magnetic flux that is detected by the antenna within the apparatus.

The apparatus is activated and the antenna monitors for change in phase over time 180. During the time that no change in phase is detected, the line 180 remains at a relatively constant value. This may be seen by the relatively flat segment of the line 180 between time $T_0$ and $T_1$, (after disregarding incidental noise). This indicates that there is no movement of the target aluminum plate 100 relative to the apparatus 540. However when the plate is moved by swinging it either closer or away from the antenna at time $T_2$, a distinct change in phase 182 is measured by the antenna. It will be appreciated that this distinct change in phase 182 is detected when the bottom of the plate is moved only one feet when at a total distance of 30 feet from the antenna. Further, only the bottom end of the plate moves this approximate one foot distance, the upper portions of the plate do not move relatively at all. When the plate returns to its original position during the time between $T_3$ and $T_4$, the measured value of phase also returns to the original position 183. After the time $T_4$ the plate is again moved, and the antenna measures the distinct change in phase 184. The measured changes in phase 185, 186 and 187 are attributed to the plate swinging back to its original position.

Figure 28B:
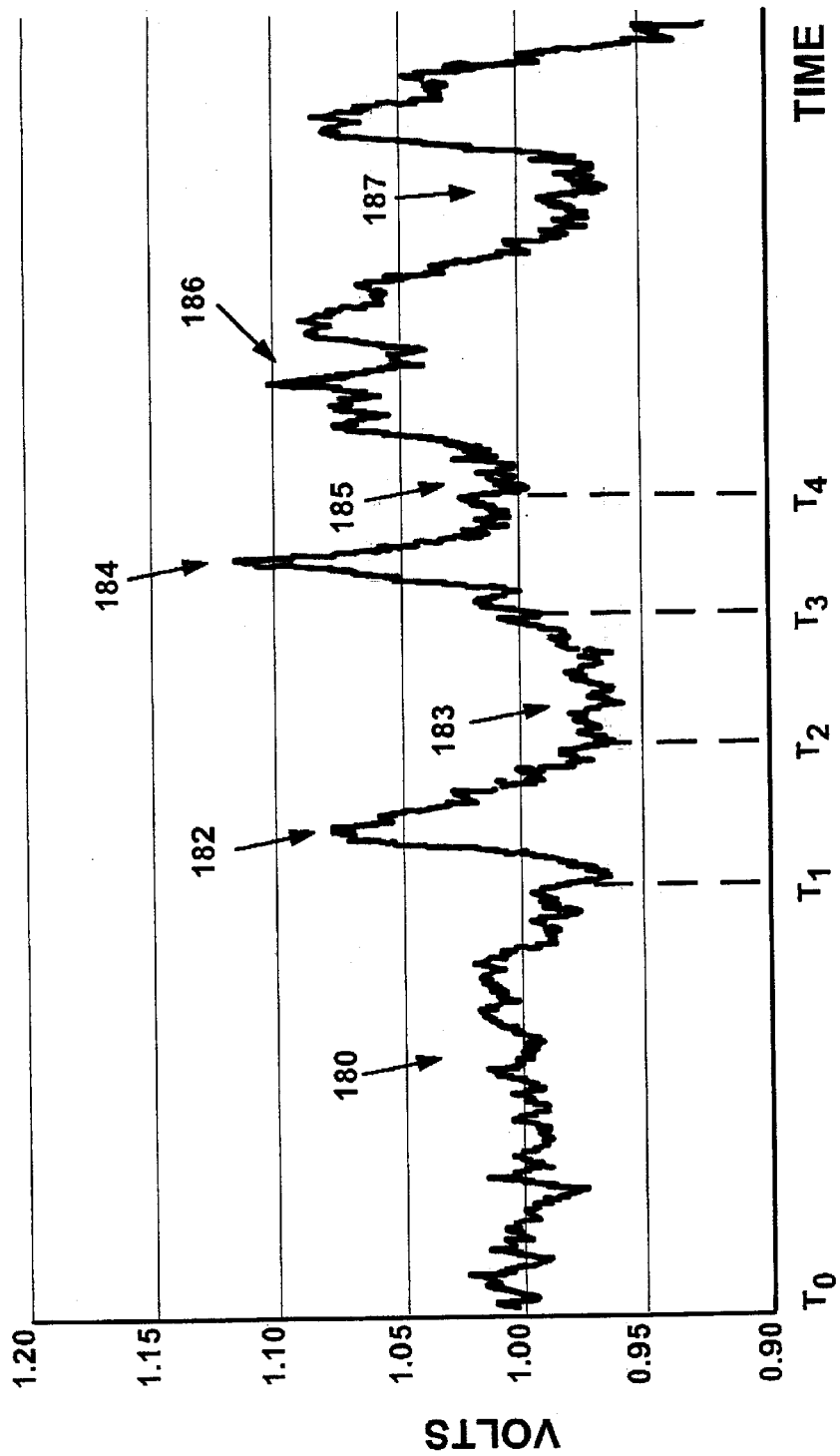
FIG. 28B illustrates the measured changes in voltage received by the test apparatus when the target was moved approximately 1 foot while at a distance of approximately 45 feet from the apparatus.

FIG. 28B illustrates changes in measured phase responsive to movement of the aluminum plate when the distance between the antenna containing the antenna and the plate is increased to 45 feet. For the period of time $T_0$–$T_1$, the plate was stationary and no change in phase was measured. Between $T_1$ and $T_2$, the bottom edge of the suspended plate was again pulled approximately 1 foot away from the antenna. The antenna recorded a change in phase indicated by the first peak 182. It will be appreciated that the sides of the peak indicate different phase shifts and the plate move first away from the antenna and then swings back in the direction of the antenna. The segment of measured voltage between $T_2$ and $T_3$ 183 indicates the plate has returned to approximately its original position. Subsequent movement of the plate, again approximately 1 foot, is recorded by the measured phase changes at 184 and 186.

Referencing again FIG. 27, in a third experiment, the antenna within the apparatus 540 and the suspended aluminum plate 100 were separated a distance 950 of approximately 61 feet. While vertically suspended, the plate was rotated 922 on its vertical axis in relation to the antenna. This movement resulted in a one side of the plate moving closer to the antenna concurrent with the opposite side moving away from the antenna. In addition, when the plate 100 was rotated 90°, the area of the plate within the oscillating flux field induced by the transmitter in the antenna is minimized.

Figure 28C:
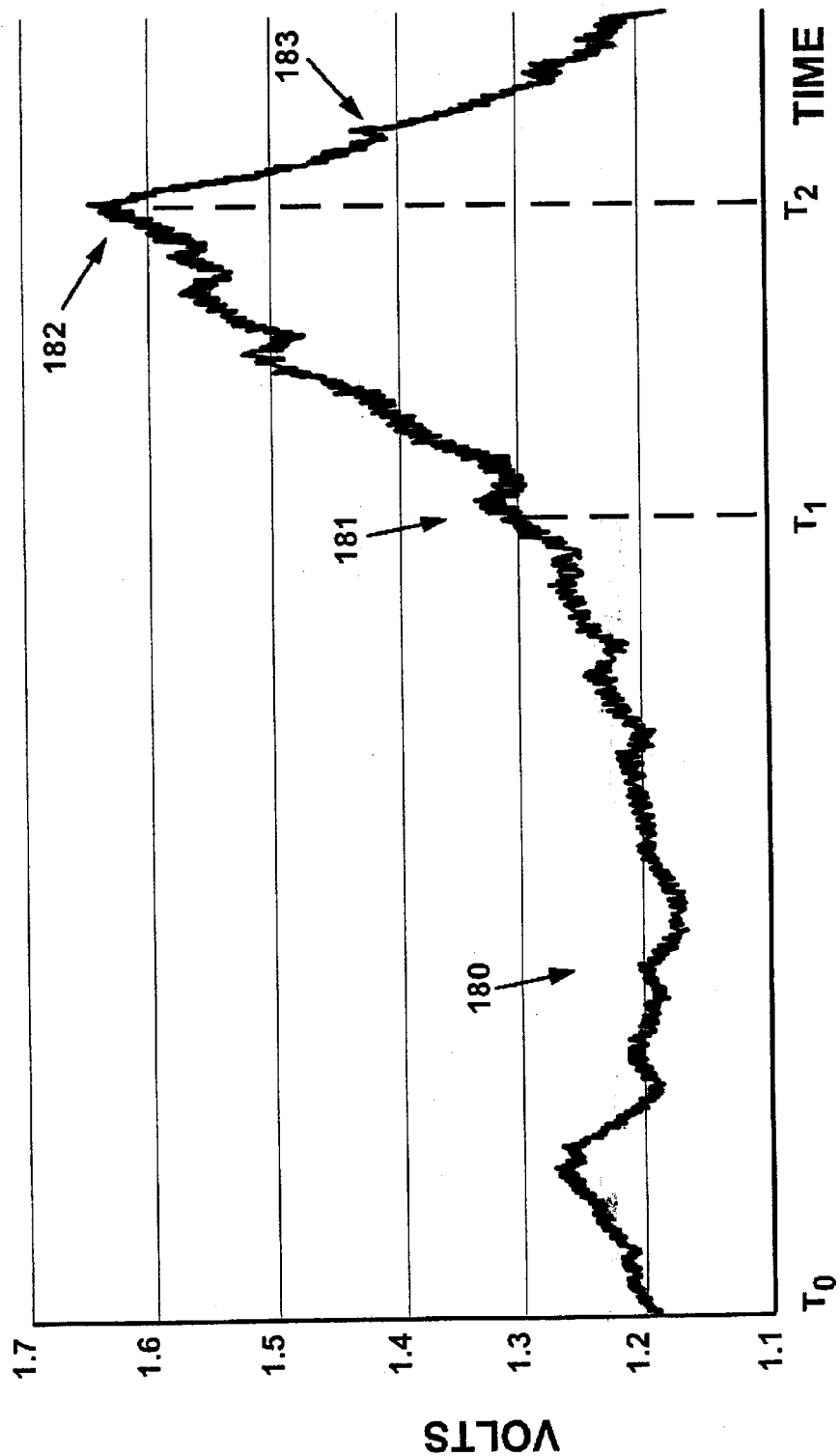
FIG. 28C illustrates the measured change in voltage when the target was rotated while at a distance of approximately 61 feet from the test apparatus.

FIG. 28C illustrates the concurrent measured phase shift. Again, the plate is stationary during time $T_0$ to $T_1$ and the signal is nulled or normalized. The rotational movement of the plate also causes a phase shift as received signal, nulled at the original position of the plate relative to the antenna, is diminished. This rotational movement begins at approximately $T_1$. The measured phase shift is illustrated by the line segment 181–183. The greatest shift is measured at $T_2$, when the plate is rotated 90° from the original position and the area within the oscillating magnetic flux is at a minimum. As the plate continues its rotation relative to the antenna, the area of the plate (now the opposite side of the plate now facing the antenna) begins to increase and the magnitude of the induced eddy currents begins to increase to the original level.

It will be appreciated that the measured phase shifts illustrated in FIGS. 28A, 28B and 28C are not averaged or cumulative data, but rather each of the data sets are from single tests.

Figure 29A:
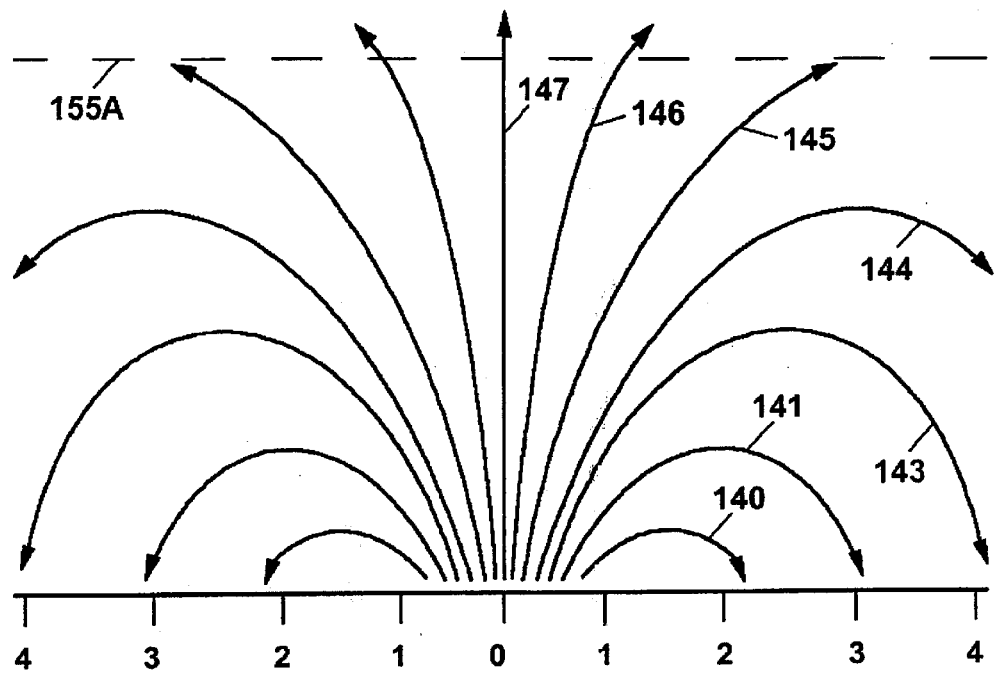
FIG. 29A illustrates magnetic field lines radiating from an energized electromagnetic coil.

FIG. 29A illustrates lines of oscillating magnetic flux emitted from a single magnetic flux generator operating at 100 Hz. The flux lines are equivalent to the flux lines commonly demonstrated with permanent magnets or electromagnetic powered by dc current. The relatively uniform dispersion of the flux lines, 140, 141, 142, 143, 144, 145, 146 and 147, away from the magnet surface is consistent with the known mutual repulsion of magnetic flux lines.

Figure 29B:
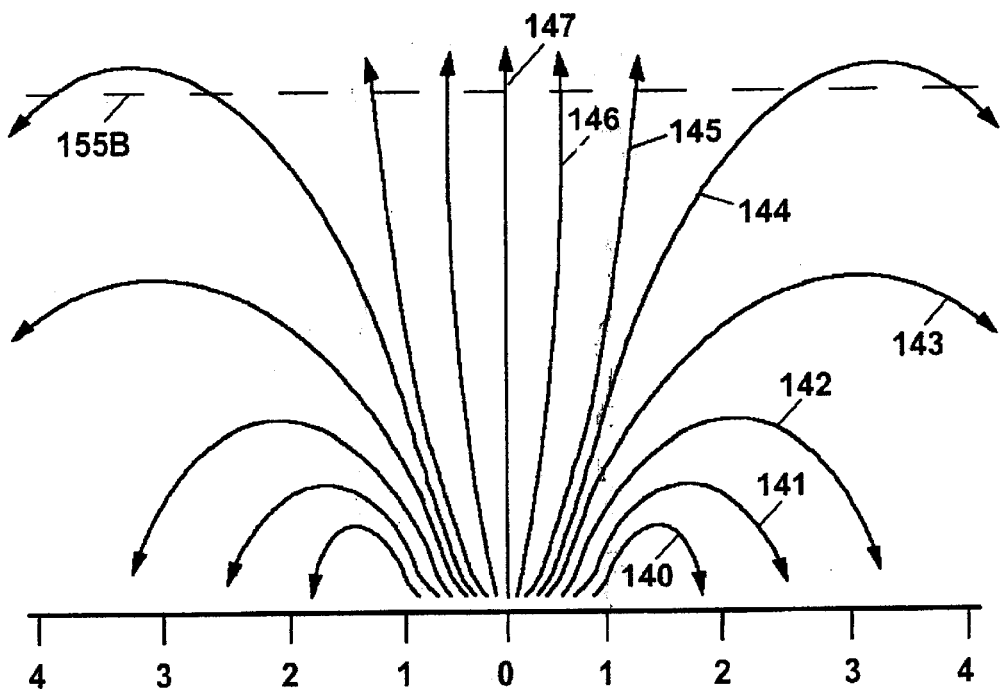
FIG. 29B illustrates measured magnetic field lines emitted from a partially magnetically saturated Magnetic Antenna device induced from the same energized electromagnetic coil.

FIG. 29B illustrates actual measured magnetic flux lines emitted from a ferromagnetic material (not shown) that has been partially saturated by dc flux. The ferromagnetic material is a barrier material to the transmission of magnetic flux. As a result of partial saturation, however, a significantly greater portion of oscillating magnetic flux from the ac transmitter operating at 100 Hz (not shown) penetrates into the ferromagnetic material, inducing stronger eddy currents throughout the barrier material. The eddy currents generate a separate oscillating magnetic flux that may broadcast out of the ferromagnetic material. This, of course, is the Magnetic Antenna effect previously discussed. FIG. 29B, however, illustrates that the pattern of the oscillating flux lines broadcast from the antenna is altered by the modified permeability or altered saturation of the ferromagnetic material now subject of the Magnetic Antenna effect.). It will be appreciated that the difference in the flux pattern results only from the partial saturation causing the antenna effect and the reduced permeability of the antenna material causing the flux pattern to be altered. It will also be appreciated that flux lines do not show the uniform dispersion caused by mutual repulsion, but rather that a portion of the flux is directed in a relatively uniform direction away from the antenna, with an comparable portion falling quickly away, leaving a greater and non uniform gap between flux lines. Reference is made to the proximity or density of flux lines 145, 146 and 147, in contrast to flux lines 142, 143 and 144. It will be appreciated that when the magnetic flux generator was activated on, causing the partial saturation of the ferromagnetic material and creating the Magnetic Antenna, the quantity of oscillating flux retaining its original direction when emitted from the antenna increased at a given distance from the antenna. This concentration of magnetic flux lines demonstrated by the apparatus of this invention demonstrates the Magnetic Lensing focus, which allows the magnetic flux to be directed in a controlled manner. The capability allows a monostatic configuration to be utilized with a Magnetic Antenna to create a Magnetic Lens and thereby achieve greater penetration into a geologic formation with less power consumption. The data recording using transmitter flux oscillating at 100 Hz is representative for all frequencies that may be lensed.

Also, it is obvious that as the distance to the target increases, the subtended angle as seen by the transmitter is reduced. At 60 ft the subtended angle off the centerline is around 20° in the vertical and horizontal directions.

What is claimed is:

1. An apparatus for measuring the electrical properties of subsurface geologic formations and media within the interstices of the geologic formation comprising the following:
   a. means for moving the apparatus though the axial length of an uncased borehole;
   b. an electromagnetic antenna having a first side and a second side and comprising material that is electrically conductive and magnetically permeable;
   c. a magnetic flux transmitter proximate to the first side of the electromagnetic antenna for engaging the antenna with magnetic flux sufficient to reduce the magnetic permeability of at least a portion of the antenna;
   d. a second magnetic flux transmitter proximate to an area of the antenna material having reduced magnetic permeability capable of inducing eddy currents in the antenna that emit an electromagnetic wave from the second side of the antenna; and
   e. at least one electromagnetic wave receiver located near the first side of the antenna to detect any return oscillating magnetic flux engaging with the second side of the antenna.

2. The apparatus of claim 1 further comprising a device for measuring and recording the return oscillating magnetic flux.

3. The apparatus of claim 1 further comprising a receiver nulled to at least one of the magnetic flux generated by the first transmitter, the second transmitter and the electromagnetic wave of the induced eddy current.

4. The apparatus of claim 1 further comprising a plurality of antenna materials differing in at least one of the properties of electric conductivity and magnetic permeability.

5. The apparatus of claim 1 further comprising one or more first and second magnetic flux transmitters.

6. The apparatus of claim 1 wherein the magnetic permeability of the antenna material is variably reduced.

7. The apparatus of claim 1 wherein the magnetic permeability of the antenna material is variably reduced across the surface of the second side.

8. The apparatus of claim 7 wherein the varying magnetic permeability at the surface of second side of the antenna alters the direction of electromagnetic waves emitted from the second side.

9. A method for measuring the electrical properties of subsurface geologic formations and media within the interstices of the geologic formation comprising the steps of:
   (a) moving an apparatus containing an antenna having a first side and a second side and comprising material that is electrically conductive and magnetically permeable, a magnetic flux generator, an oscillating magnetic flux transmitter, and an electromagnetic wave receiver for detecting magnetic flux though the axial length of an uncased borehole;
   (b) creating at least one magnetic flux near a first side of an antenna;
   (c) engaging at least a portion of the antenna with the magnetic flux to reduce the magnetic permeability of the antenna;
   (d) transmitting separate oscillating magnetic flux from the first side of the antenna into the area of reduced permeability of the antenna thereby inducing eddy currents within the antenna that create separate oscillating electromagnetic wave emitted from the second side of the antenna; and
   (e) detecting any return oscillating magnetic flux engaging with the second side of the antenna.

10. The method of claim 9 further comprising nulling the means for detecting return oscillating magnetic flux to at least one of the means for creating magnetic flux and the electromagnetic wave emitted from the antenna material.

11. The method of claim 9 further comprising measuring magnetic flux detected by a receiver.

12. The method of claim 9 further comprising a plurality of magnetic antennae differing in at least one of the properties of size, shape, thickness, electric conductivity, and magnetic permeability.

13. The method of claim 9 further comprising variably changing the magnetic permeability of the antenna at the surface of the second side to alter the direction of electromagnetic waves emitted from the surface of the second side.

14. The method of claim 13 further comprising using the differing direction of the electromagnetic wave emitted from the surface of the second antenna side to alter the magnetic flux of the electromagnetic wave.

15. The method of claim 13 further comprising the use of the varying magnetic permeability at the surface of the second side of the antenna to control the concentration of magnetic flux away from the second side.

* * * * *